United States Patent
Yang et al.

(10) Patent No.: US 12,219,590 B2
(45) Date of Patent: Feb. 4, 2025

(54) PARSER AND INTERLEAVING PARAMETER DESIGN FOR RESOURCE UNIT AGGREGATION

(71) Applicant: QUALCOMM Incorporated, San Diego, CA (US)

(72) Inventors: Lin Yang, San Diego, CA (US); Bin Tian, San Diego, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 17/103,558

(22) Filed: Nov. 24, 2020

(65) Prior Publication Data

US 2021/0160889 A1 May 27, 2021

Related U.S. Application Data

(60) Provisional application No. 62/941,625, filed on Nov. 27, 2019.

(51) Int. Cl.
*H04W 72/542* (2023.01)
*H04L 1/00* (2006.01)
*H04L 5/00* (2006.01)

(52) U.S. Cl.
CPC ......... *H04W 72/542* (2023.01); *H04L 1/0071* (2013.01); *H04L 5/0007* (2013.01)

(58) Field of Classification Search
CPC .. H04W 72/085; H04W 74/04; H04L 1/0071; H04L 5/0007; H04L 5/0039;

(Continued)

(56) References Cited

U.S. PATENT DOCUMENTS

| 10,736,113 B2 | 8/2020 | Wang et al. |
| 2016/0050666 A1 | 2/2016 | Yang et al. |

(Continued)

FOREIGN PATENT DOCUMENTS

| CN | 107113140 A | 8/2017 |
| TW | 201927024 A | 7/2019 |

(Continued)

OTHER PUBLICATIONS

International Search Report and Written Opinion—PCT/US2020/062328—ISA/EPO—Mar. 4, 2021.

(Continued)

*Primary Examiner* — Sharmin Chowdhury
(74) *Attorney, Agent, or Firm* — Holland & Hart LLP

(57) ABSTRACT

This disclosure provides methods, devices and systems for data parsing for resource unit (RU) aggregation. A wireless communication device (such as an access point (AP) or a station (STA)) may allocate a set of resource units (RUs) for a receiving device in a basic service set (BSS). The set of RUs may be associated with multiple bandwidth segments of a bandwidth allocation and may be non-contiguous or contiguous. The wireless communication device may determine a data parsing and encoding scheme for a set of information bits. In some implementations, the encoded bits may be distributed to the set of RUs based on a distance to tone mapping value or pilot tone location or both of the aggregated set of RUs different than respective values or pilot tone locations of the RUs in the aggregated set of RUs.

37 Claims, 24 Drawing Sheets

(58) Field of Classification Search
CPC ... H04L 5/0044; H04L 5/0094; H04L 5/0026; H04L 27/2603; H04L 27/2602; H04L 27/261; H04L 5/0048; H04L 5/0042; H04L 5/001

See application file for complete search history.

(56) References Cited

U.S. PATENT DOCUMENTS

| | | | |
|---|---|---|---|
| 2016/0050672 A1* | 2/2016 | Chen | H04L 1/0071 370/329 |
| 2016/0080043 A1* | 3/2016 | Tian | H04L 5/0007 375/267 |
| 2016/0233998 A1 | 8/2016 | Sun et al. | |
| 2016/0330000 A1 | 11/2016 | Lee et al. | |
| 2017/0223722 A1 | 8/2017 | Choi et al. | |
| 2017/0366329 A1* | 12/2017 | Cao | H04W 72/0453 |
| 2018/0124788 A1* | 5/2018 | Choi | H04W 84/12 |
| 2018/0248591 A1* | 8/2018 | Geng | H04B 7/0413 |
| 2019/0238288 A1* | 8/2019 | Liu | H04L 5/0091 |
| 2019/0281614 A1 | 9/2019 | Chen et al. | |
| 2020/0136773 A1* | 4/2020 | Chen | H04L 1/0071 |
| 2020/0344022 A1* | 10/2020 | Lee | H04L 5/001 |
| 2021/0160959 A1* | 5/2021 | Cao | H04B 7/0413 |
| 2021/0281376 A1* | 9/2021 | Park | H04L 5/0044 |
| 2023/0246738 A1* | 8/2023 | Park | H04L 1/0058 370/338 |

FOREIGN PATENT DOCUMENTS

| | | |
|---|---|---|
| WO | WO-2016175517 A1 | 11/2016 |
| WO | WO-2017044591 A1 | 3/2017 |
| WO | WO-2017142725 | 8/2017 |

OTHER PUBLICATIONS

Liu J., et al., "Multiple RU Combinations For EHT", doc.: IEEE 802.11-19/1907r0, Nov. 12, 2019, pp. 1-19.

Noh S.C., et al., "11be Channelization Discussion", doc.: IEEE 802.11-19/1911r0, Nov. 10, 2019, pp. 1-9.

Taiwan Search Report—TW109141333—TIPO—Jul. 2, 2024.

* cited by examiner

PARSER AND INTERLEAVING PARAMETER DESIGN FOR RESOURCE UNIT AGGREGATION

CROSS REFERENCE

The present Application for Patent claims the benefit of U.S. Provisional Patent Application No. 62/941,625 by YANG et al., entitled "PARSER AND INTERLEAVING PARAMETER DESIGN FOR RESOURCE UNIT AGGREGATION," filed Nov. 27, 2019, assigned to the assignee hereof, and expressly incorporated by reference herein.

TECHNICAL FIELD

This disclosure relates generally to wireless communication, and more specifically, to parser and interleaving parameter design for resource unit (RU) aggregation.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some examples, a wireless communication system (such as a WLAN) may include APs and STAs configured for high efficiency (HE) WLAN operations (such as defined in IEEE 802.11ax) or extremely high throughput (EHT) operations (such as defined in IEEE 802.11be). For some resource deployments, the wireless communication system may support frequency bands traditionally used by Wi-Fi technology (such as the 2.4 GHz band or the 5 GHz band), as well as extended frequency bands (for example, the 6 GHz band) that may support both licensed and unlicensed communications. Each of the frequency bands may include multiple sub-bands or frequency channels for signaling physical layer convergence procedure (PLCP) protocol data units (PPDUs). The PPDUs may be transmitted by a STA or an AP over a wireless channel. In some examples, the PPDUs may be transmitted over a wireless channel having a minimum bandwidth of 20 MHz. In other examples, an extended BSS bandwidth may be formed through channel bonding, and PPDUs may be transmitted over wireless channels having bandwidths of 40 MHz, 80 MHz, 160 MHz, or 320 MHz.

In some examples, incumbent technologies (for example, fourth generation (4G) systems such as Long Term Evolution (LTE) systems and fifth generation (5G) systems which may be referred to as New Radio (NR) systems) may occupy resources of the extended BSS bandwidth. As a result, an AP or a STA may have difficulty discovering a contiguous idle channel (for example, a contiguous 80 MHz, 160 MHz, or 320 MHz channel) for EHT operations within the extended BSS bandwidth. STAs or APs may experience reduced signaling throughput due to the overlapping data traffic, and available frequency resources may be wasted, particularly for single-user transmissions.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a receiving wireless device (for example, an access point (AP) or a station (STA)). As described herein, an available frequency spectrum (such as an extended Basic Service Set (BSS) bandwidth) of a wireless channel may be divided into multiple resource units (RUs), each RU including a number of different frequency subcarriers ("tones"). The receiving wireless device may determine an allocation of the multiple RUs, in which the multiple RUs are associated with two or more bandwidth segments of a total bandwidth allocation. Subsequently, the receiving wireless device may determine a first value of a parameter for a tone configuration of the multiple RUs aggregated together, in which the first value of the parameter is different than respective values of the parameter for individual RUs of the aggregated multiple RUs. In some implementations, the parameter may include a tone mapping distance (arm) value, a location of pilot tones, or both. Additionally, the location of the pilot tones, a number of the pilot tones, and the arm value may be based on a total number of pilot tones, reusing a subset of pilot tones as data tones (for example, based on one or more data tones being unavailable in a punctured portion of the multiple RUs), or both. The receiving wireless device may then receive a set of coded bits of a data unit on the multiple RUs according to the tone configuration indicated by the first value of the parameter.

Another innovative aspect of the subject matter described in this disclosure can be implemented in a method for wireless communication at a transmitting wireless device (for example, an AP or an STA). In some implementations, the transmitting wireless device may also determine the allocation of the multiple RUs and the first value of the parameter for the tone configurations of the multiple RUs aggregated together. Additionally, the transmitting wireless device may distribute the set of coded bits to the multiple RUs based on the first value of the parameter. Subsequently, the transmitting wireless device may transmit the distributed set of coded bits on the multiple RUs. In some implementations, the multiple RUs may be aggregated together for a single user (SU) transmission or for an orthogonal frequency-division multiple access (OFDMA) uplink or downlink scenario.

A method of wireless communications at a receiving wireless device is described. The method may include determining an allocation of a set of RUs for the receiving wireless device in a BSS, the set of RUs associated with two or more bandwidth segments of a bandwidth allocation; determining a first value of a parameter that indicates a tone configuration for a combination of the allocated set of RUs, the first value of the parameter for the combination different from each value of the parameter associated with a respective one RU of the allocated set of RUs; and receiving a set of coded bits of a data unit on the allocated set of RUs according to the tone configuration indicated by the first value of the parameter.

An apparatus for wireless communications at a receiving wireless device is described. The apparatus may include a processor, memory coupled with the processor, and instructions stored in the memory. The instructions may be executable by the processor to cause the apparatus to determine an allocation of a set of RUs for the receiving wireless device in a BSS, the set of RUs associated with two or more bandwidth segments of a bandwidth allocation; to determine a first value of a parameter that indicates a tone configuration for a combination of the allocated set of RUs, the first value of the parameter for the combination different from each value of the parameter associated with a respective one RU of the allocated set of RUs; and to receive a set of coded bits of a data unit on the allocated set of RUs according to the tone configuration indicated by the first value of the parameter.

Another apparatus for wireless communications at a receiving wireless device is described. The apparatus may include means for determining an allocation of a set of RUs for the receiving wireless device in a BSS, the set of RUs associated with two or more bandwidth segments of a bandwidth allocation; means for determining a first value of a parameter that indicates a tone configuration for a combination of the allocated set of RUs, the first value of the parameter for the combination different from each value of the parameter associated with a respective one RU of the allocated set of RUs; and means for receiving a set of coded bits of a data unit on the allocated set of RUs according to the tone configuration indicated by the first value of the parameter.

A non-transitory computer-readable medium storing code for wireless communications at a receiving wireless device is described. The code may include instructions executable by a processor to determine an allocation of a set of RUs for the receiving wireless device in a BSS, the set of RUs associated with two or more bandwidth segments of a bandwidth allocation; to determine a first value of a parameter that indicates a tone configuration for a combination of the allocated set of RUs, the first value of the parameter for the combination different from each value of the parameter associated with a respective one RU of the allocated set of RUs; and to receive a set of coded bits of a data unit on the allocated set of RUs according to the tone configuration indicated by the first value of the parameter.

In some examples of the method, apparatuses, and non-transitory computer-readable medium described herein, determining the first value of the parameter that indicates the tone configuration for the combination of the allocated set of RUs may include operations, features, means, or instructions for determining a total number of pilot tones for the set of RUs based on a sum of a number of pilot tones in each RU of the allocated set of RUs and receiving a set of pilot tones on the allocated set of RUs according to the tone configuration indicated by the first value of the parameter that indicates the tone configuration, in which the total number of pilot tones includes the first value of the parameter.

In some examples of the method, apparatuses, and non-transitory computer-readable medium described herein, determining the first value of the parameter that indicates the tone configuration for the combination of the allocated set of RUs may include operations, features, means, or instructions for selecting a subset of a set of pilot tones as data tones for the tone configuration and determining a number of available pilot tones based on a sum of a number of pilot tones in each RU of the allocated set of RUs less the subset of the pilot tones, in which the number of available pilot tones includes the first value of the parameter that indicates the tone configuration.

In some examples of the method, apparatuses, and non-transitory computer-readable medium described herein, determining the first value of the parameter that indicates the tone configuration for the combination of the allocated set of RUs may include operations, features, means, or instructions for determining one or more data tones may be unavailable for the set of coded bits based on a punctured bandwidth segment of the bandwidth allocation; selecting a subset of a set of pilot tones as data tones for the tone configuration based on the one or more unavailable data tones; and determining a number of available pilot tones based on a sum of a number of pilot tones in each RU of the allocated set of RUs less the subset of the set of pilot tones, in which the number of available pilot tones includes the first value of the parameter that indicates the tone configuration.

Some examples of the method, apparatuses, and non-transitory computer-readable medium described herein may further include operations, features, means, or instructions for determining one or more interleaving parameters based on the tone configuration, in which the set of coded bits may be received on the allocated set of RUs according to the one or more interleaving parameters.

In some examples of the method, apparatuses, and non-transitory computer-readable medium described herein, the one or more interleaving parameters may include one or more of a distance tone mapping value (for example, a arm value) or a number of columns for a row-column interleaving configuration.

Some examples of the method, apparatuses, and non-transitory computer-readable medium described herein may further include operations, features, means, or instructions for determining at least one bandwidth segment of the bandwidth allocation is punctured, in which the tone configuration is based on the at least one punctured bandwidth segment being unavailable for distributing the set of coded bits.

In some examples of the method, apparatuses, and non-transitory computer-readable medium described herein, determining the allocation of the set of RUs may include operations, features, means, or instructions for receiving, from a transmitting wireless device, an indication of an SU allocation of the bandwidth allocation and determining the allocation of the set of RUs within the SU allocation of the bandwidth allocation based on the determining that the at least one bandwidth segment of the bandwidth allocation is punctured.

In some examples of the method, apparatuses, and non-transitory computer-readable medium described herein in which the set of RUs includes a set of RUs for uplink OFDMA of the two or more bandwidth segments by an STA, operations, features, means, or instructions may be included for transmitting an indication of the allocation to the STA, in which the receiving wireless device includes an AP.

In some examples of the method, apparatuses, and non-transitory computer-readable medium described herein, determining the allocation of the set of RUs may include operations, features, means, or instructions for receiving, from an AP, an indication of the allocation of the set of RUs, in which the set of RUs includes a set of RUs for downlink OFDMA of the two or more bandwidth segments by an STA and the receiving wireless device includes the STA; and determining the allocation based on the received indication of the allocation.

Some examples of the method, apparatuses, and non-transitory computer-readable medium described herein may further include operations, features, means, or instructions for selecting a segment parser corresponding to a first frequency based on the bandwidth allocation.

In some examples of the method, apparatuses, and non-transitory computer-readable medium described herein, the first frequency may be 80 MHz, and the segment parser may be an 80 MHz segment parser.

Some examples of the method, apparatuses, and non-transitory computer-readable medium described herein may further include operations, features, means, or instructions for determining a noncontiguous bandwidth allocation including the two or more available bandwidth segments, in which the allocated set of RUs is based on the two or more available bandwidth segments.

In some examples of the method, apparatuses, and non-transitory computer-readable medium described herein, the parameter that indicates the tone configuration may include a distance to tone mapping value (for example, a arm value). In some examples, the distance to tone mapping value is four and the allocated set of resource units includes a twenty-six tone resource unit and a fifty-two tone resource unit. In some examples, the distance to tone mapping value is six and the allocated set of resource units includes a twenty-six tone resource unit and a one hundred six tone resource unit. In some examples, the distance to tone mapping value is eighteen and the allocated set of resource units includes a two hundred forty-two tone resource unit and a four hundred eighty-four tone resource unit.

In some examples of the method, apparatuses, and non-transitory computer-readable medium described herein, the parameter that indicates the tone configuration may include an identification of pilot tone locations in the allocated set of RUs.

A method of wireless communications at transmitting wireless device is described. The method may include determining an allocation of a set of RUs for the transmitting wireless device in a BSS, the set of RUs associated with two or more bandwidth segments of a bandwidth allocation; determining a first value of a parameter that indicates a tone configuration for a combination of the allocated set of RUs, the first value of the parameter for the combination different from each value of the parameter associated with a respective one RU of the allocated set of RUs; distributing a set of coded bits of a data unit to the allocated set of RUs according to the tone configuration indicated by the first value of the parameter; and transmitting the distributed set of coded bits on the allocated set of RUs.

An apparatus for wireless communications at transmitting wireless device is described. The apparatus may include a processor, memory coupled with the processor, and instructions stored in the memory. The instructions may be executable by the processor to cause the apparatus to determine an allocation of a set of RUs for the transmitting wireless device in a BSS, the set of RUs associated with two or more bandwidth segments of a bandwidth allocation; to determine a first value of a parameter that indicates a tone configuration for a combination of the allocated set of RUs, the first value of the parameter for the combination different from each value of the parameter associated with a respective one RU of the allocated set of RUs; to distribute a set of coded bits of a data unit to the allocated set of RUs according to the tone configuration indicated by the first value of the parameter; and to transmit the distributed set of coded bits on the allocated set of RUs.

Another apparatus for wireless communications at transmitting wireless device is described. The apparatus may include means for determining an allocation of a set of RUs for the transmitting wireless device in a BSS, the set of RUs associated with two or more bandwidth segments of a bandwidth allocation; means for determining a first value of a parameter that indicates a tone configuration for a combination of the allocated set of RUs, the first value of the parameter for the combination different from each value of the parameter associated with a respective one RU of the allocated set of RUs; means for distributing a set of coded bits of a data unit to the allocated set of RUs according to the tone configuration indicated by the first value of the parameter; and means for transmitting the distributed set of coded bits on the allocated set of RUs.

A non-transitory computer-readable medium storing code for wireless communications at transmitting wireless device is described. The code may include instructions executable by a processor to determine an allocation of a set of RUs for the transmitting wireless device in a BSS, the set of RUs associated with two or more bandwidth segments of a bandwidth allocation; to determine a first value of a parameter that indicates a tone configuration for a combination of the allocated set of RUs, the first value of the parameter for the combination different from each value of the parameter associated with a respective one RU of the allocated set of RUs; to distribute a set of coded bits of a data unit to the allocated set of RUs according to the tone configuration indicated by the first value of the parameter; and to transmit the distributed set of coded bits on the allocated set of RUs.

In some examples of the method, apparatuses, and non-transitory computer-readable medium described herein, determining the first value of the parameter that indicates the tone configuration for the combination of the allocated set of RUs may include operations, features, means, or instructions for determining a total number of pilot tones for the set of RUs based on a sum of a number of pilot tones in each RU of the allocated set of RUs and transmitting a set of pilot tones on the allocated set of RUs according to the tone configuration indicated by the first value of the parameter that indicates the tone configuration, in which the total number of pilot tones includes the first value of the parameter.

In some examples of the method, apparatuses, and non-transitory computer-readable medium described herein, determining the first value of the parameter that indicates the tone configuration for the combination of the allocated set of RUs may include operations, features, means, or instructions for selecting a subset of a set of pilot tones as data tones for the tone configuration and determining a number of available pilot tones based on a sum of a number of pilot tones in each RU of the allocated set of RUs less the subset of the pilot tones, in which the number of available pilot tones includes the first value of the parameter that indicates the tone configuration.

In some examples of the method, apparatuses, and non-transitory computer-readable medium described herein, determining the first value of the parameter that indicates the tone configuration for the combination of the allocated set of RUs may include operations, features, means, or instructions for determining one or more data tones may be unavailable for the set of coded bits based on a punctured bandwidth segment of the bandwidth allocation; selecting a subset of a set of pilot tones as data tones for the tone configuration based on the one or more unavailable data tones; and determining a number of available pilot tones based on a sum of a number of pilot tones in each RU of the allocated set of RUs less the subset of the set of pilot tones, in which the number of available pilot tones includes the first value of the parameter that indicates the tone configuration.

Some examples of the method, apparatuses, and non-transitory computer-readable medium described herein may further include operations, features, means, or instructions for determining one or more interleaving parameters based on the tone configuration, in which the set of coded bits may be distributed according to the one or more interleaving parameters.

In some examples of the method, apparatuses, and non-transitory computer-readable medium described herein, the one or more interleaving parameters may include one or more of a distance tone mapping value (for example, a arm value) or a number of columns for a row-column interleaving configuration.

Some examples of the method, apparatuses, and non-transitory computer-readable medium described herein may further include operations, features, means, or instructions for determining at least one bandwidth segment of the bandwidth allocation is punctured, in which the tone configuration is based on the at least one punctured bandwidth segment being unavailable for distributing the set of coded bits.

In some examples of the method, apparatuses, and non-transitory computer-readable medium described herein, determining the allocation of the set of RUs may include operations, features, means, or instructions for determining the allocation of the set of RUs within an SU allocation of the bandwidth allocation based on the determining that the at least one bandwidth segment of the bandwidth allocation is punctured and transmitting, to a receiving wireless device, an indication of the allocation of the set of RUs within the SU allocation.

In some examples of the method, apparatuses, and non-transitory computer-readable medium described herein, determining the allocation of the set of RUs may include operations, features, means, or instructions for receiving, from an AP, an indication of the allocation of the set of RUs, in which the set of RUs including a set of RUs for uplink OFDMA of the two or more bandwidth segments by an STA and the transmitting wireless device includes the STA, and determining the allocation based on the received indication of the allocation.

In some examples of the method, apparatuses, and non-transitory computer-readable medium described herein, the set of RUs may include a set of resource units for downlink OFDMA of the two or more bandwidth segments by an AP and may further include operations, features, means, or instructions for transmitting an indication of the allocation to an STA, in which the transmitting wireless device includes the AP.

Some examples of the method, apparatuses, and non-transitory computer-readable medium described herein may further include operations, features, means, or instructions for selecting a segment parser corresponding to a first frequency based on the bandwidth allocation.

In some examples of the method, apparatuses, and non-transitory computer-readable medium described herein, the first frequency may be 80 MHz, and the segment parser may be an 80 MHz segment parser.

Some examples of the method, apparatuses, and non-transitory computer-readable medium described herein may further include operations, features, means, or instructions for determining a noncontiguous bandwidth allocation including the two or more available bandwidth segments, in which the allocated set of RUs may be based on the two or more available bandwidth segments.

In some examples of the method, apparatuses, and non-transitory computer-readable medium described herein, the parameter that indicates the tone configuration may include a distance to tone mapping value (for example, a $D_{TM}$ value). In some examples, the distance to tone mapping value is four and the allocated set of resource units includes a twenty-six tone resource unit and a fifty-two tone resource unit. In some examples, the distance to tone mapping value is six and the allocated set of resource units includes a twenty-six tone resource unit and a one hundred six tone resource unit. In some examples, the distance to tone mapping value is eighteen and the allocated set of resource units includes a two hundred forty-two tone resource unit and a four hundred eighty-four tone resource unit.

In some examples of the method, apparatuses, and non-transitory computer-readable medium described herein, the parameter that indicates the tone configuration may include an identification of pilot tone locations in the allocated set of RUs.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
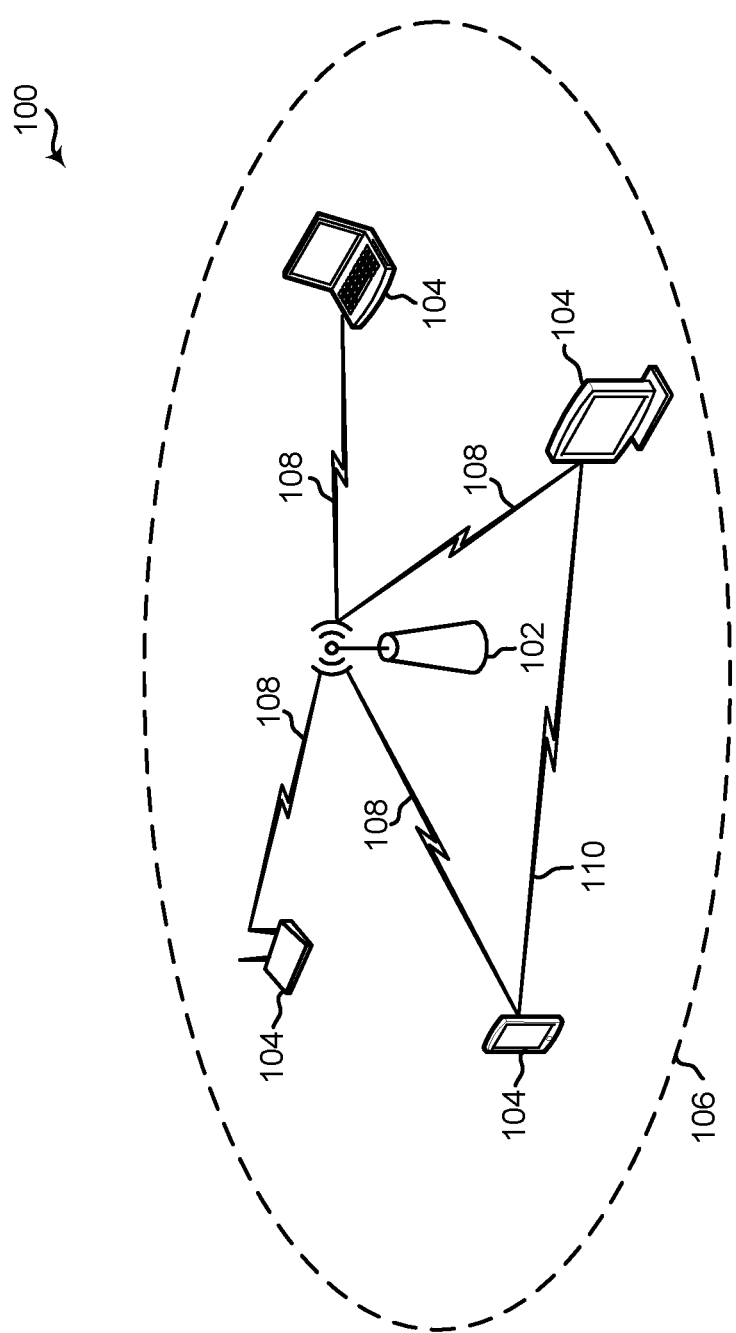
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to the distribution of coded bits to an allocated set of resource units (RUs) for flexible channel aggregation over a noncontiguous bandwidth. The noncontiguous bandwidth may correspond to one or more bandwidth segments of an extended basic service set (BSS), in which one or more non-primary or primary channels may be occupied by data traffic associated with overlapping BSSs (OBSSs) or incumbent technologies. Some implementations more specifically relate to a wireless communication device (such as an access point (AP) or a station (STA)) configured to aggregate a set of RUs as part of a communication (for example, a single-user transmission) with an associated recipient device. The wireless communication device may determine a data parsing and encoding scheme for distributing bits of a data payload across the aggregated set of RUs. For example, the wireless communication device may determine a value of a parameter for distributing the bits of the data payload across the aggregated set of RUs based on the aggregated set of RUs, in which the value of the parameter is different from values of the same parameter for each of the RUs that constitute the aggregated set of RUs. In some implementations, the parameter may include a tone mapping distance ($D_{TM}$) value, an identification of pilot tone location in the aggregated set of RUs, or both.

Additionally, when determining the value of the parameter for distributing the bits of the data payload, the wireless communication device may determine a total number of pilot tones or a number of available pilot tones in the aggregated set of RUs. For example, the wireless communication device may sum the number of pilot tones in each RU of the aggregated set of RUs, in which the value of the parameter is the total number of pilot tones from each of the RUs. Additionally or alternatively, the wireless communication device may select a subset of the pilot tones in the aggregated set of RUs and may reuse the subset of pilot tones as data tones for the distribution of the bits of the data payload. In some implementations, the wireless communication device may reuse the subset of pilot tones as data tones based on one or more of the data tones being punctured and unavailable for the distribution of the bits of the data payload.

Particular implementations of the subject matter described in this disclosure can be implemented to realize one or more of the following potential advantages. In some implementations, the described techniques can be used to enhance signaling capability for communications associated with high efficiency (HE) WLAN operations (such as defined in IEEE 802.11ax) or extremely high throughput (EHT) operations (such as defined in IEEE 802.11be). The enhanced signaling capability may more specifically relate to single-user transmissions and promote increased spectral efficiency and signaling throughput over non-adjacent RUs within a wireless channel.

FIG. 1 shows a block diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an AP 102 and multiple STAs 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a BSS identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs). In some examples, one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct wireless link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands. In some examples, multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
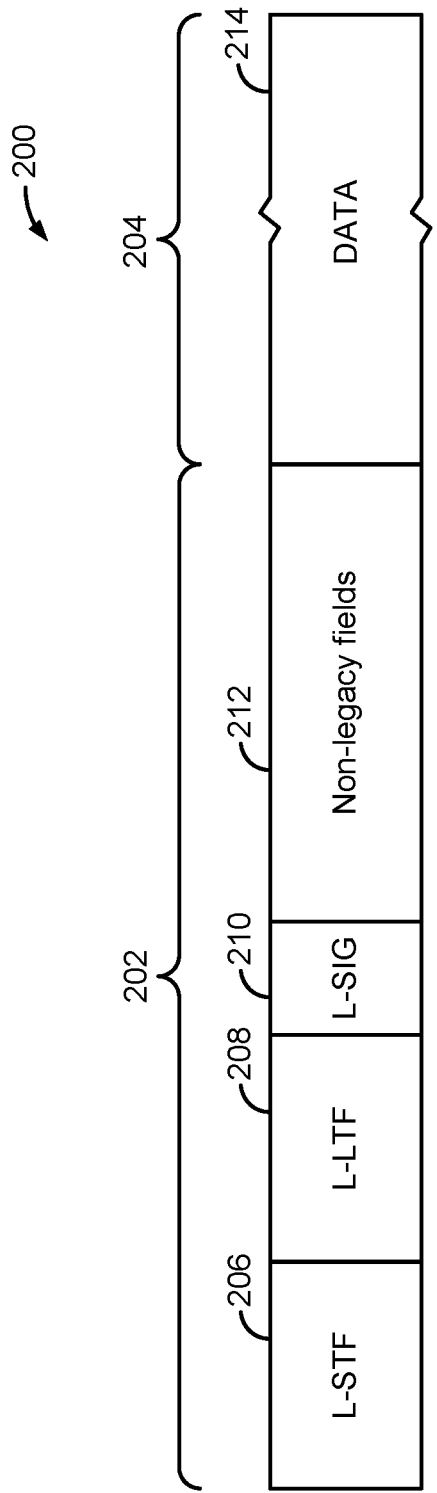
FIG. 2A shows an example protocol data unit (PDU) usable for communications between an access point (AP) and a number of stations (STAs)

FIG. 2A shows an example protocol data unit (PDU) 200 usable for wireless communication between an AP and one or more STAs. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol standards.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
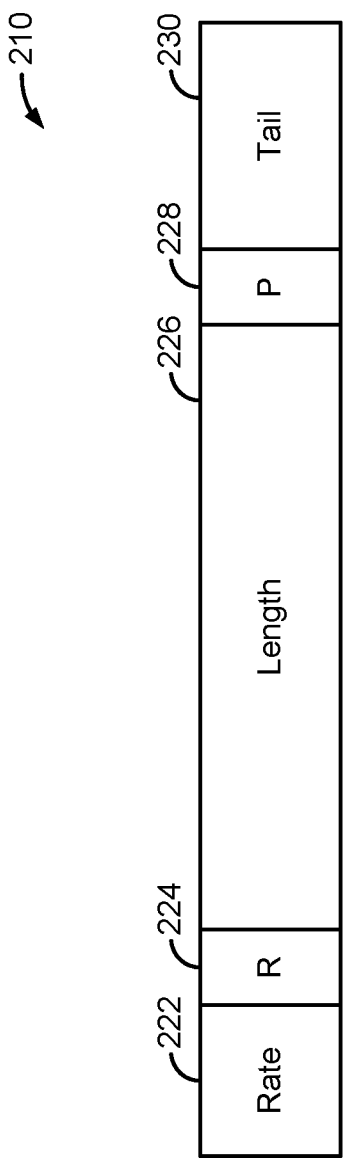
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3A:
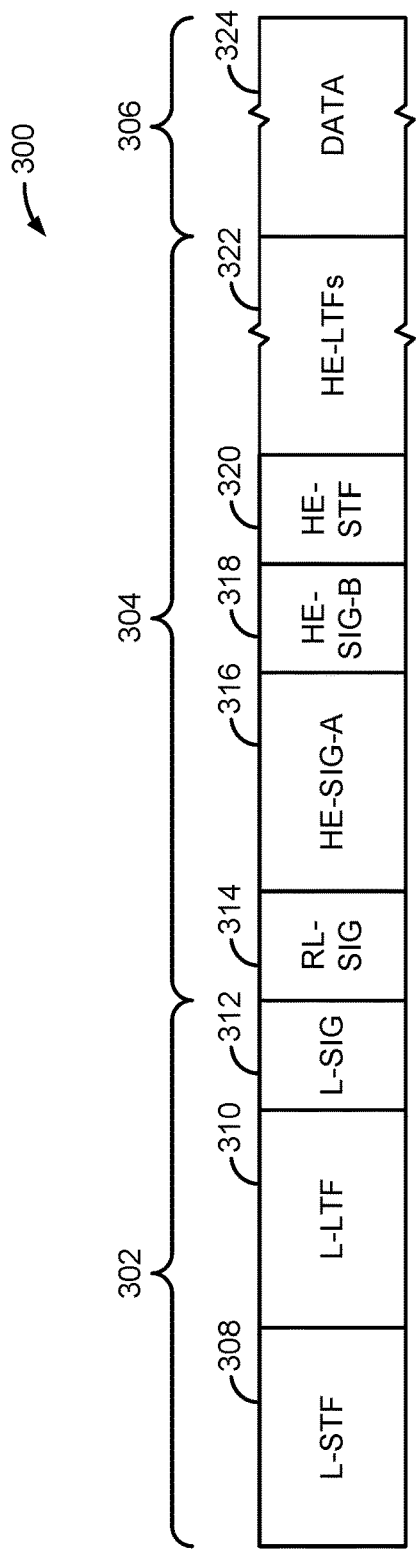
FIG. 3A shows an example physical layer (PHY) preamble usable for communications between an AP and each of a number of STAs.

FIG. 3A shows another example PDU 300 usable for wireless communication between an AP and a number of STAs. The PDU 300 may be used for MU-OFDMA or MU-MIMO transmissions. The PDU 300 includes a PHY preamble including a legacy portion 302 and a non-legacy portion 304. The PDU 300 may further include a PHY payload 306 after the preamble, for example, in the form of a PSDU including a DATA field 324. The legacy portion 302 of the preamble includes L-STF 308, L-LTF 310, and L-SIG 312. The non-legacy portion 304 of the preamble and the DATA field 374 may be formatted as a HE WLAN preamble and frame, respectively, in accordance with the IEEE 802.11ax amendment to the IEEE 802.11 wireless communication protocol standard. The non-legacy portion 304 includes a repeated legacy signal field (RL-SIG) 314, a first HE signal field (HE-SIG-A) 316, a second HE signal field (HE-SIG-B) 318 encoded separately from HE-SIG-A 316, an HE short training field (HE-STF) 320 and a number of HE long training fields (HE-LTFs) 322. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, HE-SIG-B 318 may be unique to each 20 MHz channel and may target specific STAs 104.

RL-SIG 314 may indicate to HE-compatible STAs 104 that the PPDU is an HE PPDU. An AP 102 may use HE-SIG-A 316 to identify and inform multiple STAs 104 that the AP has scheduled UL or DL resources for them. HE-SIG-A 316 may be decoded by each HE-compatible STA 104 served by the AP 102. HE-SIG-A 316 includes information usable by each identified STA 104 to decode an associated HE-SIG-B 318. For example, HE-SIG-A 316 may indicate the frame format, including locations and lengths of HE-SIG-Bs 318, available channel bandwidths, modulation and coding schemes (MCSs), among other possibilities. HE-SIG-A 316 also may include HE WLAN signaling information usable by STAs 104 other than the number of identified STAs 104.

HE-SIG-B 318 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 318 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 324.

Figure 3B:
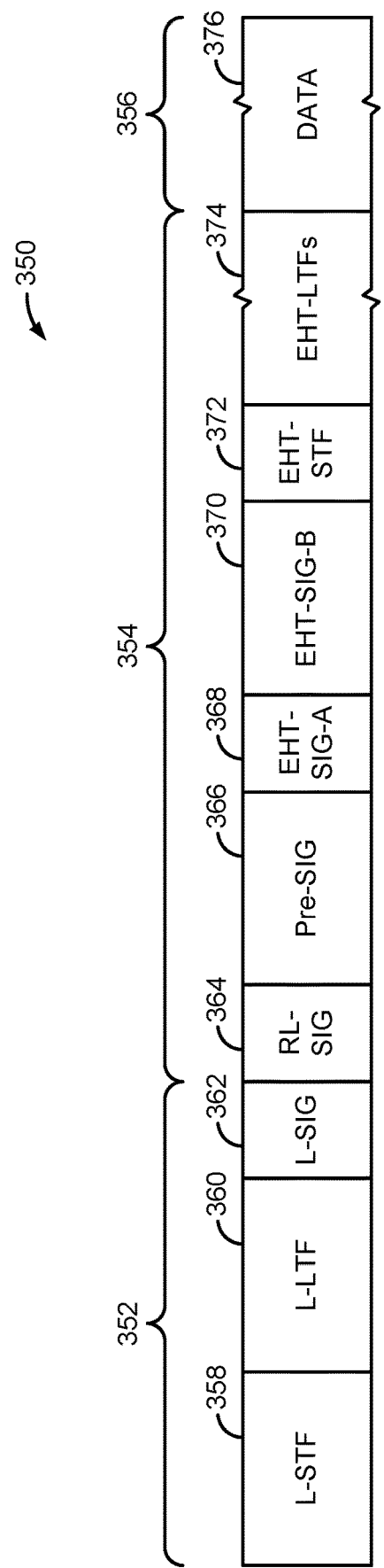
FIG. 3B shows another example PHY preamble usable for communications between an AP and each of a number of stations.

FIG. 3B shows an example PPDU 350 usable for wireless communication between an AP and a number of STAs according to some implementations. The PPDU 350 may be used for SU, MU-OFDMA or MU-MIMO transmissions. The PPDU 350 includes a PHY preamble including a legacy portion 352 and a non-legacy portion 354. The PPDU 350 may further include a PHY payload 356 after the preamble, for example, in the form of a PSDU including a DATA field 376. The legacy portion 352 includes L-STF 358, L-LTF 360, and L-SIG 362. The non-legacy portion 354 of the preamble and the DATA field 376 may be formatted as an EHT WLAN preamble and frame, respectively, in accordance with the IEEE 802.11be amendment to the IEEE 802.11 wireless communication protocol standard, or may be formatted as a preamble and frame, respectively, conforming to any later (post-HE) version of a new wireless communication protocol conforming to a future IEEE 802.11 wireless communication protocol standard or other standard.

The non-legacy portion 354 of the preamble includes a second signal field (referred to herein as "Pre-SIG") 366, a third signal field (referred to herein as "EHT-SIG-A" although it may be structured as, and carry version-dependent information for, other wireless communication protocol versions beyond EHT) 368, and a fourth signal field (referred to herein as "EHT-SIG-B" although it may be structured as, and carry version-dependent information for, other wireless communication protocol versions beyond EHT) 370. The non-legacy portion 354 further includes an additional short training field (referred to herein as "EHT-STF" although it may be structured as, and carry version-dependent information for, other wireless communication protocol versions beyond EHT) 372 and a number of additional long training fields (referred to herein as "EHT-LTFs" although they may be structured as, and carry version-dependent information for, other wireless communication protocol versions beyond EHT) 374. Like L-STF 358, L-LTF 360, and L-SIG 362, the information in Pre-SIG 366 and EHT-SIG-A 368 may be duplicated and transmitted in each of the component 20 MHz channels in instances involving the use of a bonded channel. In some implementations, EHT-SIG-A 368 may additionally or alternatively carry information in one or more non-primary 20 MHz channels that is different than the information carried in the primary 20 MHz channel. EHT-SIG-B 370 may be unique to each 20 MHz channel and, as described above, may target specific STAs 104. The non-legacy portion 354 of the preamble may or may not include a repeated legacy signal field (RL-SIG) 364 after L-SIG 362 and before Pre-SIG 366.

EHT-SIG-A 368 may include one or more jointly encoded symbols and may be encoded in a different block from the block in which Pre-SIG 366 is encoded. EHT-SIG-A 368 may be used by an AP to identify and inform multiple STAs 104 that the AP has scheduled UL or DL resources. EHT-SIG-A 368 may be decoded by each compatible STA 104 served by the AP 102. EHT-SIG-A 368 includes information usable by the identified STAs 104 to decode an associated EHT-SIG-B 370. EHT-SIG-A 368 may generally be used by a receiving device to interpret bits in EHT-SIG-B 370 or DATA field 376. For example, EHT-SIG-A 368 may indicate the locations and lengths of EHT-SIG-Bs 370 in the various component channels, available channel bandwidths, and modulation and coding schemes (MCSs), among other possibilities. EHT-SIG-A 368 may further include a cyclic redundancy check (CRC) (for example, four bits) and a tail (for example, 6 bits) that may be used for binary convolutional code (BCC).

EHT-SIG-B 370 may include multiple symbols that may be encoded in a different block from the block in which EHT-SIG-A 368 is encoded. In some other implementations, EHT-SIG-A 368 may be jointly encoded with some or all of EHT-SIG-B 370. For example, EHT-SIG-A 368 may be jointly encoded with a first portion of EHT-SIG-B 370 that includes information common to all users served by the PPDU 350. EHT-SIG-B 370 may carry STA-specific scheduling information such as, for example, per-user MCS values and per-user RU allocation information. EHT-SIG-B 370 may generally be used by a receiving device to interpret bits in the DATA field 376. In the context of DL MU-OFDMA, such information enables the respective STAs 104 to identify and decode corresponding RUs in the associated DATA field 376. Each EHT-SIG-B 370 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include, for example, two user fields that contain information for two respective STAs to decode their respective RU payloads.

Pre-SIG 366, and RL-SIG 364 if present, may indicate to EHT- or later version-compliant STAs 104 that the PPDU 350 is an EHT PPDU or a PPDU conforming to another non-legacy wireless communication protocol version. For example, Pre-SIG 366 may be used by a receiving device to interpret bits in one or more of EHT-SIG-A 368, EHT-SIG-B 370 or the DATA field 376. In some implementations, Pre-SIG 366 may include a reserved bit that indicates whether the PPDU 350 is, for example, compliant with EHT or a later version (for example, after IEEE 802.11ax) of the IEEE 802.11 family of wireless communication protocol standards or other standards. In some implementations, Pre-SIG 366 includes a version field that includes at least one bit indicating the particular wireless communication protocol version to which the PPDU 350 conforms.

Figure 4:
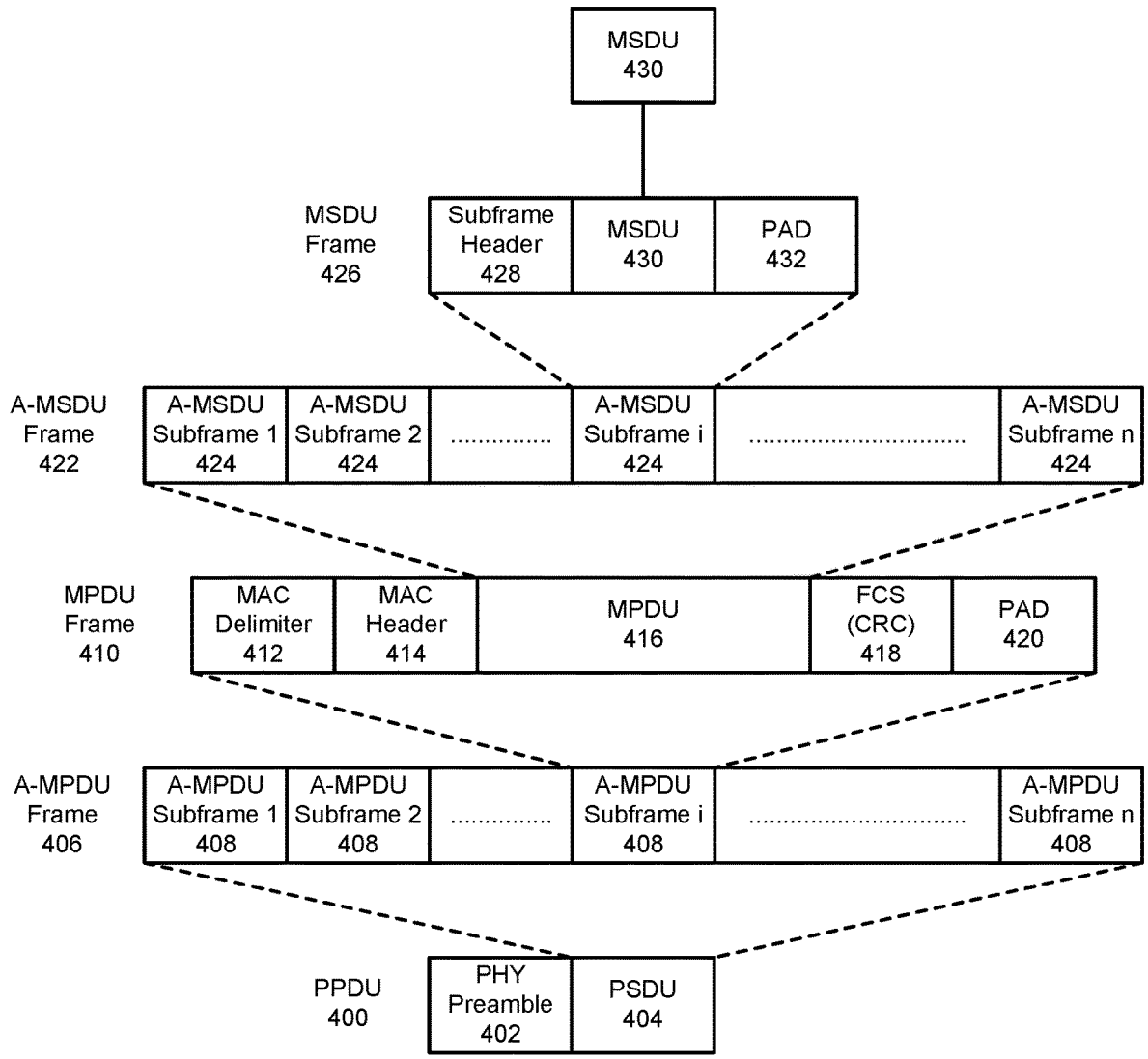
FIG. 4 shows an example physical layer convergence protocol (PLCP) protocol data unit (PPDU) usable for communications between an AP and a number of STAs.

FIG. 4 shows an example PPDU 400 usable for communications between an AP 102 and one or more STAs 104. As described above, each PPDU 400 includes a PHY preamble 402 and a PSDU 404. Each PSDU 404 may represent (or "carry") one or more MPDUs 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which comprises the data portion ("payload" or "frame body") of the MPDU frame 410. Each MPDU frame 410 may also include a frame check sequence (FCS) field 418 for error detection (for example, the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include a number of fields containing information that defines or indicates characteristics or attributes of data encapsulated within the MPDU 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration and enables the receiving device to establish its network allocation vector (NAV). The MAC header 414 also includes a number of fields indicating addresses for the data encapsulated within the MPDU 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

APs and STAs that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas. APs and STAs that include multiple antennas may also support space-time block coding (STBC). With STBC, a transmitting device also transmits multiple copies of a data stream across a number of antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams (described below). The $N_{SS}$ spatial streams may be mapped to a number $N_{STS}$ of space-time streams, which are then mapped to $N_{Tx}$ transmit chains.

APs and STAs that include multiple antennas may also support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are then separately encoded and transmitted in parallel via the multiple $N_{Tx}$ transmit antennas. If the transmitting device includes $N_{Tx}$ transmit antennas and the receiving device includes $N_{Rx}$ receive antennas, the maximum number $N_{SS}$ of spatial streams that the transmitting device can simultaneously transmit to the receiving device is limited by the lesser of $N_{Tx}$ and $N_{Rx}$. In some implementations, the AP 102 and STAs 104 may be able to implement both transmit diversity as well as spatial multiplexing. For example, in instances in which the number $N_{SS}$ of spatial streams is less than the number $N_{Tx}$ of transmit antennas, the spatial streams may be multiplied by a spatial expansion matrix to achieve transmit diversity.

APs and STAs that include multiple antennas may also support beamforming. Beamforming refers to the focusing of the energy of a transmission in the direction of a target receiver. Beamforming may be used both in a single-user context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). To perform beamforming, a transmitting device, referred to as the beamformer, transmits a signal from each of multiple antennas. The beamformer configures the amplitudes and phase shifts between the signals transmitted from the different antennas such that the signals add constructively along particular directions towards the intended receiver, which is referred to as a beamformee. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. The beamformee may then perform measurements for each of the $N_{Tx} \times N_{Rx}$ sub-channels corresponding to all of the transmit antenna and receive antenna pairs based on the sounding signal. The beamformee generates a feedback matrix based on the channel measurements and, typically, compresses the feedback matrix before transmitting the feedback to the beamformer. The beamformer may then generate a precoding (or "steering") matrix for the beamformee based on the feedback and use the steering matrix to precode the data streams to configure the amplitudes and phase shifts for subsequent transmissions to the beamformee.

As described above, a transmitting device may support the use of diversity schemes. When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions by increasing the number of transmit antennas. This is especially advantageous in MU transmission contexts in which it is particularly important to reduce inter-user interference.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize MU-MIMO and MU orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs) and may assign each AID (and thus each STA 104) one or more RUs that can be used to send UL traffic to the AP 102. The AP also may designate one or more random access (RA) RUs that unscheduled STAs 104 may contend for.

Figure 5:
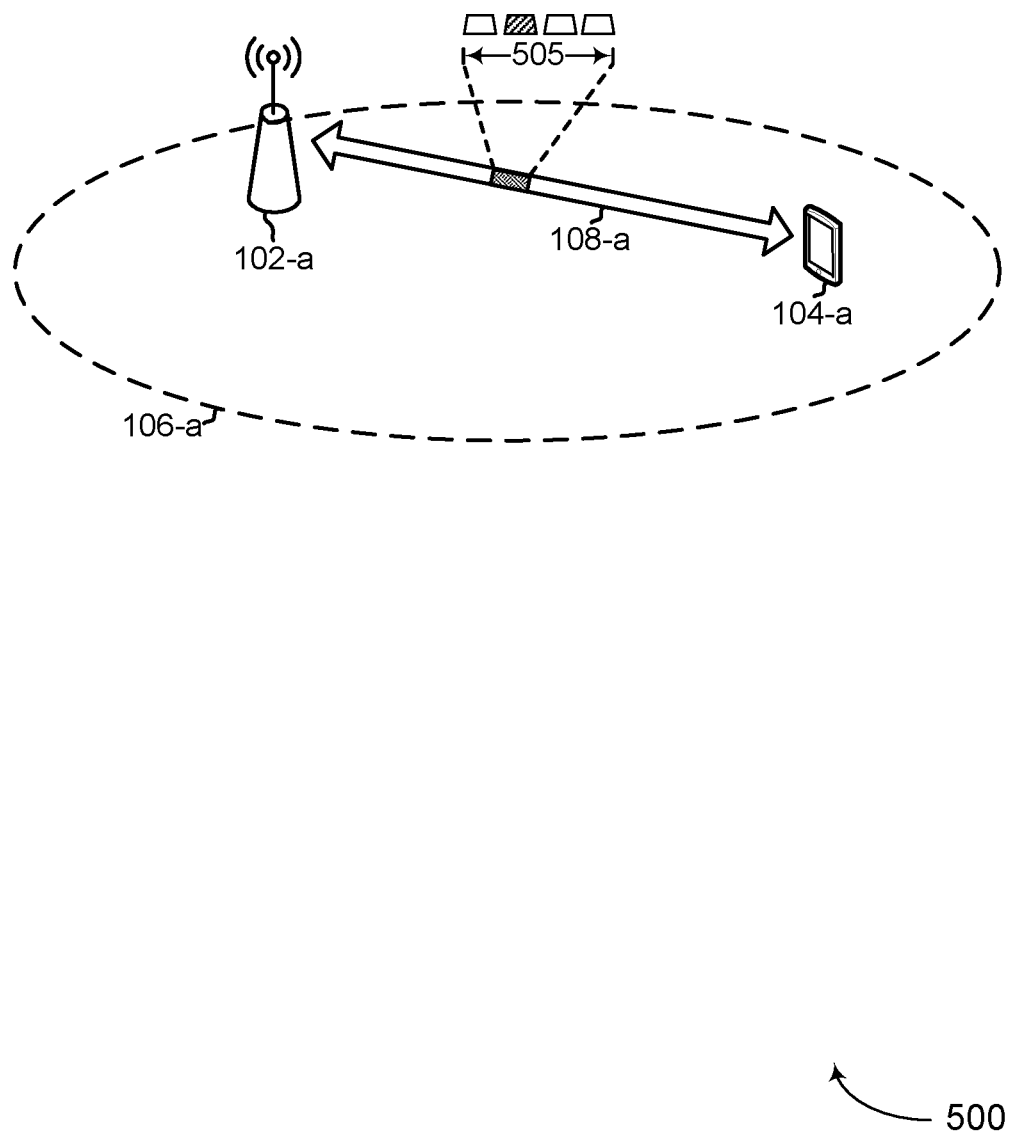
FIG. 5 shows an example of a wireless communications system for a parser and interleaving parameter design for resource unit (RU) aggregation.

FIG. 5 illustrates an example of a wireless communication system 500 that supports a parser and interleaving parameter design for RU aggregation in accordance with aspects of the present disclosure. The wireless communication system 500 may include an AP 102-*a* and an STA 104-*a*, which may be examples of the corresponding devices described with reference to FIG. 1. For example, the AP 102-*a* and the STA 104-*a* may correspond to a BSS managed by the AP 102-*a*. In some examples, the BSS may include one or more additional sets of STAs 104 within range of the AP 102-*a* that have established association.

The AP 102-*a* may support an example coverage area 106-*a*, which may represent a BSS for the wireless communication system 500. The AP 102-*a* and the STA 104-*a* may communicate via a communication link (or "Wi-Fi link") 108-*b a*. In some examples, the communications may correspond to multi-user communications; that is, concurrent transmissions from one device to each of multiple devices (for example, multiple simultaneous downlink communications from the AP 102-*a* to corresponding STAs 104) or concurrent transmissions from multiple devices to a single device (for example, multiple simultaneous uplink transmissions from corresponding STAs 104 to the AP 102-*a*). To support the multi-user transmissions, the AP 102-*a* and one or more STAs 104 may utilize MU-MIMO and MU-OFDMA techniques. In other examples, as shown, the communication may correspond to single-user communications and may include sequential communications between the AP 102-*a* and the STA 104-*a*. To support the single-user transmissions, the AP 102-*a* and the STA 104-*a* may utilize single-user MIMO (SU-MIMO) and single-user OFDMA (SU-OFDMA) techniques.

In some examples, the wireless communication system 500 may include a resource deployment that is used for Wi-Fi technology that overlaps with resources or a resource deployment associated with one or more incumbent technologies (for example, 4G systems such as LTE systems and 5G systems which may be referred to as NR systems). The AP 102-*a* and the STA 104-*a* may be HE supported devices and may be configured for 802.11ax, 802.11be, or EHT operation over the resource deployment. For example, the AP 102-*a* and the STA 104-*a* may transmit single-user PPDUs in an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Additionally, or alternatively, the AP 102-*a* and the STA 104-*a* may communicate in other frequency bands, such as the 6 GHz band, which may support both licensed and unlicensed communications. Each of the frequency bands may include multiple sub-bands or frequency channels for carrying the single-user PPDUs and spanning a minimum bandwidth of 20 MHz.

Based on the supported HE operation, the AP 102-*a* and the STA 104-*a* may transmit single-user PPDUs over an extended BSS bandwidth 505 that may be formed through channel bonding. Based on the channel bonding, the extended BSS bandwidth 505 may span a frequency spectrum of 40 MHz, 80 MHz, 160 MHz, or 320 MHz. In some examples, data traffic associated with the incumbent technologies or with nearby AP 102 and STA 104 communications within an OBSS may occupy frequency resources of the extended BSS bandwidth 505. As a result, the AP 102-*a* and the STA 104-*a* may have difficulty discovering a contiguous idle channel (for example, a contiguous 80 MHz, 160 MHz, or 320 MHz channel) for HE or EHT operations over the communication link 108-*a*.

In some implementations, the AP 102-*a* and the STA 104-*a* may support an OFDMA mode managed by the AP 102-*a* or a preamble puncturing mode in which a primary or non-primary frequency channel of the extended BSS bandwidth 505 may be zeroed out as part of the included PHY preamble for PPDUs. In addition, the AP 102-*a* and the STA 104-*a* may support flexible channel aggregation for transmitting single-user PPDUs over a non-contiguous frequency channel included within the extended BSS bandwidth 505. That is, multiple RUs may be assigned to a same user, in which the multiple RUs may include a single user transmission on a punctured bandwidth that includes multiple RUs that are contiguous, or noncontiguous, or both. Additionally, or alternatively, multiple RUs may be assigned to multiple users for MU-OFDMA transmissions with each user assigned to have multiple RUs that are contiguous, or noncontiguous, or both. For example, the available frequency spectrum of the extended BSS bandwidth 505 may be divided into multiple adjacent or nonadjacent RUs each including a number of different frequency subcarriers ("tones"). Different RUs may be allocated or assigned by the AP 102-*a* at particular times. The sizes and distributions of the RUs may be referred to as an RU allocation. As part of the flexible channel aggregation, the AP 102-*a* may allocate multiple non-adjacent RUs as part of an RU aggregation. That is, the STA 104-*a* may be assigned multiple adjacent or non-adjacent RUs for signaling over a frequency channel of the RU aggregation.

In order to support the RU aggregation, the AP 102-*a* or STA 104-*a* may determine a data parsing and encoding scheme for distributing and encoding information bits of a PSDU data payload. For example, as part of a downlink single-user PPDU, the AP 102-*a* may identify at least a data rate field, length field, and tail field for the PPDU. Based on the identifying, the AP 102-*a* may calculate a number of OFDM symbols included in the data field assigned for the STA 104-*a*.

Based on a minimum number of OFDM symbols ($N_{sym\_init}$), the AP 102-*a* may determine a number, such as a total number of data payloads ($N_{pld}$). The variable, $N_{pld}$, may be based on the RU aggregation and correspond to the product of $N_{sym\_init}$ and a number of data bits per OFDM symbol ($N_{DBPS}$), as indicated within a data rate field of the PPDU. Further, the AP 102-*a* may then determine a number of symbols based on low-density parity-check (LDPC) encoding parameters of the one or more RUs. For example, the AP 102-*a* may determine a binary bit indication (flag) for indicating if the LDPC codewords will overflow into one or more additional OFDM symbols ($N_{ldpc\_ext}$). In the case that an extra symbol is used for any LDPC encoded RU, all LDPC RUs of the aggregation may add an extra symbol. In addition, if both LDPC and binary convolutional code (BCC) encoding are allowed for different RUs of the RU aggregation and if an extra symbol is added for the LDPC encoded RUs, extra padding bits may be inserted for the BCC encoding in order to support timing alignment.

The AP 102-*a* may calculate a number of distributed payload bits for each available RU of the RU aggregation. The distributed payload bits may include service bits, information bits contained within the PSDU, and padding bits for transmission. In some examples, the AP 102-*a* may assume that padding bits included at the MAC layer (as part of an MPDU) and at the PHY layer (as part of a PPDU) will be provided to an encoder on an as-needed basis for an equal number of OFDM symbols to support timing alignment. For each RU of the aggregation, the AP 102-*a* may determine the number of distributed data bits based on the data rate the RU can support. For example, the AP 102-*a* may determine a number of distributed payload bits for an RU of the flexible channel aggregation. The AP 102-*a* may determine a minimum number of symbols ($N_{sym\_unit}$) included in the data field. The AP 102-*a* may then determine a number of coded bits ($N_{bpscs,i}$) for each carrier spanning a spatial stream or modulation order of the respective RU and identify a code rate ($R_i$). In some implementations, the AP 102-*a* may determine a data rate of the respective RU and identify a number of tail bits that may be appended to the data bits following the data parsing and encoding scheme.

Following the one or more calculations described above, a parser and encoder associated with the AP 102-*a* may distribute the information bits included in the data payload to each RU of the aggregation. In some implementations, the AP 102-*a* distribute the information bits to each RU in a sequential manner. As part of the sequential distribution, a single information bit may be distributed to a respective RU based on a cyclical process (such as in a round robin fashion), with a first bit being distributed to a first RU of the aggregation followed by a subsequent bit being distributed to an additional RU. In the case that an RU of the allocation (such as an RU with a smaller number of available resources) is filled with the distributed bits, one or more additional RUs of the aggregation may receive the remaining bits for distribution. In other implementations, the AP 102-*a* may distribute the information bits by filling an RU of the aggregation with the distributed bits prior to distributing to one or more additional RUs. In addition, the AP 102-*a* may append tail bits to the data bits of the distribution following the data parsing and encoding scheme.

Although the described features are provided with reference to a downlink single-user PPDU transmission by the AP 102-*a*, a STA 104-*a* may provide similar operations as part of an uplink single-user communication. For OFDMA, AP 102-*a* may perform resource scheduling, multiple users may do OFDMA either in downlink or uplink with each user handling at least one RU and RU aggregation. For example, the STA 104-*a* may perform uplink single-user PPDU transmission as part of a preamble puncturing mode in which a non-primary or primary frequency channel of the extended BSS bandwidth 505 may be zeroed out as part of the included PHY preamble (that is, at least a portion of the BSS bandwidth 505 may be unavailable for communications). The STA 104-*a* may calculate a number of OFDM symbols in a data field of the PPDU, calculate a number of distributed payload bits for each RU of an aggregation, and distribute the payload bits for transmission over the one or more RUs of the flexible channel.

A wireless communication device (for example, the AP 102-*a*, the STA 104-*a*) may implement the data parsing and encoding scheme for distributing and encoding information bits of a PSDU data payload. In some examples, the wireless device may encode the set of information bits at the PHY layer and subsequently may distribute the encoded set of information bits based on a data parsing scheme. The encoding may correspond to a joint encoding in the RU aggregation, in which each RU may have the same coding rate. In other examples, the wireless device may distribute the information bits of the data payload to the multiple RUs of the aggregation and perform separate encoding and interleaving for each RU. For example, the MAC layer of the wireless device may perform data parsing among multiple RUs and may deliver multiple PSDUs to the PHY layer for encoding. Additionally, or alternatively, the MAC layer may pass all the information bits in a single PSDU, in which the PHY layer may distribute the information bits to the multiple RUs for subsequent encoding and interleaving.

Figure 6:
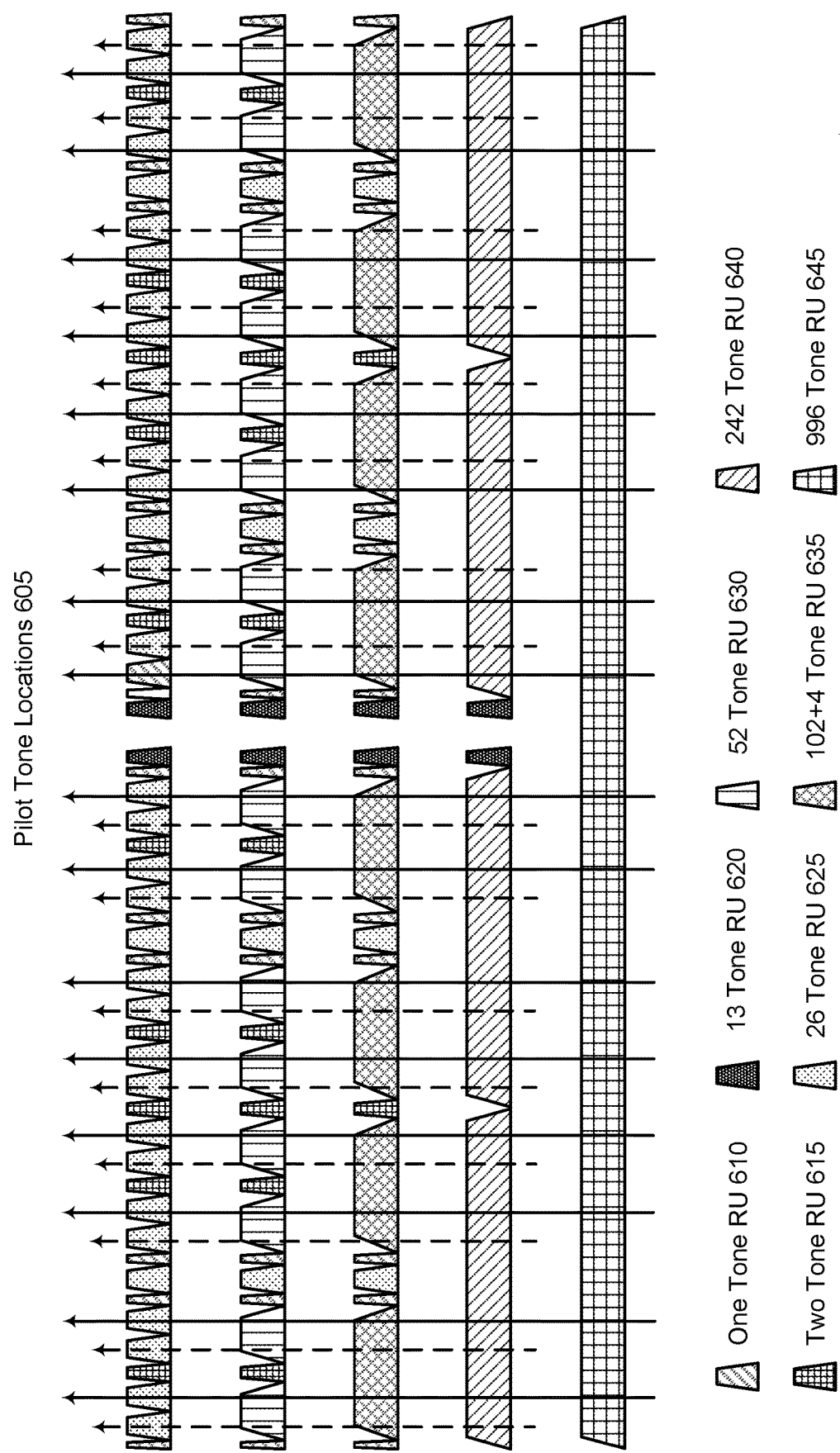
FIG. 6 shows an example of a tone plan for a parser and interleaving parameter design for RU aggregation.

FIG. 6 illustrates an example of a tone plan 600 that supports a parser and interleaving parameter design for RU aggregation in accordance with aspects of the present disclosure. In some implementations, an AP 102 and an STA 104 may use the tone plan 600 for data parsing and distributing an encoded set of information bits to data tones of one or more RUs of the tone plan 600. For example, the tone plan 600 may include one or more one tone RUs 610 (for example, used for transmitting control information, synchronization information, or as guard periods), one or more two tone RUs 615 (for example, used for transmitting control information, synchronization information, or as guard periods), one or more 13 tone RUs 620 (for example, used for transmitting control information, synchronization information, or as guard periods), one or more 26 tone RUs 625, one or more 52 tone RUs 630, one or more 102+4 RUs 635 (for example, 106 tone RUs), one or more 242 tone RUs 640, and a 996 tone RU 645. In some implementations, tone plan 600 may be used for an HE system using 80 MHz (that is, an HE80 system).

Additionally, the AP 102 and the STA 104 may communicate the coded bits based on an RU aggregation scheme that combines two or more of the different RUs indicated above in the tone plan 600 to form a single data unit (for example, single message) communicated between the AP 102 and the STA 104. For example, the coded bits may be distributed to the one or more RUs in an aggregated set of RUs based on a set of pilot tone locations 605 for the tone plan 600.

In some implementations, RU aggregation may be applicable for both OFDMA cases and for SU transmissions. For example, for an OFDMA case, the AP 102 may be responsible for resource allocation (such as for distributing the coded bits) for both downlink and uplink transmissions. For downlink transmissions, the STA 104 may be a receiving wireless communication device receiving data on multiple RUs from the AP 102. For uplink transmissions, the STA 104 may be a transmitting wireless communication device transmitting data on multiple RUs to the AP 102. Additionally or alternatively, for an SU transmission, RU aggregation may be due to bandwidth puncturing (that is, otherwise the SU transmission would be a transmission over the entire bandwidth). The SU transmission may be either a downlink or an uplink transmission. Accordingly, in either case, a transmitter (for example, the AP 102 for a downlink transmission or the STA 104 for an uplink transmission) may indicate or signal the resource allocation prior to transmitting the downlink or uplink transmission.

Additionally, one PSDU may be configured per STA (for example, by the AP 102). In some implementations, one LDPC encoder may be used for a single MCS case. Additionally, different RU combinations may be allowed for aggregations of small RUs and larger RUs (for example, up to a 160 MHz bandwidth). In some implementations, larger RU aggregation combinations may or may not be supported for larger sized bandwidths (for example, 240 MHz or 320 MHz). Techniques may be provided on how to process these RU aggregations in addition to signaling the RU aggregations. For example, a segment parser and interleaving parameter design for the RU combinations of the RU aggregations may be indicated.

Different parameters for BCC and LDPC interleaving for various RU sizes are given according to Table 1 below (for example, for 802.11ax OFDMA).

TABLE 1

BCC and LDPC Interleaving Parameters

| RU Size | $N_{SD}$ | $N_{COL}$ | $N_{ROT}$ ($N_{SS} \leq 4$) | $N_{ROT}$ ($N_{SS} > 4$) | LDPC $D_{TM}$ | Reference |
|---|---|---|---|---|---|---|
| 26 | 24 | 8 | 2 | 1 | 1 | 11ah 1 MHz |
| 52 | 48 | 16 | 11 | 6 | 3 | 11a & 11ac 20 MHz; $D_{TM} = N_{SD}/N_{COL}$ |
| 106 | 102 | 17 | 29 | 13 | 6 | 11ac 40 MHz; $D_{TM} = N_{SD}/N_{COL}$ |
| 242 | 234 | 26 | 58 | 28 | 9 | 11ac 80 MHz |
| 484 | 468 |  | No BCC |  | 12 | Option 1: No BCC; no segment parsing |
|  |  | 26 | 58 | N/A | 9 | Option 2: 11ac 160/80 + 80 MHz, but $N_{SS} \leq 4$ |
|  |  | 39 | 116 | 56 | 12 | Option 3: without segment parsing; $D_{TM} = N_{SD}/N_{COL}$ |
| 996 | 980 |  | No BCC |  | 20 |  |
| 996 × 2 | 980 × 2 |  | No BCC |  | 20 | Segment parsing + 996-tone RU design |

In Table 1, the parameter $N_{SD}$ may represent the number of data subcarriers for the respective RU size (that is, the number of tones in the respective RU size that are not pilot tones, in which the number of tones is available for distributing coded bits of a data unit). The parameter $N_{COL}$ may represent a number of columns for a BCC interleaving. The parameter $N_{ROT}$ may represent a frequency rotation parameter for the BCC interleaving. The, and the parameter $N_{SS}$ may represent a number of spatial streams for the BCC interleaving. The parameter $D_{TM}$ may represent a tone mapping distance for distributing the coded bits for an LDPC encoder to data tones of the respective RUs (for example, tone mapping distance).

Different RU aggregation combinations may be used for distributing and transmitting coded bits from a transmitting wireless communication device (for example, the AP 102) to a receiving wireless communication device (for example, the STA 104). For example, the different RU aggregation combinations may be used for SU transmissions (for example, when puncturing occurs of one or more RUs) or for OFDMA cases. In some implementations, the different RU aggregation combinations may include combining a first RU of a first size and at least a second RU of a second size (greater than two RUs of different or same sizes may be combined for an RU aggregation combination). For example, the RU aggregation combination may include combining a 26 tone sized RU and a 106 tone sized RU (RU26+106 aggregation combination), a 484 tone sized RU and a 242 tone sized RU (RU484+242 aggregation combination), a 26 tone sized RU and a 52 tone sized RU (RU26+52 aggregation combination), a 484 tone sized RU and a 242 tone sized RU and a 484 tone sized RU and a 242 tone sized RU (RU484+242+484+242 aggregation combination), or additional combinations of different sized RUs not listed herein.

Based on the various possible RU aggregation combinations, different segment parsers may be desired for distributing coded bits for the different RU aggregation combinations. However, using a variety of segment parsers for the distribution of coded bits based on a corresponding RU aggregation combination may increase computational complexity at the AP 102 or the STA 104 or both. For example, the STA 104 may need to know the different types of segment parsers that can be used by the AP 102 for distributing the coded bits to identify where to monitor for and receive the coded bits. As such, having to look through each of the different segment parsers may increase the latency of the STA 104 (or any receiving wireless communication device) receiving and decoding a data unit, as well as increasing the computational complexity of the STA 104 to store and identify the different types of segment parsers.

In some implementations, the AP 102 and the STA 104 may use an 80 MHz segment parser for distributing coded bits to one or more RUs in an RU aggregation combination. The 80 MHz segment parser may be used with existing designs for bandwidths that are greater than 80 MHz, such that hardware for a per 80 MHz segment parser is present in the wireless communication devices. With a per 80 MHz segment parser, different parameters for the parsing may be determined for large RU aggregation combinations (for example, for an RU aggregation combination of a 484 tone RU and a 242 tone RU (484+242 RUs)). For example, a arm value may be determined for the large RU aggregation combinations. Without a per 80 MHz segment parser, different arm values may be needed for each aggregation bandwidth mode, respectively. For example, the different aggregation bandwidth modes may include a 60, 100, 120, or 140 MHz up to 160 MHz (and possibly more variations with 320 MHz). As such, a modification of using an 80 MHz segment parser may be less complex than designing respective arm values for the different RU aggregation bandwidths.

Additionally, the per 80 MHz segment parser may be extended to cover puncturing (that is, at least one RU or a portion of the per 80 MHz segment is reserved for a type of communications such that the RU or portion is unavailable for the parsing). In some implementations, different 80 MHz segments may carry a different number of bits due to puncturing or other factors that limit or expand the number of bits available in the 80 MHz segments. As a result of the different number of bits that can be carried in the different 80 MHz segments, a round robin segment parsing configuration may be expanded.

For example, an even distribution of coded bits may be used among the 80 MHz segments, in which half of a number of coded bits per single carrier for each spatial stream ($N_{bpscs}/2$) are distributed to a first 80 MHz segment followed by half of the number of coded bits per single carrier for each spatial stream ($N_{bpscs}/2$) distributed to a second 80 MHz segment. Additionally or alternatively, the distribution of coded bits may be expanded to a higher number of segments for the parsing (for example, three 80 MHz segments with a third of the number of coded bits are distributed to the three segments, four 80 MHz segments with a fourth of a number of coded bits are distributed to the four segments, and so on). In some implementations, when a smaller segment is filled up, the remaining bits may be distributed to larger segments.

With a per 80 MHz segment parser with RU aggregation (for example, as defined by 802.11be), a $D_{TM}$ value may be determined and defined for different RU aggregation combinations (for example, for the cases of an RU484+242 aggregation combination for large RU aggregation and for RU26+52 or RU26+106 aggregation combinations for small RU aggregation). In some examples, for different combinations or RU locations, a same $D_{TM}$ value may be used for any combination of aggregated RUs with a same aggregation bandwidth regardless of the location and size of each RU. For example, an RU484+996 aggregation combination (that is, a 40 MHz bandwidth+80 MHz bandwidth) and an RU484+242+484+242 aggregation combination (that is, a 60 MHz bandwidth+a 60 MHz bandwidth) may use a same $D_{TM}$ value. Additionally, or alternatively, an RU242+242 aggregation combination (that is, a 20 MHz bandwidth+20 MHz bandwidth) and an RU484 (that is, a 40 MHz bandwidth) may use a same $D_{TM}$ value.

In some implementations, the distribution of the coded bits to data tones of the RUs in the RU aggregation scheme may be based in part on a $D_{TM}$ value. For example, a $D_{TM}$ design may be directly related to a number of data tones provided by the RU aggregation scheme. Accordingly, for a given aggregation bandwidth, a number of pilot tones may be determined after aggregation of the RUs, and the remaining tones may be considered data tones for distributing the coded bits. For smaller sized RUs (for example, 26 tone, 52 tone, and 102+4 tone RUs), a lesser number of pilot tones may be located in each RU. For example, two (2) pilot tones may be configured for a 26-tone sized RU, four (4) pilot tones may be configured for a 52-tone sized RU, and four (4) pilot tones may be configured for a 102+4-tone sized RU (a 106-tone sized RU).

As such, with a lesser number of pilot tones located in these smaller sized RUs, changing one or two pilot tones to data tones for distributing coded bits to an aggregated set of smaller sized RUs may not provide a large benefit. Accordingly, for aggregations of smaller sized RUs, existing pilot tones in each of the RUs combined into the aggregated RUs may be kept for a tone configuration (for example, as part of the tone plan 600). Different interleaving parameters may depend on the number of pilot tones and a resulting number of data tones in an RU (for example, a total number of tones in the RU minus the number of pilot tones equals the number of data tones). For example, the different interleaving parameters may include a $D_{TM}$ parameter, pilot tone locations 605, an $N_{COL}$ parameter, or additional parameters used for interleaving and distributing coded bits to the aggregated RUs.

For example, a $D_{TM}$ design for a first aggregated RU (A-RU) may include a 26 tone RU 625 aggregated with a 52 tone RU 630 (RU26+52) to create an A-RU with 78 tones (26+52=78). Additionally, the number of pilot tones in the A-RU with 78 tones (A-RU78) may be six (6) pilot tones (for example, two (2) pilot tones in the 26 tone RU 625 and four (4) pilot tones in the 52 tone RU 630), such that the number of data tones in the A-RU78 equals 72 data tones (26+52=78 total tones−6 pilot tones=72 data tones). Based on the 72 data tones, the interleaving parameters for the $D_{TM}$ design for this first A-RU may include $D_{TM}$=4 and $N_{COL}$=18 (for example, based on 72=18*4). That is, the existing pilot tones and data tones in the individual RUs of the A-RU (for smaller RUs) may be used for determining a $D_{TM}$ design for the A-RU. This $D_{TM}$ design may align with $D_{TM}$ designs for other data block sizes.

Additionally, or alternatively, a $D_{TM}$ design for a second A-RU may include the 26 tone RU 625 aggregated with a 106 tone RU (for example, a 102+4 tone RU 635). Accordingly, the A-RU may include 132 total tones (RU26+106=A-RU132) and may include six (6) pilot tones (for example, two (2) pilot tones in the 26 tone RU 625 and four (4) pilot tones in the 102+4 tone RU 635), such that the number of data tones in A-RU132 equals 126 data tones (that is, 26+106=132 total tones−6 pilot tones=126 data tones). Based on the 126 data tones (for example, 2*3*3*7 data tones), the interleaving parameters for the $D_{TM}$ design for this second A-RU may include $D_{TM}$=7 and $N_{COL}$=18 (for example, based on 126=18*7) or $D_{TM}$=6, $N_{COL}$=21 (for example, based on 126=21*6). Similar to the $D_{TM}$ design for the first A-RU, this $D_{TM}$ design may align with $D_{TM}$ designs for other data block sizes.

For aggregations of larger sized RUs or larger block sizes (for example, 242 tone RUs 640, 484 tone RUs, and 996 tone RUs 645), a density of pilot tones may be lower than for the smaller sized RUs. For example, eight (8) pilot tones may be configured for a 242 tone RU 640 (RU242), 16 pilot tones may be configured for a 484 tone RU (RU484), and 16 pilot tones may also be configured for a 996 tone RU 645 (RU996). Accordingly, based on the higher number of pilot tones than the smaller sized RUs and the low density of pilot tones, changing one or more pilot tones to data tones (for example, puncturing the pilot tones to reuse them as data tones) for an A-RU of larger sized RUs may have a higher impact and benefit than an A-RU of smaller RUs. For example, for a third A-RU that includes a 484 tone RU aggregated with a 242 tone RU 640 (RU484+RU242), different options may be available for determining a number of pilot tones (and, consequently the pilot tone locations 605).

In some implementations, similar to the techniques described above with reference to the smaller sized RUs in an A-RU, existing pilot tones in each of the RUs combined into the aggregated RUs may be kept for a tone configuration (for example, as part of the tone plan 600). For example, for the third A-RU, the total number of tones may be 726 tones (for example, A-RU726=RU484+RU242) with 24 pilot tones (for example, the 242 tone RU 640 may include eight (8) pilot tones and the 484 tone RU may include 16 pilot tones) such that the number of data tones in the third A-RU (A-RU726) equals 702 data tones (that is, 484+242=726 total tones−24 pilot tones=702 data tones).

Additionally, or alternatively, a subset of the total number of existing pilot tones may be punctured and reused as data tones to increase the number of data tones. For example, for the tone plan 600 (an 80 MHz tone plan), 16 pilot tones may be punctured to leave 16 pilot tones for the 996 tone RU 645 (RU996) with a lower pilot tone density. Subsequently, for the third A-RU (for example, A-RU726=RU484+RU242) with the low pilot tone density, pilot tones used in the 996 tone RU 645 may be used, but a subset of the pilot tones may be punctured. In some implementations, the subset of pilot tones may be four (4) pilot tones, for example, from a punctured 20 MHz segment of the total 80 MHz tone plan. As such, the number of pilot tones is 16−4=12 in the third A-RU. For example, for the third A-RU, the total number of tones may be 726 tones (A-RU726=RU484+RU242) with 12 pilot tones such that the number of data tones in the third A-RU (A-RU726) equals 714 data tones (that is, 484+ 242=726 total tones−12 pilot tones=714 data tones).

In some implementations, some pilot tones may be punctured and reused as data tones to replace data tones that are unavailable based on being located in a punctured portion of the tone plan 600 (for example, data tones sticking out into a punctured subband of the tone plan 600). For example, if a first portion of the tone plan 600 (that is, a first 20 MHz subband in an 80 MHz tone plan) is punctured, then two (2) left edge data tones in a second portion of the tone plan 600 (for example, a second 20 MHz subband) sticking out into the first portion may not be reliable. Accordingly, two (2) pilot tones may be used as data tones to make up for the loss of the two (2) left edge data tones at the punctured portion of the tone plan 600. Additionally or alternatively, if a fourth portion of the tone plan 600 (for example, a fourth 20 MHz subband in the 80 MHz tone plan) is punctured, then three (3) right edge data tones in a third portion of the tone plan 600 sticking out into the fourth portion may not be reliable, and three (3) pilot tones may be used as data tones to make up for the loss of the three (3) right edge data tones at the punctured portion of the tone plan 600.

Subsequently, the total number of tones may be 726 tones (A-RU726=RU484+RU242) with 21, 22, or 24 pilot tones. For example, the total number of pilot tones may 24 based on the 242 tone RU 640 may include eight (8) pilot tones and the 484 tone RU may include 16 pilot tones, and two (2) or three (3) of the total number of pilot tones may be reused as data tones based on one or more data tones being located in a punctured portion of the tone plan 600 as described above. Accordingly, the maximum number of pilot tones can be 24 (for example, if no data tones are located in the punctured portion of the tone plan 600), such that the number of data tones in the third A-RU may equal 702 tones (that is, 484+242=726 total tones−24 pilot tones=702 data tones).

Based on these different options for determining a total number of data tones for the third A-RU (for example, A-RU726 or larger sized RUs in an A-RU), interleaving parameters for a arm design for this third A-RU may differ. For example, for the options described above in which 702 data tones are available (for example, the total number of pilot tones in each RU of the third A-RU or in which a subset of the pilot tones are punctured based on one or more data tones being in a punctured portion of the tone plan 600), the arm design for the third A-RU (A-RU726) may include interleaving parameters arm=18 and $N_{COL}$=39 (for example, based on 702=18*39). Additionally or alternatively, for the option described above in which 714 data tones are available (for example, based on a punctured subband and reusing a subset of the remaining pilot tones in the 996 tone RU), the arm design for the third A-RU (A-RU726) may include interleaving parameters arm=17 and $N_{COL}$=42 or arm=14 and $N_{COL}$=51 (for example, based on 714=17*42 or 14*51).

Additionally, these arm design may align with arm designs for other data block sizes. In some implementations, the determination of the different arm values may be based on the $D_{TM}$ values listed in the Table 1 above, in which 14, 17, and 18 are not currently used for the different RU sizes and fall between the arm values of the 484 tone RU and the 996 tone RU (for example, arm=12 for the 484 tone RU and arm=20 for the 996 tone RU).

Figure 7:
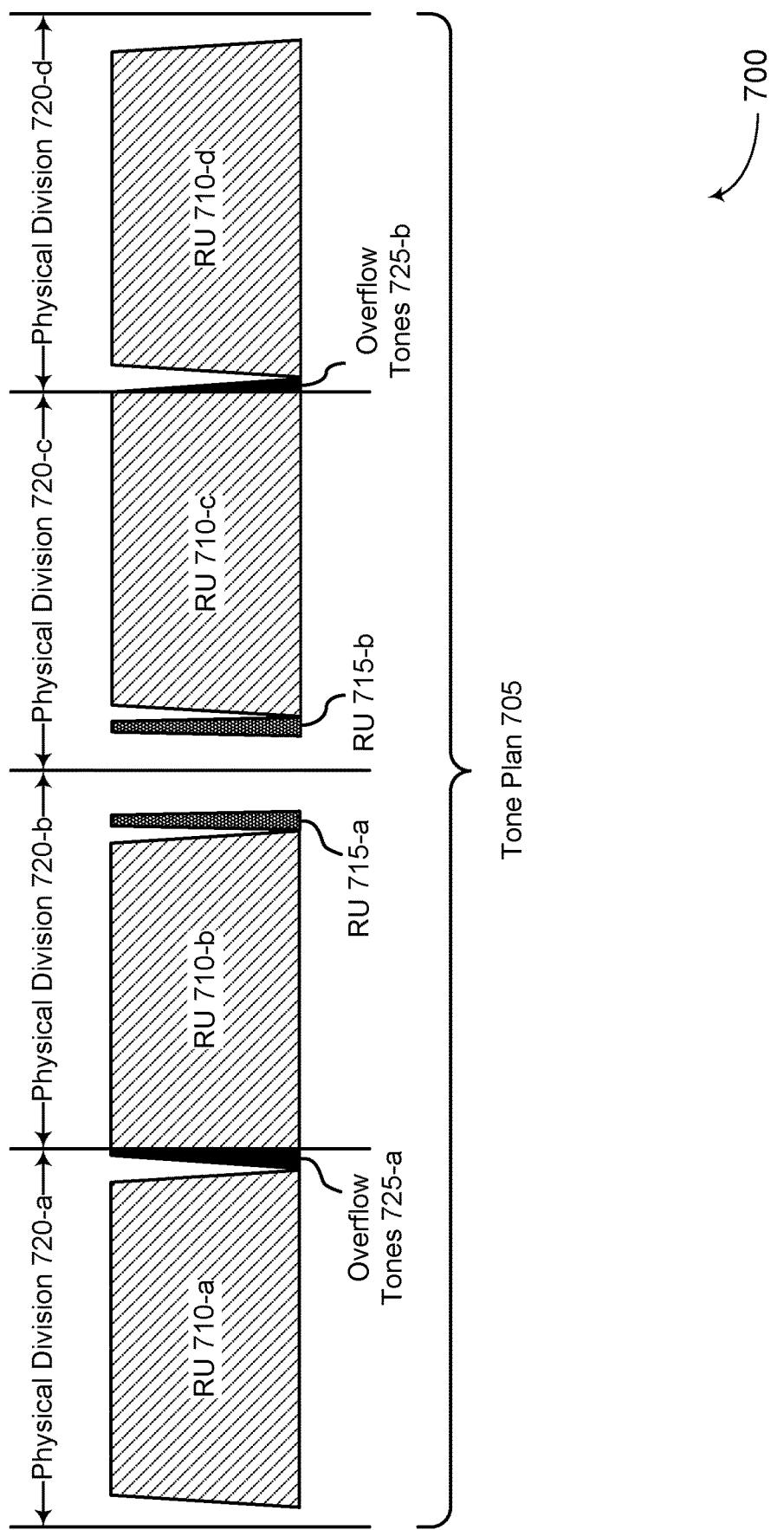
FIG. 7 shows an example of a physical RU division for a parser and interleaving parameter design for RU aggregation.

FIG. 7 illustrates an example of a physical RU division 700 that supports a parser and interleaving parameter design for RU aggregation in accordance with aspects of the present disclosure. In some implementations, an AP 102 and an STA 104 may use a data parsing and interleaving scheme for distributing an encoded set of information bits to data tones of one or more RUs of an RU aggregation combination based on the physical RU division 700. The physical RU division 700 may include a tone plan 705 for one or more RUs 710 and one or more RUs 715. For example, the tone plan 705 may be an 80 MHz tone plan, in which the one or more RUs 710 represent 242 tone RUs and the one or more RUs 715 represent 13 tone RUs (for example, used for transmitting control information, synchronization information, or as guard periods).

While the tone plan 705 may be split up to include four (4) RUs 710, the four (4) RUs 710 may not be equally spaced into one or more physical divisions 720 (for example, 20 MHz boundaries). For example, a first RU 710-*a* (for example, a first 242 tone RU) may be located two (2) tones away from a left boundary of a first physical division 720-*a* of the tone plane 705 (for example, a first 20 MHz boundary). Additionally, a second RU 710-*b* (for example, a second 242 tone RU) may include one or more overflow tones 725-*a* crossing a left boundary of a second physical division 720-*b* (for example, two (2) tones crossing a 20 MHz boundary).

In some implementations, seven (7) direct current (DC) tones between a first RU 715-*a* and a second RU 715-*b* (for example, the 13 tone RUs) may be split to three (3) and four (4) tones by a left boundary of a third physical division 720-*c* (for example, a 20 MHz boundary). As such, the three (3) or four (4) DC tones in the respective physical divisions 720 may or may not be enough DC tones to serve as a guard band for the physical divisions 720. Additionally, a third RU 710-*c* (for example, a third 242 tone RU) may include one or more overflow tones 725-*b* (for example, three (3) tones) crossing a right boundary of the third physical division 720-*c* (for example, a 20 MHz boundary or a left boundary of a fourth physical division 720-*d*). In some implementations, a fourth RU 710-*d* (for example, a fourth 242 tone RU) may be three (3) tones away from a right boundary of the fourth physical division 720-*d* (for example, a 20 MHz boundary).

Accordingly, based on the overflow tones 725, if one of the physical divisions 720 (for example, 20 MHz subbands of an 80 MHz tone plan) are punctured (for example, being used by a legacy wireless communication device or otherwise unavailable for use), the overflow tones may be unavailable for use in an RU aggregation combination. As described with reference to FIG. 6, to determine interleaving parameters for distributing coded bits to data tones in the aggregated RUs, one or more pilot tones in the aggregated RUs may be reused as data tones to compensate for the overflow tones 725 lost to the punctured physical division 720.

Figure 8:
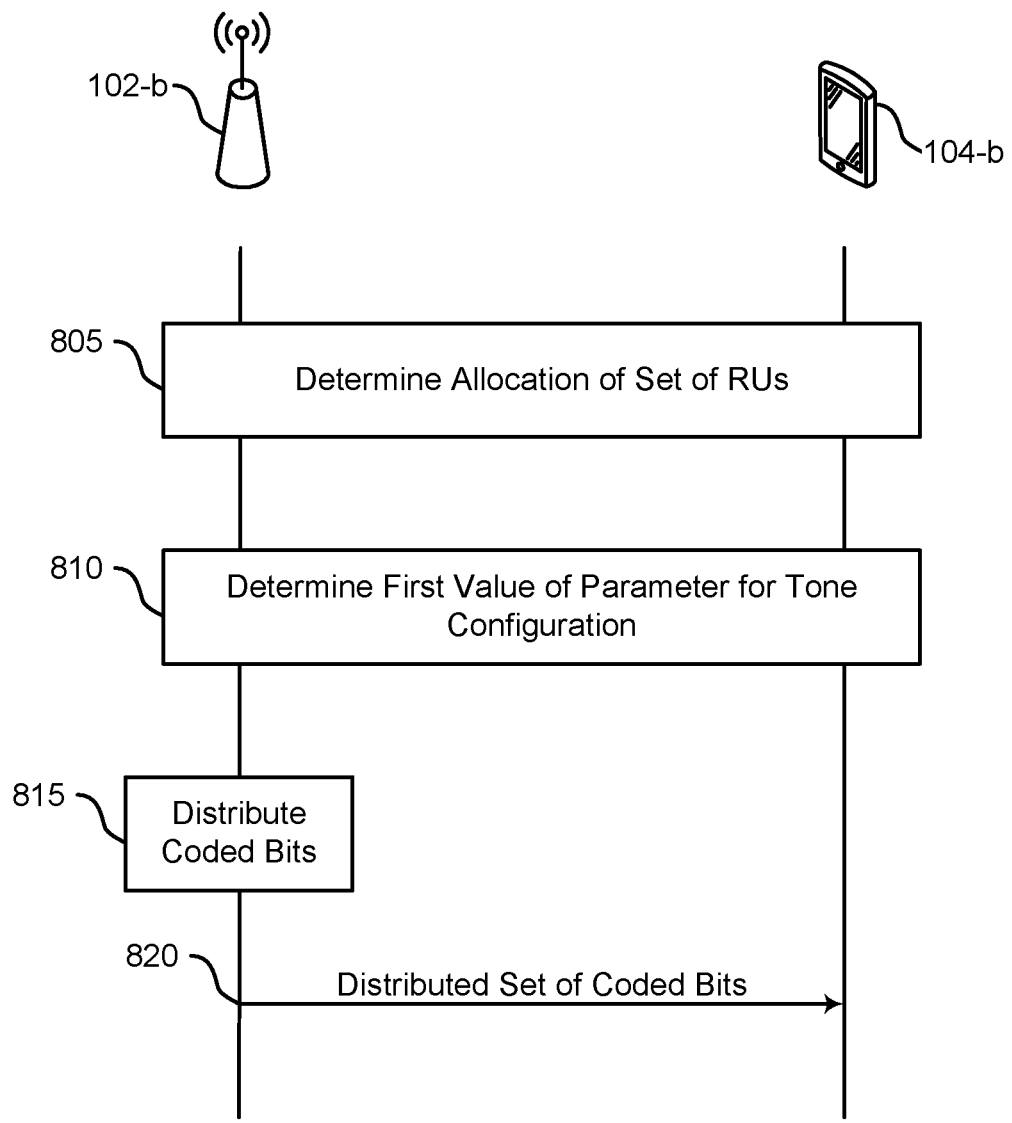
FIG. 8 shows an example of a process flow for a parser and interleaving parameter design for RU aggregation.

FIG. 8 illustrates an example of a process flow 800 that supports a parser and interleaving parameter design for RU aggregation in accordance with aspects of the present disclosure. The process flow 800 may include an AP 102-*b* and an STA 104-*b*, which may be examples of the corresponding devices described with reference to FIGS. 1-7. For example, the AP 102-*b* and the STA 104-*b* may correspond to a BSS managed by the AP 102-*b*. In some examples, the BSS may include one or more additional sets of STAs 104 (for example, UEs or other wireless communication devices) within range of the AP 102-*b* that have established association. As shown, the AP 102-*b* may represent a transmitting wireless device, the STA 104-*b* may represent a receiving wireless device. However, in some implementations, the STA 104-*b* may be the transmitting wireless device, and the AP 102-*b* may be the receiving wireless device.

In the following description of the process flow 800, the operations between the AP 102-*b* and the STA 104-*b* may be performed in different orders or at different times. Certain operations may also be left out of the process flow 800, or other operations may be added to the process flow 800. It is to be understood that while the AP 102-*b* and the STA 104-*b* are shown performing a number of the operations of the process flow 800, any wireless device may perform the operations shown.

At 805, the STA 104-*b* and the AP 102-*b* may determine an allocation of a set of RUs for the transmitting wireless device and the receiving wireless device (for example, the STA 104-*b* and the AP 102-*b*) in a BSS, the set of RUs associated with two or more bandwidth segments of a bandwidth allocation. In some implementations, the set of RUs may include a set of RUs for uplink OFDMA of the two or more bandwidth segments by the STA 104-*b*, and the AP 102-*b* may transmit an indication of the allocation to the STA 104-*b*. Additionally or alternatively, the STA 104-*b* may receive, from the AP 102-*b*, an indication of the allocation of the set of RUs, the set of RUs including a set of RUs for downlink OFDMA of the two or more bandwidth segments by the STA 104-*b*, and may determine the allocation based on the received indication of the allocation.

At 810, the STA 104-*b* and the AP 102-*b* may determine a first value of a parameter that indicates a tone configuration (for example, a tone plan) for a combination of the allocated set of RUs, the first value of the parameter for the combination different from each value of the parameter associated with a respective one RU of the allocated set of RUs. In some implementations, the parameter that indicates the tone configuration may include a $D_{TM}$ value. Additionally or alternatively, the parameter that indicates the tone configuration may include an identification of pilot tone locations in the allocated set of RUs.

In some implementations, the STA 104-*b* and the AP 102-*b* may determine a total number of pilot tones for the set of RUs based on a sum of a number of pilot tones in each RU of the allocated set of RUs and may receive a set of pilot tones on the allocated set of RUs according to the tone configuration indicated by the first value of the parameter that indicates the tone configuration, in which the total number of pilot tones represents the first value of the parameter.

Additionally or alternatively, the STA 104-*b* and the AP 102-*b* may select a subset of a set of pilot tones as data tones for the tone configuration and may determine a number of available pilot tones based on a sum of a number of pilot tones in each RU of the allocated set of RUs less the subset of the pilot tones, in which the number of available pilot tones represents the first value of the parameter that indicates the tone configuration. In some implementations, the STA 104-*b* and the AP 102-*b* may determine one or more data tones are unavailable for the set of coded bits based on a punctured bandwidth segment of the bandwidth allocation and may select a subset of a set of pilot tones as data tones for the tone configuration based on the one or more unavailable data tones. Subsequently, the STA 104-*b* and the AP 102-*b* may determine a number of available pilot tones based on a sum of a number of pilot tones in each RU of the allocated set of RUs less the subset of the set of pilot tones, in which the number of available pilot tones represents the first value of the parameter that indicates the tone configuration.

In some implementations, the STA 104-*b* and the AP 102-*b* may determine one or more interleaving parameters based on the tone configuration, in which the set of coded bits are received on the allocated set of RUs according to the one or more interleaving parameters. For example, the one or more interleaving parameters may include one or more of a arm value or an Nca, value for a row-column interleaving configuration.

At 815, the AP 102-*b* (that is, the transmitting wireless device) may distribute a set of coded bits of a data unit to the allocated set of RUs according to the tone configuration indicated by the first value of the parameter. In some implementations, the STA 104-*b* and the AP 102-*b* may determine at least one bandwidth segment of the bandwidth allocation is punctured, in which the tone configuration is based on the at least one punctured bandwidth segment being unavailable for distributing the set of coded bits. For example, the STA 104-*b* (for example, the receiving wireless device) may receive, from the AP 102-*b* (for example, the transmitting wireless device), an indication of an SU allocation of the bandwidth allocation and may determine the allocation of the set of RUs within the SU allocation of the bandwidth allocation based on the determining that the at least one bandwidth segment of the bandwidth allocation is punctured.

In some implementations, the STA 104-*b* and the AP 102-*b* may select a segment parser corresponding to a first frequency based on the bandwidth allocation. For example, the first frequency may be 80 MHz, and the segment parser may be an 80 MHz segment parser. Additionally, the STA 104-*b* and the AP 102-*b* may determine a noncontiguous bandwidth allocation including the two or more available bandwidth segments, in which the allocated set of RUs is based on the two or more available bandwidth segments.

At 820, the AP 102-*b* (that is, the transmitting wireless device) may transmit, to the STA 104-*b* (that is, the receiving wireless device), the distributed set of coded bits on the allocated set of RUs.

Figure 9:
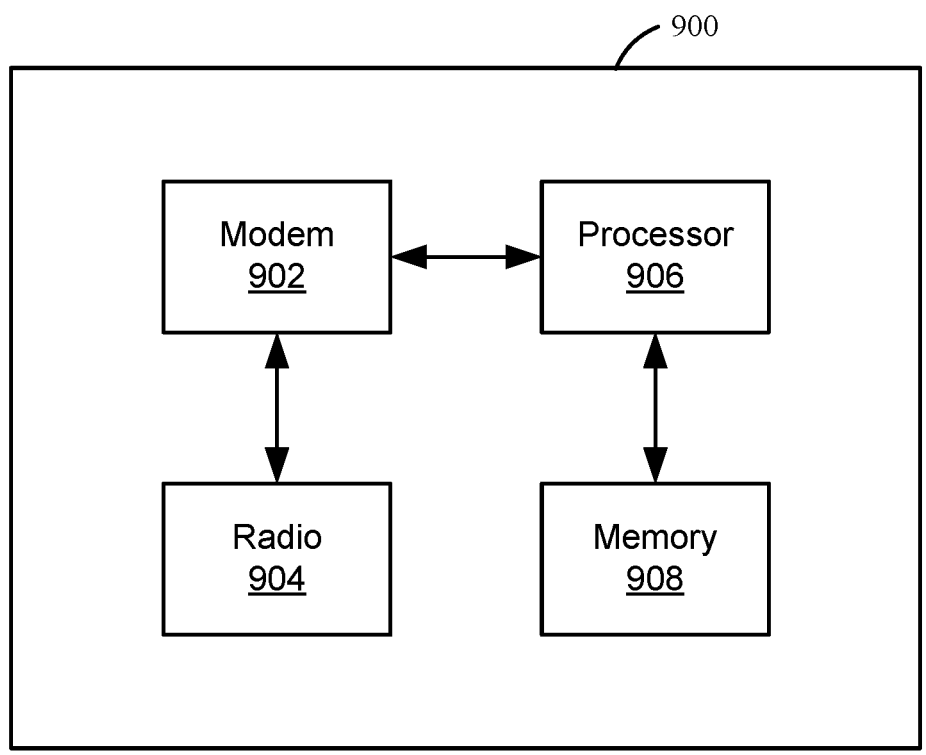
FIG. 9 shows a block diagram of an example wireless communication device.

FIG. 9 shows a block diagram of an example wireless communication device 900. In some implementations, the wireless communication device 900 can be an example of a device for use in a STA such as one of the STAs 104 described above with reference to FIG. 1. In some implementations, the wireless communication device 900 can be an example of a device for use in an AP such as the AP 102 described above with reference to FIG. 1. The wireless communication device 900 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and MPDUs conforming to an IEEE 802.11 standard, such as that defined by the IEEE 802.11-2016 specification or amendments thereof including, but not limited to, 802.11ah, 802.11ad, 802.11 ay, 802.11ax, 802.11az, 802.11ba and 802.11be.

The wireless communication device 900 can be, or can include, a chip, system on chip (SoC), chipset, package or device that includes one or more modems 902, for example, a Wi-Fi (IEEE 802.11 compliant) modem. In some implementations, the one or more modems 902 (collectively "the modem 902") additionally include a WWAN modem (for example, a 3GPP 4G LTE or 5G compliant modem). In some implementations, the wireless communication device 900 also includes one or more radios 904 (collectively "the radio 904"). In some implementations, the wireless communication device 900 further includes one or more processors, processing blocks or processing elements (collectively "the processor 906") and one or more memory blocks or elements (collectively "the memory 908").

The modem 902 can include an intelligent hardware block or device such as, for example, an application-specific integrated circuit (ASIC) among other possibilities. The modem 902 is generally configured to implement a PHY layer. For example, the modem 902 is configured to modulate packets and to output the modulated packets to the radio 904 for transmission over the wireless medium. The modem 902 is similarly configured to obtain modulated packets received by the radio 904 and to demodulate the packets to provide demodulated packets. In addition to a modulator and a demodulator, the modem 902 may further include digital signal processing (DSP) circuitry, automatic gain control (AGC), a coder, a decoder, a multiplexer and a demultiplexer. For example, while in a transmission mode, data obtained from the processor 906 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 904. In implementations involving beamforming, the modulated symbols in the respective spatial streams are precoded via a steering matrix prior to their provision to the IFFT block.

While in a reception mode, digital signals received from the radio 904 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 906) for processing, evaluation or interpretation.

The radio 904 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 900 can include, or be coupled with, multiple transmit antennas (each with a corresponding transmit chain) and multiple receive antennas (each with a corresponding receive chain). The symbols output from the modem 902 are provided to the radio 904, which then transmits the symbols via the coupled antennas. Similarly, symbols received via the antennas are obtained by the radio 904, which then provides the symbols to the modem 902.

The processor 906 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 906 processes information received through the radio 904 and the modem 902, and processes information to be output through the modem 902 and the radio 904 for transmission through the wireless medium. For example, the processor 906 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 906 may generally control the modem 902 to cause the modem to perform various operations described above.

The memory 908 can include tangible storage media such as random-access memory (RAM) or read-only memory (ROM), or combinations thereof. The memory 908 also can store non-transitory processor- or computer-executable software (SW) code containing instructions that, when executed by the processor 906, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 10B:
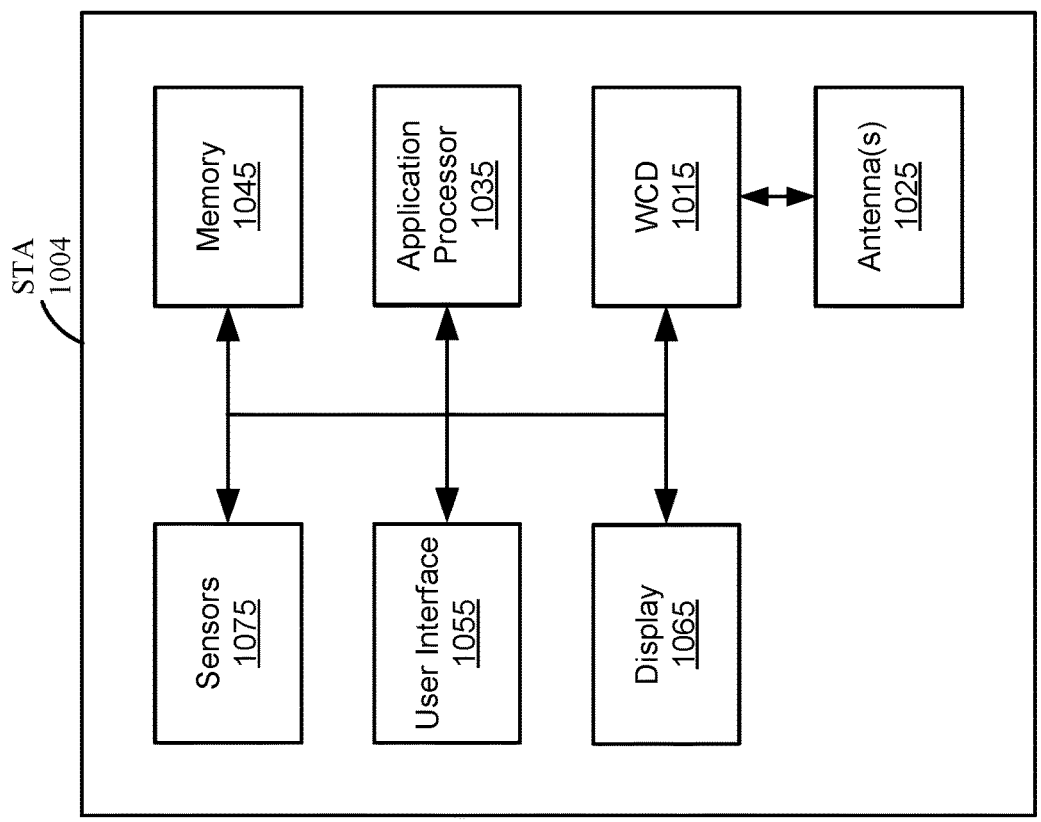
FIG. 10B shows a block diagram of an example STA.
Figure 10A:
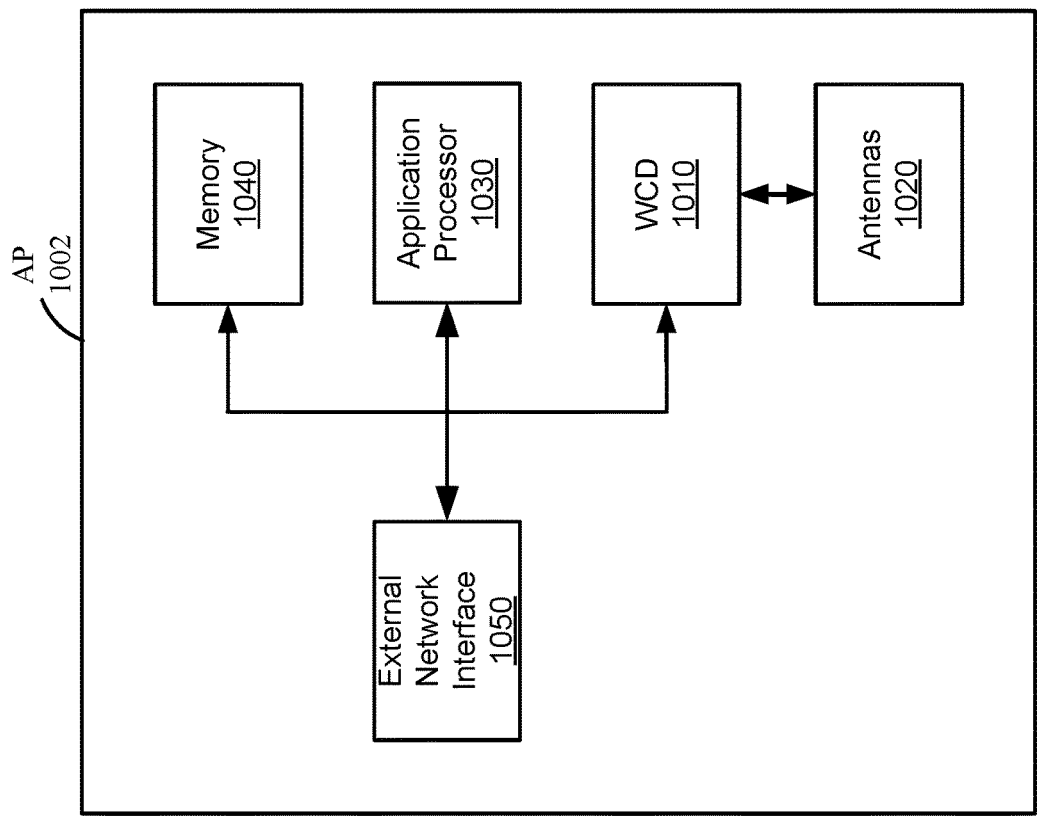
FIG. 10A shows a block diagram of an example AP.

FIG. 10A shows a block diagram of an example AP 1002. For example, the AP 1002 can be an example implementation of the AP 102 described with reference to FIG. 1. The AP 1002 includes a wireless communication device (WCD) 1010. For example, the wireless communication device 1010 may be an example implementation of the wireless communication device 9000 described with reference to FIG. 9. The AP 1002 also includes multiple antennas 1020 coupled with the wireless communication device 1010 to transmit and receive wireless communications. In some implementations, the AP 1002 additionally includes an application processor 1030 coupled with the wireless communication device 1010, and a memory 1040 coupled with the application processor 1030. The AP 1002 further includes at least one external network interface 1050 that enables the AP 1002 to communicate with a core network or backhaul network to gain access to external networks including the Internet. For example, the external network interface 1050 may include one or both of a wired (for example, Ethernet) network interface and a wireless network interface (such as a WWAN interface). Ones of the aforementioned components can communicate with other ones of the components directly or indirectly, over at least one bus. The AP 1002 further includes a housing that encompasses the wireless communication device 1010, the application processor 1030, the memory 1040, and at least portions of the antennas 1020 and external network interface 1050.

FIG. 10B shows a block diagram of an example STA 1004. For example, the STA 1004 can be an example implementation of the STA 104 described with reference to FIG. 1. The STA 1004 includes a wireless communication device 1015. For example, the wireless communication device 1015 may be an example implementation of the wireless communication device 900 described with reference to FIG. 9. The STA 1004 also includes one or more antennas 1025 coupled with the wireless communication device 1015 to transmit and receive wireless communications. The STA 1004 additionally includes an application processor 1035 coupled with the wireless communication device 1015, and a memory 1045 coupled with the application processor 1035. In some implementations, the STA 1004 further includes a user interface (UI) 1055 (such as a touchscreen or keypad) and a display 1065, which may be integrated with the UI 1055 to form a touchscreen display. In some implementations, the STA 1004 may further include one or more sensors 1075 such as, for example, one or more inertial sensors, accelerometers, temperature sensors, pressure sensors, or altitude sensors. Ones of the aforementioned components can communicate with other ones of the components directly or indirectly, over at least one bus. The STA 1004 further includes a housing that encompasses the wireless communication device 1015, the application processor 1035, the memory 1045, and at least portions of the antennas 1025, UI 1055, and display 1065.

Figure 11:
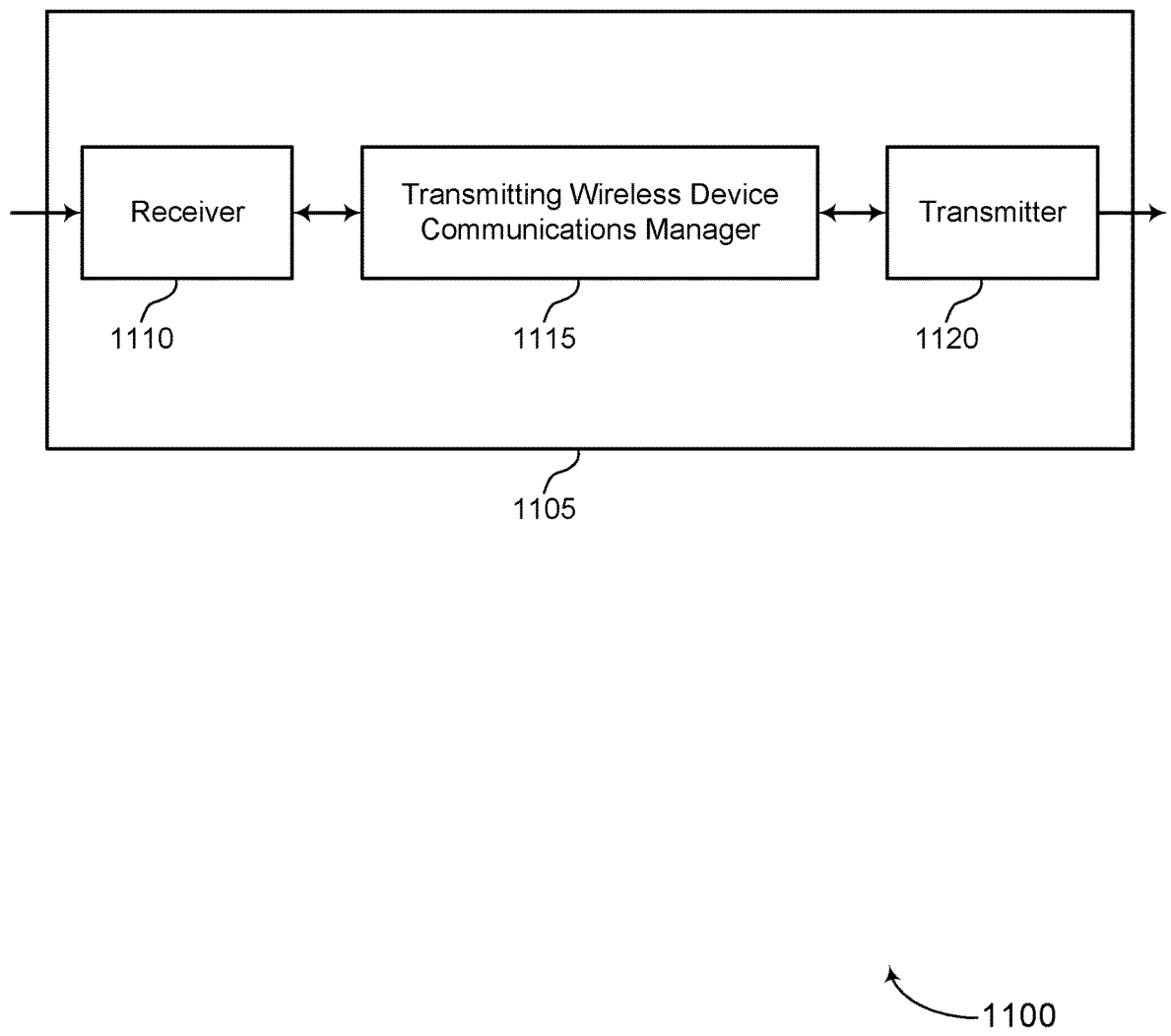
FIGS. 11 and 12 show block diagrams of devices that support parser and interleaving parameter design for RU aggregation in accordance with aspects of the present disclosure.

FIG. 11 shows a block diagram 1100 of a device 1105 that supports parser and interleaving parameter design for RU aggregation in accordance with aspects of the present disclosure. The device 1105 may be an example of aspects of a transmitting wireless device (for example, an AP 102 or an STA 104) as described herein. The device 1105 may include a receiver 1110, a transmitting wireless device communications manager 1115, and a transmitter 1120. The transmitting wireless device communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to parser and interleaving parameter design for RU aggregation). Information may be passed on to other components of the device. The receiver 1110 may be an example of aspects of the transceiver 1420 described with reference to FIG. 14. The receiver 1110 may utilize a single antenna or a set of antennas.

The transmitting wireless device communications manager 1115 may determine an allocation of a set of RUs for the transmitting wireless device in a BSS, the set of RUs associated with two or more bandwidth segments of a bandwidth allocation. Additionally, the transmitting wireless device communications manager 1115 may determine a first value of a parameter that indicates a tone configuration for a combination of the allocated set of RUs, the first value of the parameter for the combination different from each value of the parameter associated with a respective one RU of the allocated set of RUs. In some implementations, the transmitting wireless device communications manager 1115 may distribute a set of coded bits of a data unit to the allocated set of RUs according to the tone configuration indicated by the first value of the parameter. Additionally, the transmitting wireless device communications manager 1115 may transmit the distributed set of coded bits on the allocated set of RUs. The transmitting wireless device communications manager 1115 may be an example of aspects of the transmitting wireless device communications manager 1410 described herein.

The transmitting wireless device communications manager 1115, or its sub-components, may be implemented in hardware, code (for example, software or firmware) executed by a processor, or any combination thereof. If implemented in code executed by a processor, the functions of the transmitting wireless device communications manager 1115, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The transmitting wireless device communications manager 1115, or its sub-components, may be physically located at different locations, including being distributed such that portions of functions are implemented at different physical locations by one or more physical components. In some examples, the transmitting wireless device communications manager 1115, or its sub-components, may be a separate and distinct component in accordance with various aspects of the present disclosure. In some examples, the transmitting wireless device communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
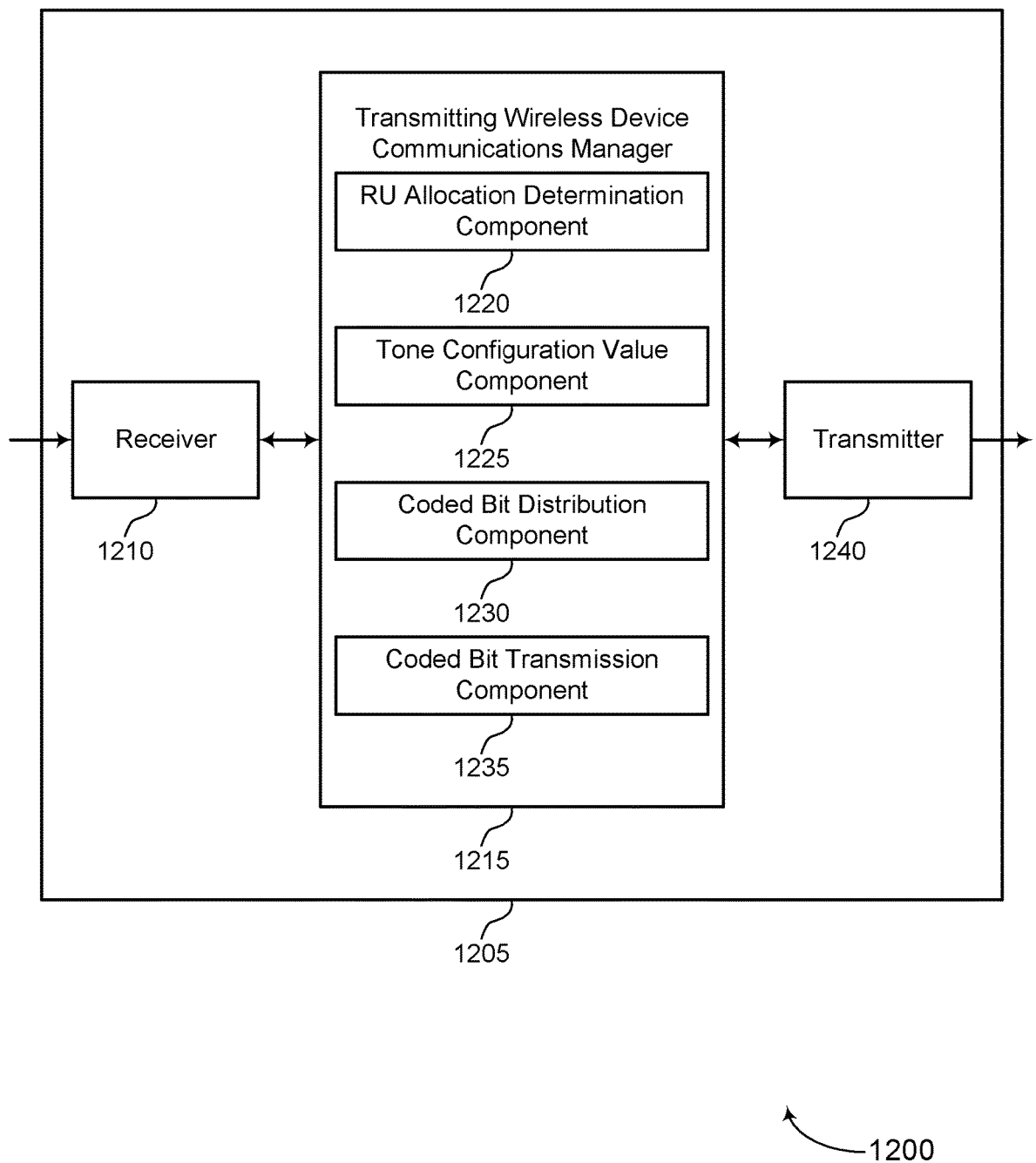

FIG. 12 shows a block diagram 1200 of a device 1205 that supports parser and interleaving parameter design for RU aggregation in accordance with aspects of the present disclosure. The device 1205 may be an example of aspects of a device 1105 or a transmitting wireless device (for example, an AP 102 or a STA 104) as described herein. The device 1205 may include a receiver 1210, a transmitting wireless device communications manager 1215, and a transmitter 1240. The transmitting wireless device communications manager 1215 can be implemented, at least in part, by one or both of a modem and a processor. Each of these components may be in communication with one another (for example, via one or more buses).

The receiver 1210 may receive information such as packets, user data, or control information associated with various information channels (for example, control channels, data channels, and information related to parser and interleaving parameter design for RU aggregation). Information may be passed on to other components of the device. The receiver 1210 may be an example of aspects of the transceiver 1420 described with reference to FIG. 14. The receiver 1210 may utilize a single antenna or a set of antennas.

The transmitting wireless device communications manager 1215 may be an example of aspects of the transmitting wireless device communications manager 1115 as described herein. The transmitting wireless device communications manager 1215 may include a RU allocation determination component 1220, a tone configuration value component 1225, a coded bit distribution component 1230, and a coded bit transmission component 1235. The transmitting wireless device communications manager 1215 may be an example of aspects of the transmitting wireless device communications manager 1410 described herein.

The RU allocation determination component 1220 may determine an allocation of a set of RUs for the transmitting wireless device in a BSS, the set of RUs associated with two or more bandwidth segments of a bandwidth allocation.

The tone configuration value component 1225 may determine a first value of a parameter that indicates a tone configuration for a combination of the allocated set of RUs, the first value of the parameter for the combination different from each value of the parameter associated with a respective one RU of the allocated set of RUs.

The coded bit distribution component 1230 may distribute a set of coded bits of a data unit to the allocated set of RUs according to the tone configuration indicated by the first value of the parameter.

The coded bit transmission component 1235 may transmit the distributed set of coded bits on the allocated set of RUs.

The transmitter 1240 may transmit signals generated by other components of the device. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
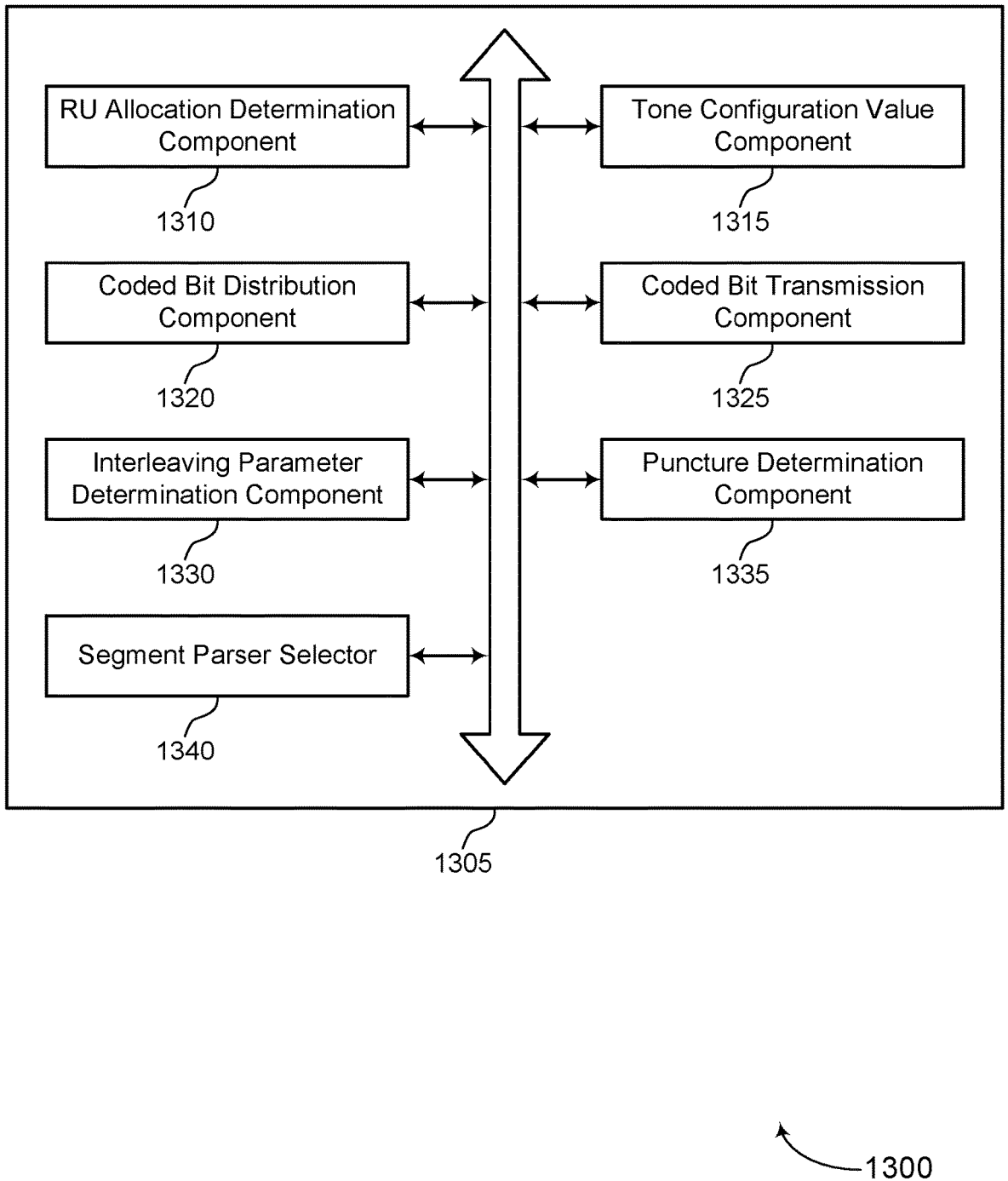
FIG. 13 shows a block diagram of a transmitting wireless device communications manager that supports parser and interleaving parameter design for RU aggregation in accordance with aspects of the present disclosure.

FIG. 13 shows a block diagram 1300 of a transmitting wireless device communications manager 1305 that supports parser and interleaving parameter design for RU aggregation in accordance with aspects of the present disclosure. The transmitting wireless device communications manager 1305 may be an example of aspects of a transmitting wireless device communications manager 1115, a transmitting wireless device communications manager 1215, or a transmitting wireless device communications manager 1410 described herein. The transmitting wireless device communications manager 1305 may include a RU allocation determination component 1310, a tone configuration value component 1315, a coded bit distribution component 1320, a coded bit transmission component 1325, an interleaving parameter determination component 1330, a puncture determination component 1335, and a segment parser selector 1340. Each of these modules may communicate, directly or indirectly, with one another (for example, via one or more buses).

The RU allocation determination component 1310 may determine an allocation of a set of RUs for the transmitting wireless device in a BSS, the set of RUs associated with two or more bandwidth segments of a bandwidth allocation. In some examples, the RU allocation determination component 1310 may determine the allocation of the set of RUs within an SU allocation of the bandwidth allocation based the determining that the at least one bandwidth segment of the bandwidth allocation is punctured and may transmit, to a receiving wireless device, an indication of the allocation of the set of RUs within the SU allocation.

Additionally or alternatively, the RU allocation determination component 1310 may receive, from an AP, an indication of the allocation of the set of RUs, in which the set of RUs includes a set of RUs for uplink OFDMA of the two or more bandwidth segments by an STA station and the transmitting wireless device includes the STA, and may determine the allocation based on the received indication of the allocation. In some implementations, the set of RUs may include a set of RUs for downlink OFDMA of the two or more bandwidth segments by an AP, and the RU allocation determination component 1310 may transmit an indication of the allocation to an STA, in which the transmitting wireless device includes the AP.

In some examples, the RU allocation determination component 1310 may determine a noncontiguous bandwidth allocation including the two or more available bandwidth segments, in which the allocated set of RUs is based on the two or more available bandwidth segments.

The tone configuration value component 1315 may determine a first value of a parameter that indicates a tone configuration for a combination of the allocated set of RUs, the first value of the parameter for the combination different from each value of the parameter associated with a respective one RU of the allocated set of RUs. In some implementations, the parameter that indicates the tone configuration may include a distance to tone mapping value. In some examples, the distance to tone mapping value is four and the allocated set of resource units includes a twenty-six tone resource unit and a fifty-two tone resource unit. In some examples, the distance to tone mapping value is six and the allocated set of resource units includes a twenty-six tone resource unit and a one hundred six tone resource unit. In some examples, the distance to tone mapping value is eighteen and the allocated set of resource units includes a two hundred forty-two tone resource unit and a four hundred eighty-four tone resource unit. Additionally or alternatively, the parameter that indicates the tone configuration may include an identification of pilot tone locations in the allocated set of RUs.

In some examples, the tone configuration value component 1315 may determine a total number of pilot tones for the set of RUs based on a sum of a number of pilot tones in each RU of the allocated set of RUs and may transmit a set of pilot tones on the allocated set of RUs according to the tone configuration indicated by the first value of the parameter that indicates the tone configuration, in which the total number of pilot tones includes the first value of the parameter.

Additionally or alternatively, the tone configuration value component 1315 may select a subset of a set of pilot tones as data tones for the tone configuration and may determine a number of available pilot tones based on a sum of a number of pilot tones in each RU of the allocated set of RUs less the subset of the pilot tones, in which the number of available pilot tones includes the first value of the parameter that indicates the tone configuration.

In some implementations, the tone configuration value component 1315 may determine one or more data tones are unavailable for the set of coded bits based on a punctured bandwidth segment of the bandwidth allocation, may select a subset of a set of pilot tones as data tones for the tone configuration based on the one or more unavailable data tones, and may determine a number of available pilot tones based on a sum of a number of pilot tones in each RU of the allocated set of RUs less the subset of the set of pilot tones, in which the number of available pilot tones includes the first value of the parameter that indicates the tone configuration.

The coded bit distribution component 1320 may distribute a set of coded bits of a data unit to the allocated set of RUs according to the tone configuration indicated by the first value of the parameter.

The coded bit transmission component 1325 may transmit the distributed set of coded bits on the allocated set of RUs.

The interleaving parameter determination component 1330 may determine one or more interleaving parameters based on the tone configuration, in which the set of coded bits are distributed according to the one or more interleaving parameters. In some implementations, the one or more interleaving parameters may include one or more of a distance tone mapping value or a number of columns for a row-column interleaving configuration.

The puncture determination component 1335 may determine at least one bandwidth segment of the bandwidth allocation is punctured, in which the tone configuration is based on the at least one punctured bandwidth segment being unavailable for distributing the set of coded bits. In some examples, the puncture determination component 1335 may determine the allocation of the set of RUs within a single user allocation of the bandwidth allocation based on the determining that the at least one bandwidth segment of the bandwidth allocation is punctured. Additionally, the puncture determination component 1335 may transmit, to a receiving wireless device, an indication of the allocation of the set of RUs within the single user allocation.

The segment parser selector 1340 may select a segment parser corresponding to a first frequency based on the bandwidth allocation. In some implementations, the first frequency may be 80 MHz, and the segment parser may be an 80 MHz segment parser.

Figure 14:
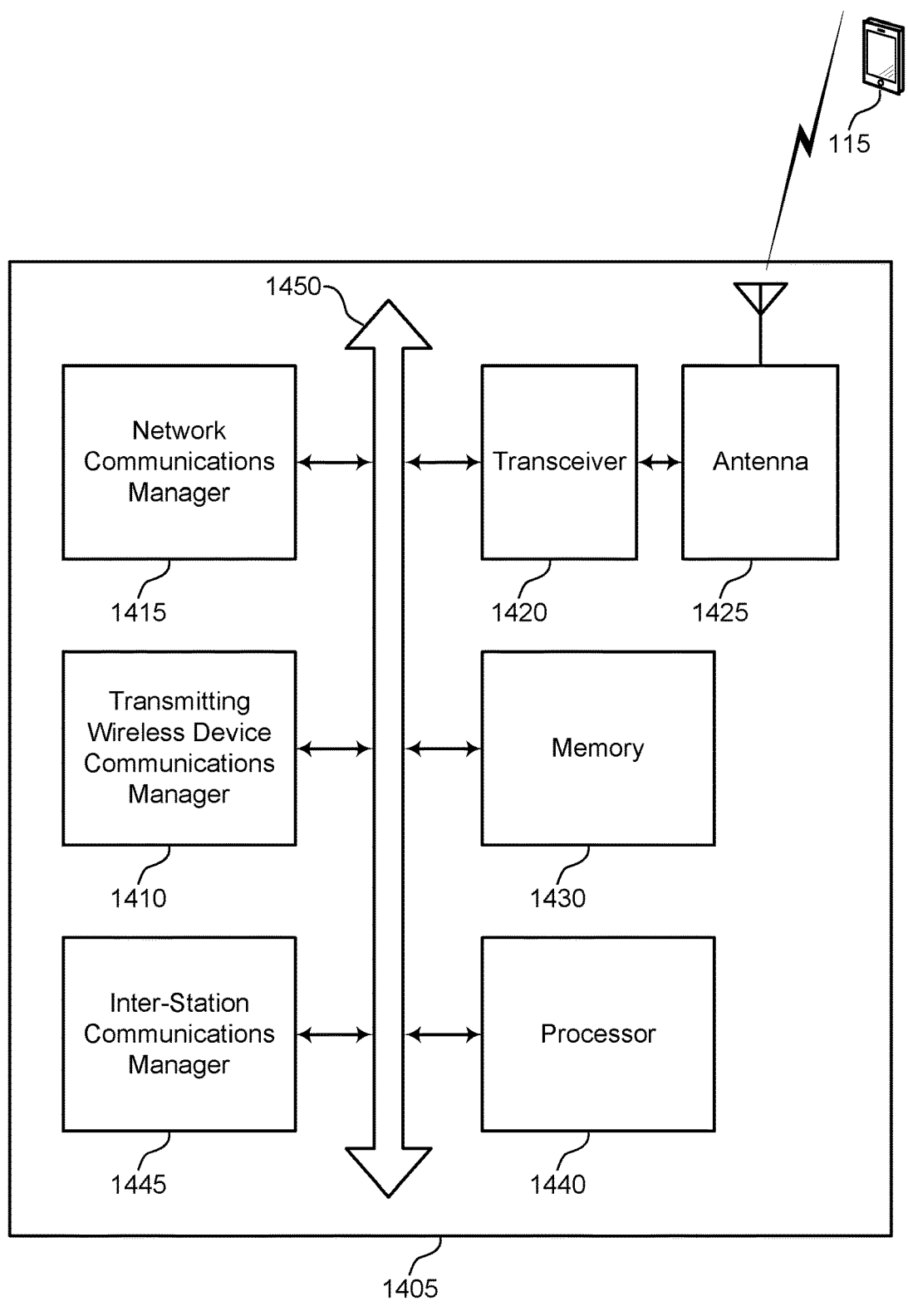
FIG. 14 shows a diagram of a system including a device that supports parser and interleaving parameter design for RU aggregation in accordance with aspects of the present disclosure.

FIG. 14 shows a diagram of a system 1400 including a device 1405 that supports parser and interleaving parameter design for RU aggregation in accordance with aspects of the present disclosure. The device 1405 may be an example of or include the components of device 1105, device 1205, or a transmitting wireless device (for example, an AP 102 or an STA 104) as described herein. The device 1405 may include components for bi-directional voice and data communications including components for transmitting and receiving communications, including a transmitting wireless device communications manager 1410, a network communications manager 1415, a transceiver 1420, an antenna 1425, memory 1430, a processor 1440, and an inter-station communications manager 1445. These components may be in electronic communication via one or more buses (for example, bus 1450).

The transmitting wireless device communications manager 1410 may determine an allocation of a set of RUs for the transmitting wireless device in a BSS, the set of RUs associated with two or more bandwidth segments of a bandwidth allocation. Additionally, the transmitting wireless device communications manager 1410 may determine a first value of a parameter that indicates a tone configuration for a combination of the allocated set of RUs, the first value of the parameter for the combination different from each value of the parameter associated with a respective one RU of the allocated set of RUs. In some implementations, the transmitting wireless device communications manager 1410 may distribute a set of coded bits of a data unit to the allocated set of RUs according to the tone configuration indicated by the first value of the parameter. Additionally, the transmitting wireless device communications manager 1410 may transmit the distributed set of coded bits on the allocated set of RUs.

The network communications manager 1415 may manage communications with the core network (for example, via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some implementations, the wireless device may include a single antenna 1425. However, in some implementations, the device may have more than one antenna 1425, which may be capable of concurrently transmitting or receiving multiple wireless transmissions.

The memory 1430 may include random-access memory (RAM) and read-only memory (ROM). The memory 1430 may store computer-readable, computer-executable code 1435 including instructions that, when executed, cause the processor to perform various functions described herein. In some implementations, the memory 1430 may contain, among other things, a basic I/O system (BIOS) which may control basic hardware or software operation such as the interaction with peripheral components or devices.

The processor 1440 may include an intelligent hardware device, (for example, a general-purpose processor, a DSP, a central processing unit (CPU), a microcontroller, an ASIC, an FPGA, a programmable logic device, a discrete gate or transistor logic component, a discrete hardware component, or any combination thereof). In some implementations, the processor 1440 may be configured to operate a memory array using a memory controller. In other cases, a memory controller may be integrated into processor 1440. The processor 1440 may be configured to execute computer-readable instructions stored in a memory to perform various functions (for example, functions or tasks supporting parser and interleaving parameter design for RU aggregation).

The inter-station communications manager 1445 may manage communications with other transmitting wireless devices (for example, base stations 105, APs 102, or STAs 104) and may include a controller or scheduler for controlling communications with UEs 115 (for example, STAs 104) in cooperation with other transmitting wireless devices. For example, the inter-station communications manager 1445 may coordinate scheduling for transmissions to UEs 115 (for example, STAs 104) for various interference mitigation techniques such as beamforming or joint transmission. In some examples, the inter-station communications manager 1445 may provide an X2 interface within an LTE/LTE-A wireless communication network technology to provide communication between base stations 105.

Figure 15:
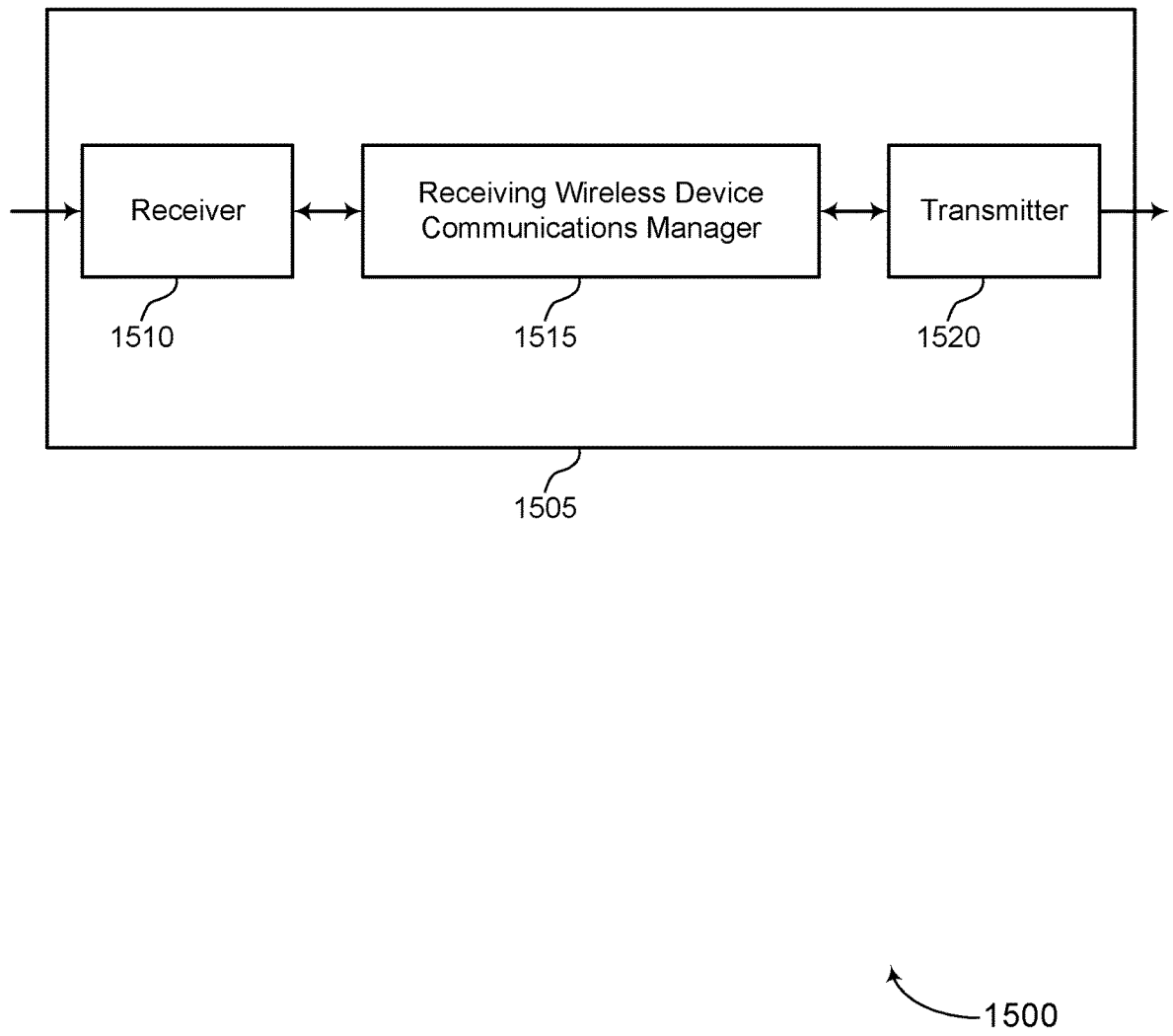
FIGS. 15 and 16 show block diagrams of devices that support parser and interleaving parameter design for RU aggregation in accordance with aspects of the present disclosure.

FIG. 15 shows a block diagram 1500 of a device 1505 that supports parser and interleaving parameter design for RU aggregation in accordance with aspects of the present disclosure. The device 1505 may be an example of aspects of a receiving wireless device (for example, an AP 102 or an STA 104) as described herein. The device 1505 may include a receiver 1510, a receiving wireless device communications manager 1515, and a transmitter 1520. The receiving wireless device communications manager 1515 can be implemented, at least in part, by one or both of a modem and a processor. Each of these components may be in communication with one another (for example, via one or more buses).

Receiver 1510 may receive information such as packets, user data, or control information associated with various information channels (for example, control channels, data channels, and information related to parser and interleaving parameter design for RU aggregation). Information may be passed on to other components of the device. The receiver 1510 may be an example of aspects of the transceiver 1820 described with reference to FIG. 18. The receiver 1510 may utilize a single antenna or a set of antennas.

The receiving wireless device communications manager 1515 may determine an allocation of a set of RUs for the receiving wireless device in a BSS, the set of RUs associated with two or more bandwidth segments of a bandwidth allocation. Additionally, the receiving wireless device communications manager 1515 may determine a first value of a parameter that indicates a tone configuration for a combination of the allocated set of RUs, the first value of the parameter for the combination different from each value of the parameter associated with a respective one RU of the allocated set of RUs. In some implementations, the receiving wireless device communications manager 1515 may receive a set of coded bits of a data unit on the allocated set of RUs according to the tone configuration indicated by the first value of the parameter. The receiving wireless device communications manager 1515 may be an example of aspects of the receiving wireless device communications manager 1810 described herein.

The receiving wireless device communications manager 1515, or its sub-components, may be implemented in hardware, code (for example, software or firmware) executed by a processor, or any combination thereof. If implemented in code executed by a processor, the functions of the receiving wireless device communications manager 1515, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The receiving wireless device communications manager 1515, or its sub-components, may be physically located at different locations, including being distributed such that portions of functions are implemented at different physical locations by one or more physical components. In some examples, the receiving wireless device communications manager 1515, or its sub-components, may be a separate and distinct component in accordance with various aspects of the present disclosure. In some examples, the receiving wireless device communications manager 1515, or its sub-components, may be combined with one or more other hardware components, including but not limited to an I/O component, a transceiver, a network server, another computing device, one or more other components described in the present disclosure, or a combination thereof in accordance with various aspects of the present disclosure.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
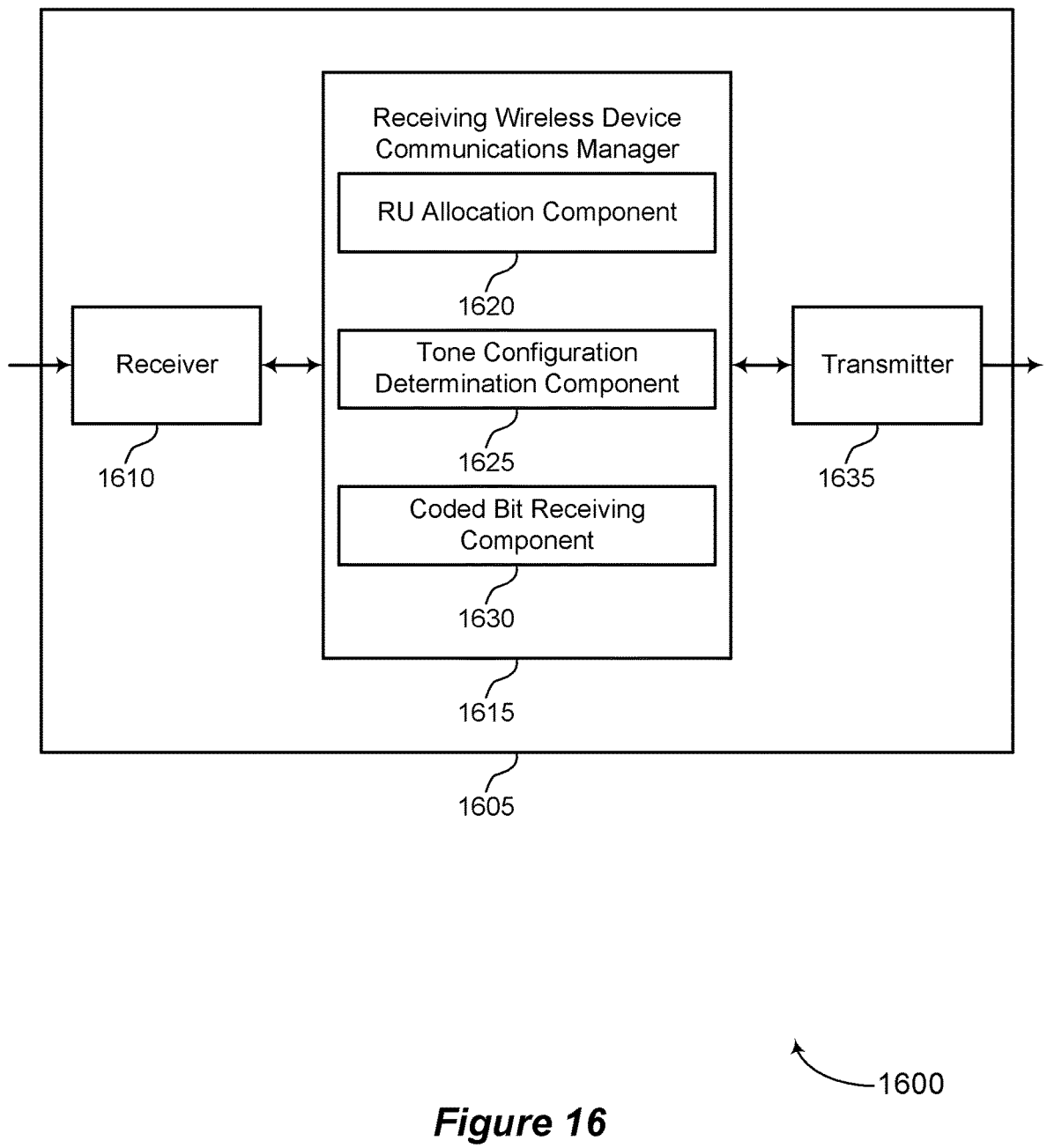

FIG. 16 shows a block diagram 1600 of a device 1605 that supports parser and interleaving parameter design for RU aggregation in accordance with aspects of the present disclosure. The device 1605 may be an example of aspects of a device 1505 or a receiving wireless device (for example, an AP 102 or a STA 104) as described herein. The device 1605 may include a receiver 1610, a receiving wireless device communications manager 1615, and a transmitter 1635. The receiving wireless device communications manager 1615 can be implemented, at least in part, by one or both of a modem and a processor. Each of these components may be in communication with one another (for example, via one or more buses).

Receiver 1610 may receive information such as packets, user data, or control information associated with various information channels (for example, control channels, data channels, and information related to parser and interleaving parameter design for RU aggregation). Information may be passed on to other components of the device. The receiver 1610 may be an example of aspects of the transceiver 1820 described with reference to FIG. 18. The receiver 1610 may utilize a single antenna or a set of antennas.

The receiving wireless device communications manager 1615 may be an example of aspects of the receiving wireless device communications manager 1515 as described herein. The receiving wireless device communications manager 1615 may include a RU allocation component 1620, a tone configuration determination component 1625, and a coded bit receiving component 1630. The receiving wireless device communications manager 1615 may be an example of aspects of the receiving wireless device communications manager 1810 described herein.

The RU allocation component 1620 may determine an allocation of a set of RUs for the receiving wireless device in a BSS, the set of RUs associated with two or more bandwidth segments of a bandwidth allocation.

The tone configuration determination component 1625 may determine a first value of a parameter that indicates a tone configuration for a combination of the allocated set of RUs, the first value of the parameter for the combination different from each value of the parameter associated with a respective one RU of the allocated set of RUs.

The coded bit receiving component 1630 may receive a set of coded bits of a data unit on the allocated set of RUs according to the tone configuration indicated by the first value of the parameter.

Transmitter 1635 may transmit signals generated by other components of the device. In some examples, the transmitter 1635 may be collocated with a receiver 1610 in a transceiver module. For example, the transmitter 1635 may be an example of aspects of the transceiver 1820 described with reference to FIG. 18. The transmitter 1635 may utilize a single antenna or a set of antennas.

Figure 17:
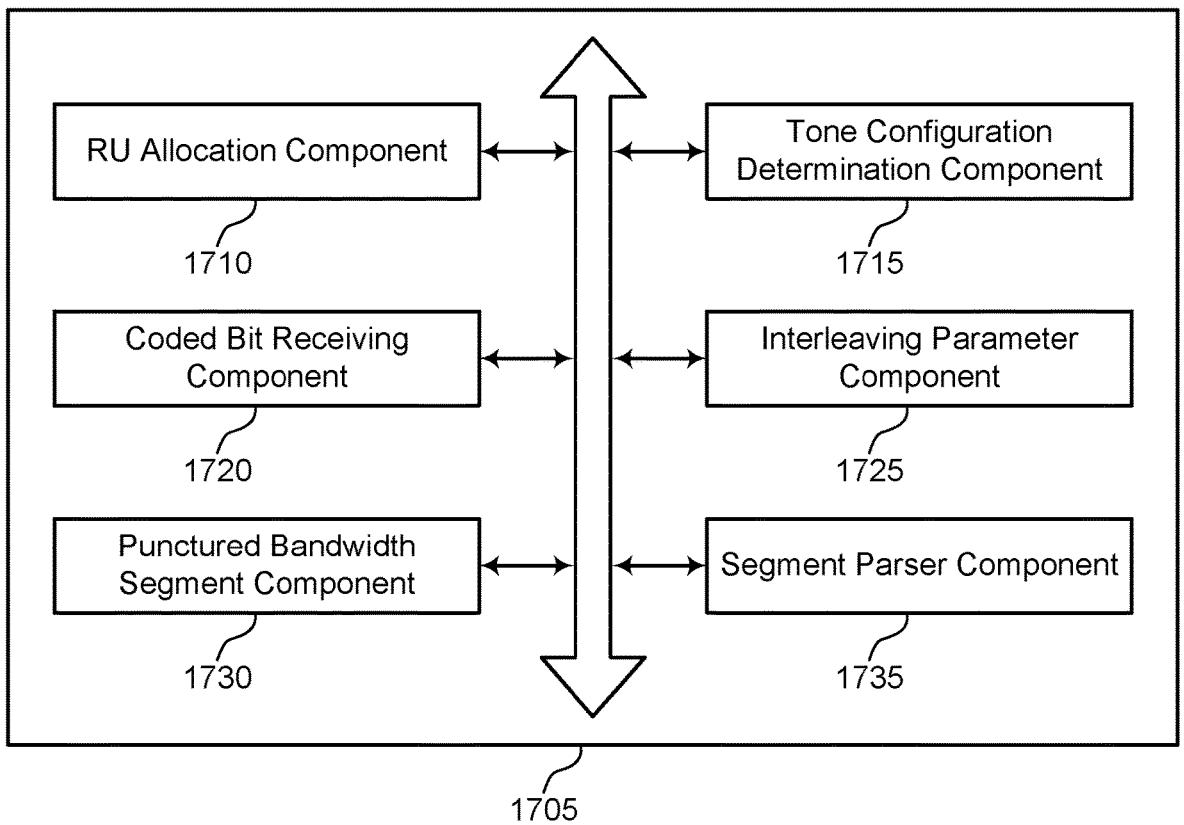
FIG. 17 shows a block diagram of a receiving wireless device communications manager that supports parser and interleaving parameter design for RU aggregation in accordance with aspects of the present disclosure.

FIG. 17 shows a block diagram 1700 of a receiving wireless device communications manager 1705 that supports parser and interleaving parameter design for RU aggregation in accordance with aspects of the present disclosure. The receiving wireless device communications manager 1705 may be an example of aspects of a receiving wireless device communications manager 1515, a receiving wireless device communications manager 1615, or a receiving wireless device communications manager 1810 described herein. The receiving wireless device communications manager 1705 may include a RU allocation component 1710, a tone configuration determination component 1715, a coded bit receiving component 1720, an interleaving parameter component 1725, a punctured bandwidth segment component 1730, and a segment parser component 1735. Each of these modules may communicate, directly or indirectly, with one another (for example, via one or more buses).

The RU allocation component 1710 may determine an allocation of a set of RUs for the receiving wireless device in a BSS, the set of RUs associated with two or more bandwidth segments of a bandwidth allocation.

In some examples, the RU allocation component 1710 may receive, from a transmitting wireless device, an indication of an SU allocation of the bandwidth allocation and may determine the allocation of the set of RUs within the SU allocation of the bandwidth allocation based on the determining that the at least one bandwidth segment of the bandwidth allocation is punctured. Additionally or alternatively, the set of resource units may include a set of RUs for uplink OFDMA of the two or more bandwidth segments by a STA, and the RU allocation component 1710 may transmit an indication of the allocation to the STA, in which the receiving wireless device includes an AP.

In some implementations, the RU allocation component 1710 may receive, from an AP, an indication of the allocation of the set of RUs, the set of RUs including a set of RUs for downlink OFDMA of the two or more bandwidth segments by an STA, in which the receiving wireless device includes the STA, and may determine the allocation based on the received indication of the allocation. Additionally, the RU allocation component 1710 may determine a noncontiguous bandwidth allocation including the two or more available bandwidth segments, in which the allocated set of RUs is based on the two or more available bandwidth segments.

The tone configuration determination component 1715 may determine a first value of a parameter that indicates a tone configuration for a combination of the allocated set of RUs, the first value of the parameter for the combination different from each value of the parameter associated with a respective one RU of the allocated set of RUs. In some implementations, the parameter that indicates the tone configuration may include a distance to tone mapping value. In some examples, the distance to tone mapping value is four and the allocated set of resource units includes a twenty-six tone resource unit and a fifty-two tone resource unit. In some examples, the distance to tone mapping value is six and the allocated set of resource units includes a twenty-six tone resource unit and a one hundred six tone resource unit. In some examples, the distance to tone mapping value is eighteen and the allocated set of resource units includes a two hundred forty-two tone resource unit and a four hundred eighty-four tone resource unit. Additionally or alternatively, the parameter that indicates the tone configuration may include an identification of pilot tone locations in the allocated set of RUs.

In some examples, the tone configuration determination component 1715 may determine a total number of pilot tones for the set of RUs based on a sum of a number of pilot tones in each RU of the allocated set of RUs and may receive a set of pilot tones on the allocated set of RUs according to the tone configuration indicated by the first value of the parameter that indicates the tone configuration, in which the total number of pilot tones includes the first value of the parameter.

Additionally or alternatively, the tone configuration determination component 1715 may select a subset of a set of pilot tones as data tones for the tone configuration and may determine a number of available pilot tones based on a sum of a number of pilot tones in each RU of the allocated set of RUs less the subset of the pilot tones, in which the number of available pilot tones includes the first value of the parameter that indicates the tone configuration.

In some implementations, the tone configuration determination component 1715 may determine one or more data tones are unavailable for the set of coded bits based on a punctured bandwidth segment of the bandwidth allocation, may select a subset of a set of pilot tones as data tones for the tone configuration based on the one or more unavailable data tones, and may determine a number of available pilot tones based on a sum of a number of pilot tones in each RU of the allocated set of RUs less the subset of the set of pilot tones, in which the number of available pilot tones includes the first value of the parameter that indicates the tone configuration.

The coded bit receiving component 1720 may receive a set of coded bits of a data unit on the allocated set of RUs according to the tone configuration indicated by the first value of the parameter.

The interleaving parameter component 1725 may determine one or more interleaving parameters based on the tone configuration, in which the set of coded bits are received on the allocated set of RUs according to the one or more interleaving parameters. In some implementations, the one or more interleaving parameters may include one or more of a distance tone mapping value or a number of columns for a row-column interleaving configuration.

The punctured bandwidth segment component 1730 may determine at least one bandwidth segment of the bandwidth allocation is punctured, in which the tone configuration is based on the at least one punctured bandwidth segment being unavailable for distributing the set of coded bits. In some examples, the punctured bandwidth segment component 1730 may receive, from a transmitting wireless device, an indication of a SU of the bandwidth allocation and may determine the allocation of the set of RUs within the single user allocation of the bandwidth allocation based on the determining that the at least one bandwidth segment of the bandwidth allocation is punctured.

The segment parser component 1735 may select a segment parser corresponding to a first frequency based on the bandwidth allocation. In some implementations, the first frequency may be 80 MHz, and the segment parser may be an 80 MHz segment parser.

Figure 18:
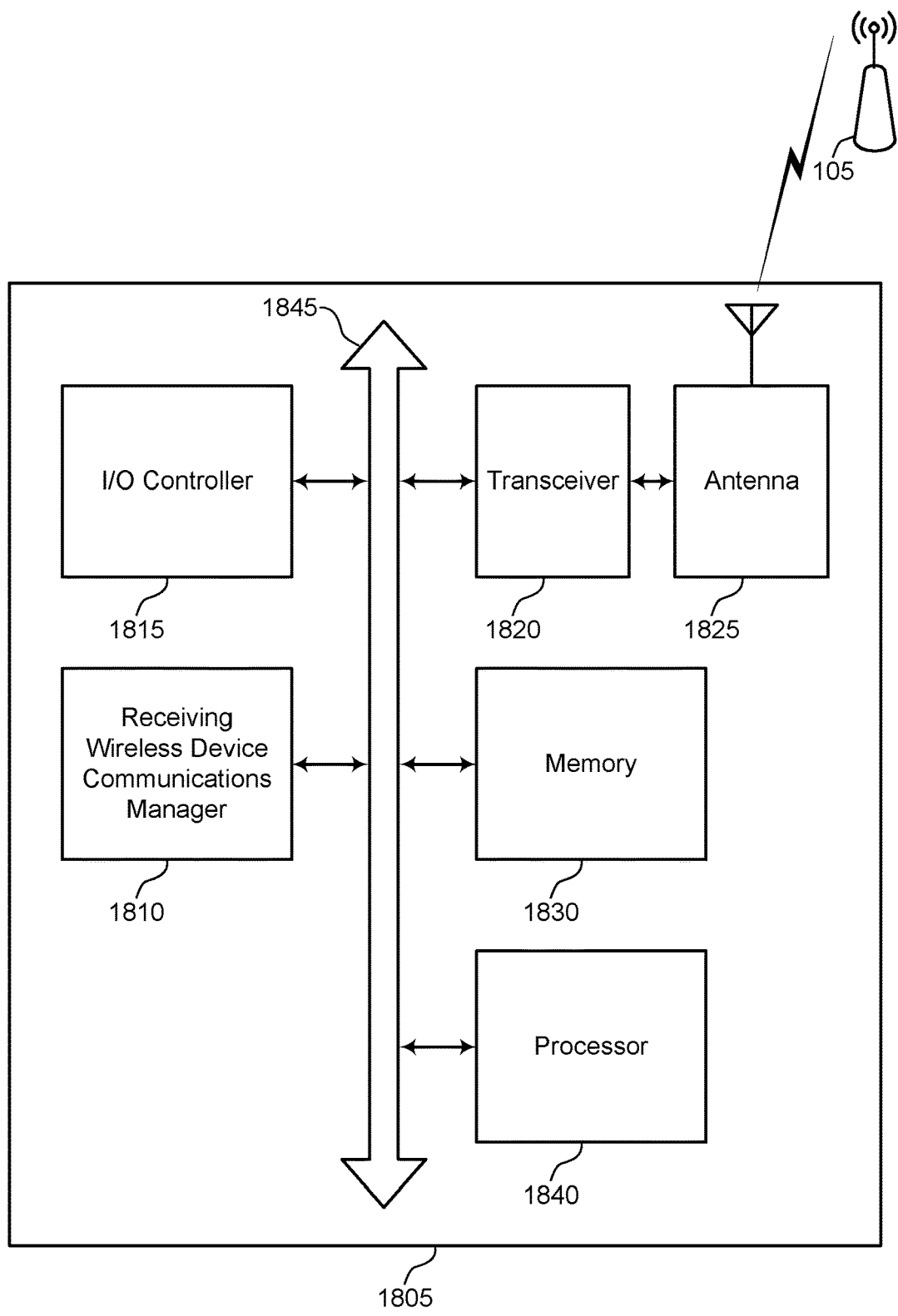
FIG. 18 shows a diagram of a system including a device that supports parser and interleaving parameter design for RU aggregation in accordance with aspects of the present disclosure.

FIG. 18 shows a diagram of a system 1800 including a device 1805 that supports parser and interleaving parameter design for RU aggregation in accordance with aspects of the present disclosure. The device 1805 may be an example of or include the components of device 1505, device 1605, or a receiving wireless device (for example, an AP 102 or a STA 104) as described herein. The device 1805 may include components for bi-directional voice and data communications including components for transmitting and receiving communications, including a receiving wireless device communications manager 1810, an I/O controller 1815, a transceiver 1820, an antenna 1825, memory 1830, and a processor 1840. These components may be in electronic communication via one or more buses (for example, bus 1845).

The receiving wireless device communications manager 1810 may determine an allocation of a set of RUs for the receiving wireless device in a BSS, the set of RUs associated with two or more bandwidth segments of a bandwidth allocation. Additionally, the receiving wireless device communications manager 1810 may determine a first value of a parameter that indicates a tone configuration for a combination of the allocated set of RUs, the first value of the parameter for the combination different from each value of the parameter associated with a respective one RU of the allocated set of RUs. In some implementations, the receiving wireless device communications manager 1810 may receive a set of coded bits of a data unit on the allocated set of RUs according to the tone configuration indicated by the first value of the parameter.

I/O controller 1815 may manage input and output signals for device 1805. I/O controller 1815 may also manage peripherals not integrated into device 1805. In some implementations, I/O controller 1815 may represent a physical connection or port to an external peripheral. In some implementations, I/O controller 1815 may utilize an operating system such as iOS®, ANDROID®, MS-DOS®, MS-WINDOWS®, OS/2®, UNIX®, LINUX®, or another known operating system. In other cases, I/O controller 1815 may represent or interact with a modem, a keyboard, a mouse, a touchscreen, or a similar device. In some implementations, I/O controller 1815 may be implemented as part of a processor. In some implementations, a user may interact with device 1805 via I/O controller 1815 or via hardware components controlled by I/O controller 1815.

Transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some implementations, the wireless device may include a single antenna 1825. However, in some implementations, the device may have more than one antenna 1825, which may be capable of concurrently transmitting or receiving multiple wireless transmissions.

Memory 1830 may include RAM and ROM. The memory 1830 may store computer-readable, computer-executable software 1835 including instructions that, when executed, cause the processor to perform various functions described herein. In some implementations, the memory 1830 may contain, among other things, a BIOS which may control basic hardware or software operation such as the interaction with peripheral components or devices.

Processor 1840 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, processor 1840 may be configured to operate a memory array using a memory controller. In other cases, a memory controller may be integrated into processor 1840. Processor 1840 may be configured to execute computer-readable instructions stored in a memory to perform various functions (for example, functions or tasks supporting parser and interleaving parameter design for RU aggregation).

Figure 19:
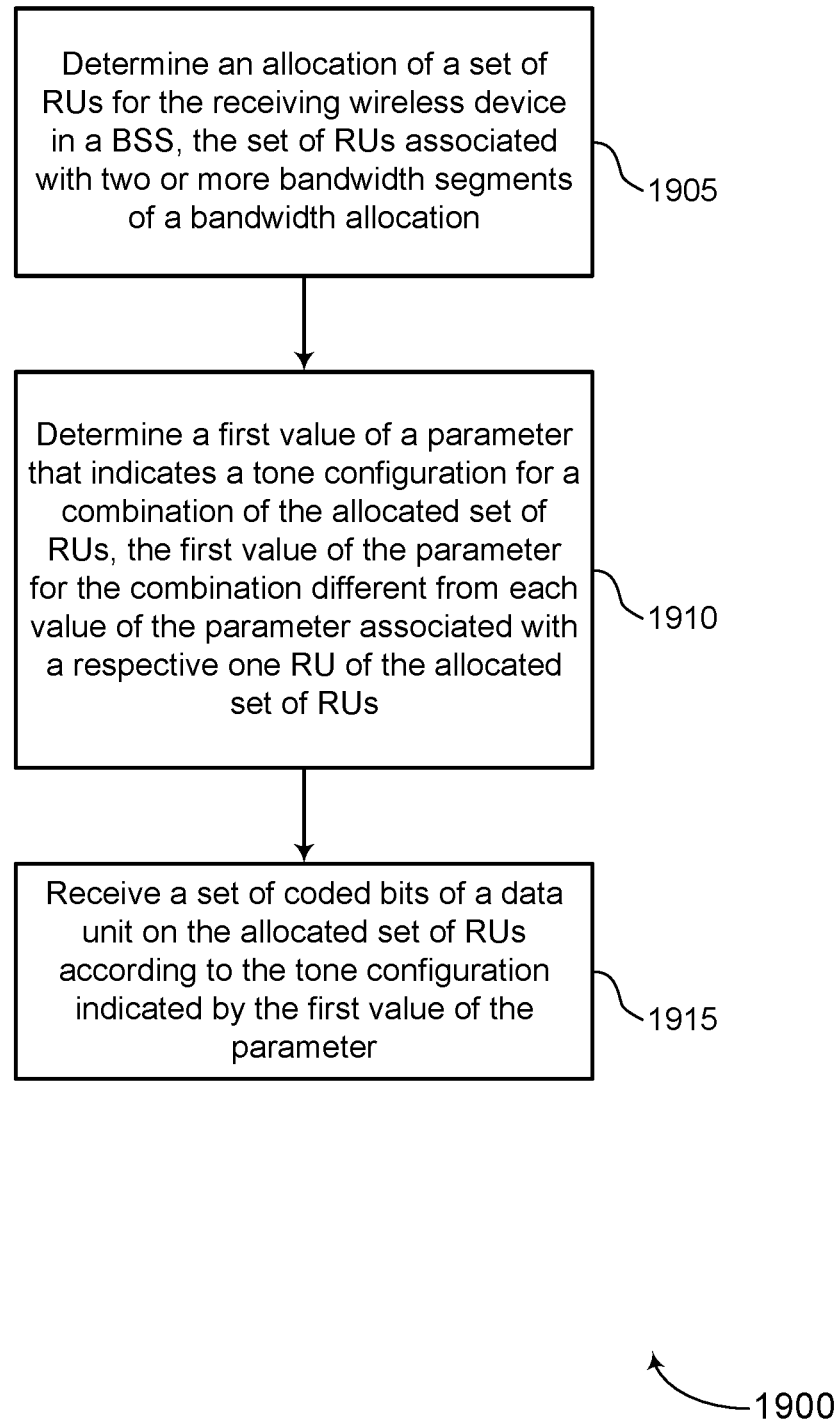
FIGS. 19 through 24 show flowcharts illustrating methods that support parser and interleaving parameter design for RU aggregation in accordance with aspects of the present disclosure.

FIG. 19 shows a flowchart illustrating a method 1900 that supports parser and interleaving parameter design for RU aggregation in accordance with aspects of the present disclosure. The operations of method 1900 may be implemented by a receiving wireless device or its components as described herein. For example, the operations of method 1900 may be performed by a receiving wireless device communications manager as described with reference to FIGS. 15 through 18. In some examples, a receiving wireless device may execute a set of instructions to control the functional elements of the receiving wireless device to perform the functions described below. Additionally or alternatively, a receiving wireless device may perform aspects of the functions described below using special-purpose hardware.

At 1905, the receiving wireless device may determine an allocation of a set of RUs for the receiving wireless device in a BSS, the set of RUs associated with two or more bandwidth segments of a bandwidth allocation. The operations of 1905 may be performed according to the methods described herein. In some examples, aspects of the operations of 1905 may be performed by a RU allocation component as described with reference to FIGS. 15 through 18.

At 1910, the receiving wireless device may determine a first value of a parameter that indicates a tone configuration for a combination of the allocated set of RUs, the first value of the parameter for the combination different from each value of the parameter associated with a respective one RU of the allocated set of RUs. The operations of 1910 may be performed according to the methods described herein. In some examples, aspects of the operations of 1910 may be performed by a tone configuration determination component as described with reference to FIGS. 15 through 18.

At 1915, the receiving wireless device may receive a set of coded bits of a data unit on the allocated set of RUs according to the tone configuration indicated by the first value of the parameter. The operations of 1915 may be performed according to the methods described herein. In some examples, aspects of the operations of 1915 may be performed by a coded bit receiving component as described with reference to FIGS. 15 through 18.

Figure 20:
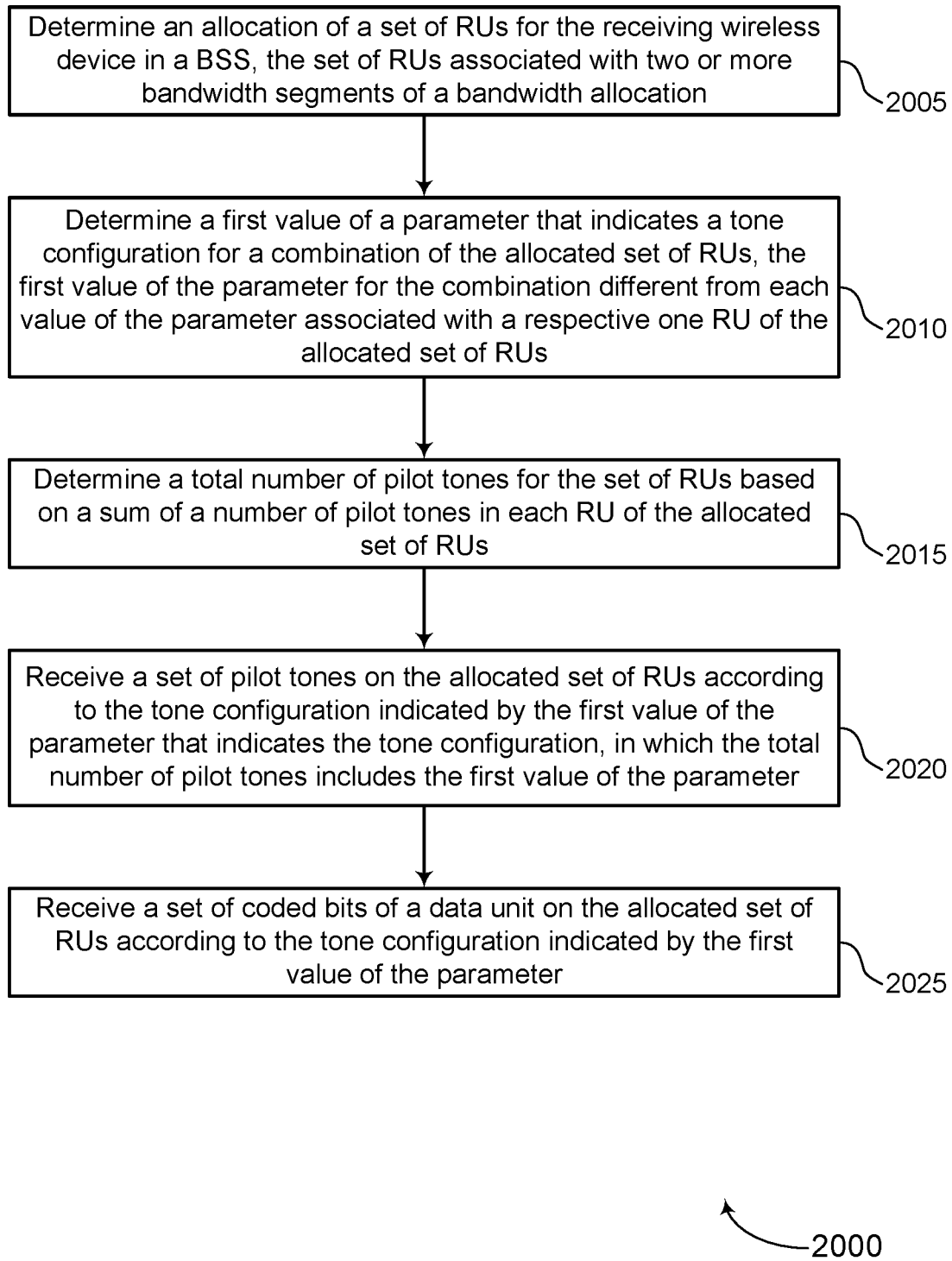

FIG. 20 shows a flowchart illustrating a method 2000 that supports parser and interleaving parameter design for RU aggregation in accordance with aspects of the present disclosure. The operations of method 2000 may be implemented by a receiving wireless device or its components as described herein. For example, the operations of method 2000 may be performed by a receiving wireless device communications manager as described with reference to FIGS. 15 through 18. In some examples, a receiving wireless device may execute a set of instructions to control the functional elements of the receiving wireless device to perform the functions described below. Additionally or alternatively, a receiving wireless device may perform aspects of the functions described below using special-purpose hardware.

At 2005, the receiving wireless device may determine an allocation of a set of RUs for the receiving wireless device in a BSS, the set of RUs associated with two or more bandwidth segments of a bandwidth allocation. The operations of 2005 may be performed according to the methods described herein. In some examples, aspects of the operations of 2005 may be performed by a RU allocation component as described with reference to FIGS. 15 through 18.

At 2010, the receiving wireless device may determine a first value of a parameter that indicates a tone configuration for a combination of the allocated set of RUs, the first value of the parameter for the combination different from each value of the parameter associated with a respective one RU of the allocated set of RUs. The operations of 2010 may be performed according to the methods described herein. In some examples, aspects of the operations of 2010 may be performed by a tone configuration determination component as described with reference to FIGS. 15 through 18.

At 2015, the receiving wireless device may determine a total number of pilot tones for the set of RUs based on a sum of a number of pilot tones in each RU of the allocated set of RUs. The operations of 2015 may be performed according to the methods described herein. In some examples, aspects of the operations of 2015 may be performed by a tone configuration determination component as described with reference to FIGS. 15 through 18.

At 2020, the receiving wireless device may receive a set of pilot tones on the allocated set of RUs according to the tone configuration indicated by the first value of the parameter that indicates the tone configuration, in which the total number of pilot tones includes the first value of the parameter. The operations of 2020 may be performed according to the methods described herein. In some examples, aspects of the operations of 2020 may be performed by a tone configuration determination component as described with reference to FIGS. 15 through 18.

At 2025, the receiving wireless device may receive a set of coded bits of a data unit on the allocated set of RUs according to the tone configuration indicated by the first value of the parameter. The operations of 2025 may be performed according to the methods described herein. In some examples, aspects of the operations of 2025 may be performed by a coded bit receiving component as described with reference to FIGS. 15 through 18.

Figure 21:
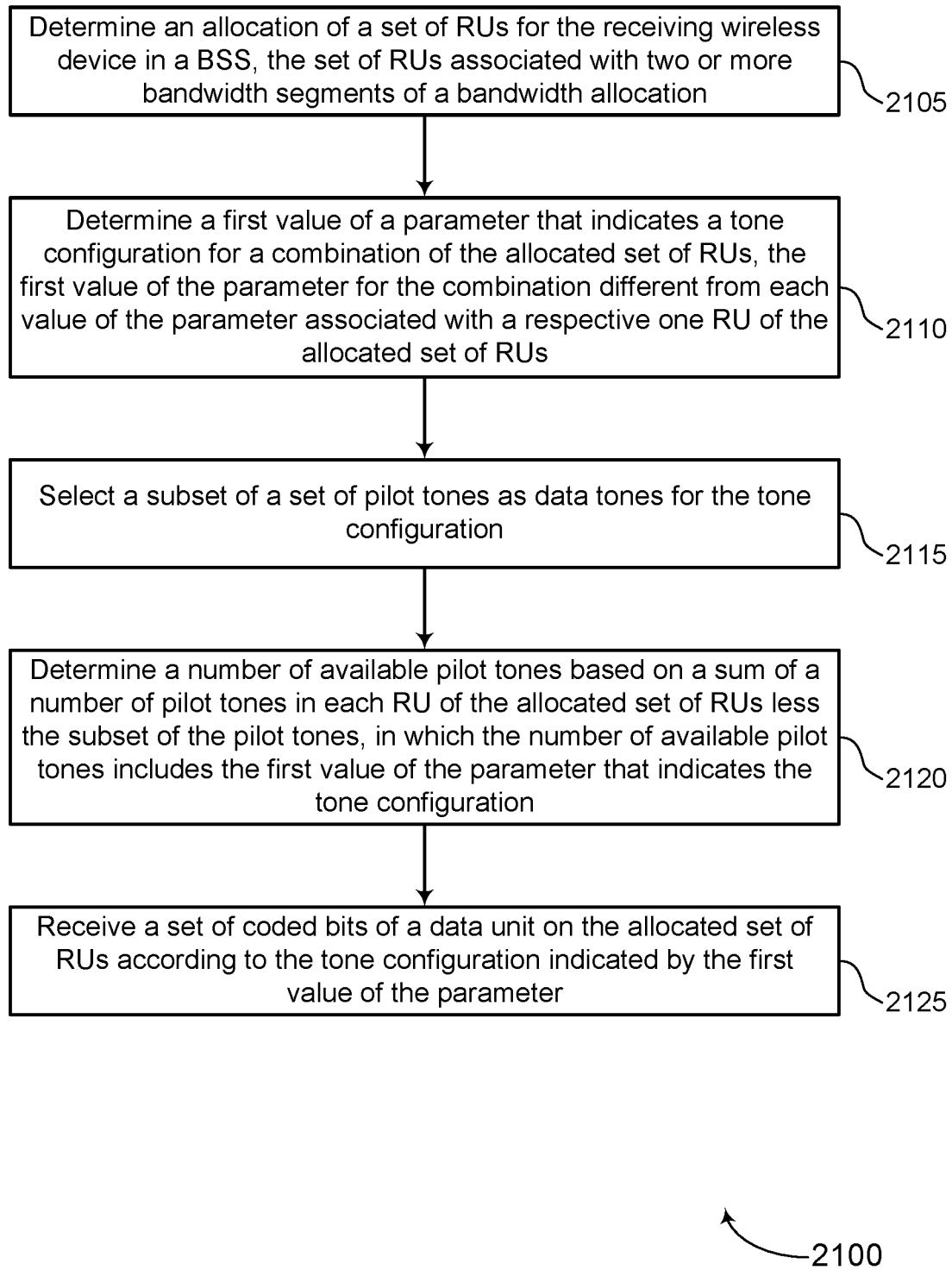

FIG. 21 shows a flowchart illustrating a method 2100 that supports parser and interleaving parameter design for RU aggregation in accordance with aspects of the present disclosure. The operations of method 2100 may be implemented by a receiving wireless device or its components as described herein. For example, the operations of method 2100 may be performed by a receiving wireless device communications manager as described with reference to FIGS. 15 through 18. In some examples, a receiving wireless device may execute a set of instructions to control the functional elements of the receiving wireless device to perform the functions described below. Additionally or alternatively, a receiving wireless device may perform aspects of the functions described below using special-purpose hardware.

At 2105, the receiving wireless device may determine an allocation of a set of RUs for the receiving wireless device in a BSS, the set of RUs associated with two or more bandwidth segments of a bandwidth allocation. The operations of 2105 may be performed according to the methods described herein. In some examples, aspects of the operations of 2105 may be performed by a RU allocation component as described with reference to FIGS. 15 through 18.

At 2110, the receiving wireless device may determine a first value of a parameter that indicates a tone configuration for a combination of the allocated set of RUs, the first value of the parameter for the combination different from each value of the parameter associated with a respective one RU of the allocated set of RUs. The operations of 2110 may be performed according to the methods described herein. In some examples, aspects of the operations of 2110 may be performed by a tone configuration determination component as described with reference to FIGS. 15 through 18.

At 2115, the receiving wireless device may select a subset of a set of pilot tones as data tones for the tone configuration. The operations of 2115 may be performed according to the methods described herein. In some examples, aspects of the operations of 2115 may be performed by a tone configuration determination component as described with reference to FIGS. 15 through 18.

At 2120, the receiving wireless device may determine a number of available pilot tones based on a sum of a number of pilot tones in each RU of the allocated set of RUs less the subset of the pilot tones, in which the number of available pilot tones includes the first value of the parameter that indicates the tone configuration. The operations of 2120 may be performed according to the methods described herein. In some examples, aspects of the operations of 2120 may be performed by a tone configuration determination component as described with reference to FIGS. 15 through 18.

At 2125, the receiving wireless device may receive a set of coded bits of a data unit on the allocated set of RUs according to the tone configuration indicated by the first value of the parameter. The operations of 2125 may be performed according to the methods described herein. In some examples, aspects of the operations of 2125 may be performed by a coded bit receiving component as described with reference to FIGS. 15 through 18.

Figure 22:
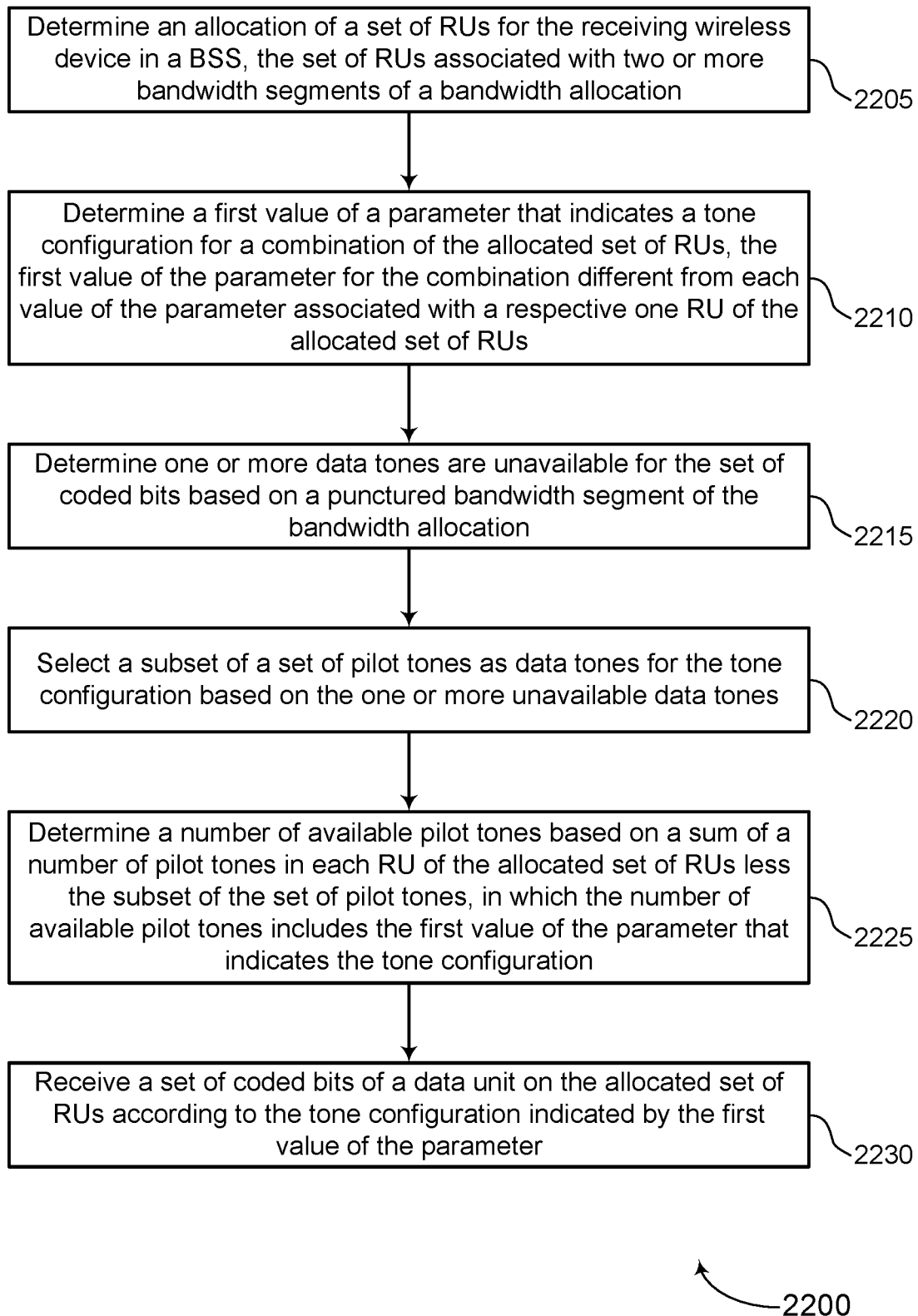

FIG. 22 shows a flowchart illustrating a method 2200 that supports parser and interleaving parameter design for RU aggregation in accordance with aspects of the present disclosure. The operations of method 2200 may be implemented by a receiving wireless device or its components as described herein. For example, the operations of method 2200 may be performed by a receiving wireless device communications manager as described with reference to FIGS. 15 through 18. In some examples, a receiving wireless device may execute a set of instructions to control the functional elements of the receiving wireless device to perform the functions described below. Additionally or alternatively, a receiving wireless device may perform aspects of the functions described below using special-purpose hardware.

At 2205, the receiving wireless device may determine an allocation of a set of RUs for the receiving wireless device in a BSS, the set of RUs associated with two or more bandwidth segments of a bandwidth allocation. The operations of 2205 may be performed according to the methods described herein. In some examples, aspects of the operations of 2205 may be performed by a RU allocation component as described with reference to FIGS. 15 through 18.

At 2210, the receiving wireless device may determine a first value of a parameter that indicates a tone configuration for a combination of the allocated set of RUs, the first value of the parameter for the combination different from each value of the parameter associated with a respective one RU of the allocated set of RUs. The operations of 2210 may be performed according to the methods described herein. In some examples, aspects of the operations of 2210 may be performed by a tone configuration determination component as described with reference to FIGS. 15 through 18.

At 2215, the receiving wireless device may determine one or more data tones are unavailable for the set of coded bits based on a punctured bandwidth segment of the bandwidth allocation. The operations of 2215 may be performed according to the methods described herein. In some examples, aspects of the operations of 2215 may be performed by a tone configuration determination component as described with reference to FIGS. 15 through 18.

At 2220, the receiving wireless device may select a subset of a set of pilot tones as data tones for the tone configuration based on the one or more unavailable data tones. The operations of 2220 may be performed according to the methods described herein. In some examples, aspects of the operations of 2220 may be performed by a tone configuration determination component as described with reference to FIGS. 15 through 18.

At 2225, the receiving wireless device may determine a number of available pilot tones based on a sum of a number of pilot tones in each RU of the allocated set of RUs less the subset of the set of pilot tones, in which the number of available pilot tones includes the first value of the parameter that indicates the tone configuration. The operations of 2225 may be performed according to the methods described herein. In some examples, aspects of the operations of 2225 may be performed by a tone configuration determination component as described with reference to FIGS. 15 through 18.

At 2230, the receiving wireless device may receive a set of coded bits of a data unit on the allocated set of RUs according to the tone configuration indicated by the first value of the parameter. The operations of 2230 may be performed according to the methods described herein. In some examples, aspects of the operations of 2230 may be performed by a coded bit receiving component as described with reference to FIGS. 15 through 18.

Figure 23:
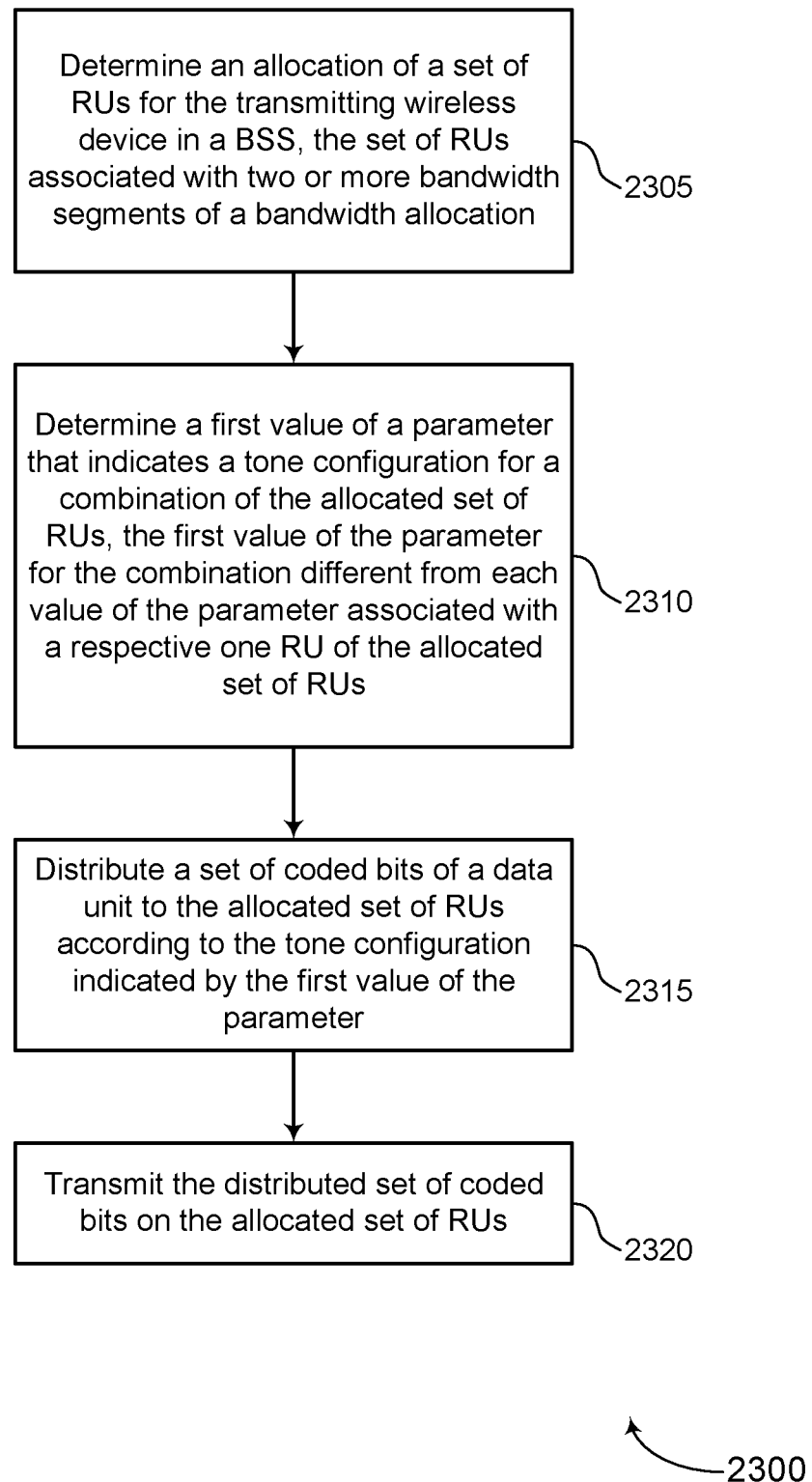

FIG. 23 shows a flowchart illustrating a method 2300 that supports parser and interleaving parameter design for RU aggregation in accordance with aspects of the present disclosure. The operations of method 2300 may be implemented by a transmitting wireless device or its components as described herein. For example, the operations of method 2300 may be performed by a transmitting wireless device communications manager as described with reference to FIGS. 11 through 14. In some examples, a transmitting wireless device may execute a set of instructions to control the functional elements of the transmitting wireless device to perform the functions described below. Additionally or alternatively, a transmitting wireless device may perform aspects of the functions described below using special-purpose hardware.

At 2305, the transmitting wireless device may determine an allocation of a set of RUs for the transmitting wireless device in a BSS, the set of RUs associated with two or more bandwidth segments of a bandwidth allocation. The operations of 2305 may be performed according to the methods described herein. In some examples, aspects of the operations of 2305 may be performed by a RU allocation determination component as described with reference to FIGS. 11 through 14.

At 2310, the transmitting wireless device may determine a first value of a parameter that indicates a tone configuration for a combination of the allocated set of RUs, the first value of the parameter for the combination different from each value of the parameter associated with a respective one RU of the allocated set of RUs. The operations of 2310 may be performed according to the methods described herein. In some examples, aspects of the operations of 2310 may be performed by a tone configuration value component as described with reference to FIGS. 11 through 14.

At 2315, the transmitting wireless device may distribute a set of coded bits of a data unit to the allocated set of RUs according to the tone configuration indicated by the first value of the parameter. The operations of 2315 may be performed according to the methods described herein. In some examples, aspects of the operations of 2315 may be performed by a coded bit distribution component as described with reference to FIGS. 11 through 14.

At 2320, the transmitting wireless device may transmit the distributed set of coded bits on the allocated set of RUs. The operations of 2320 may be performed according to the methods described herein. In some examples, aspects of the operations of 2320 may be performed by a coded bit transmission component as described with reference to FIGS. 11 through 14.

Figure 24:
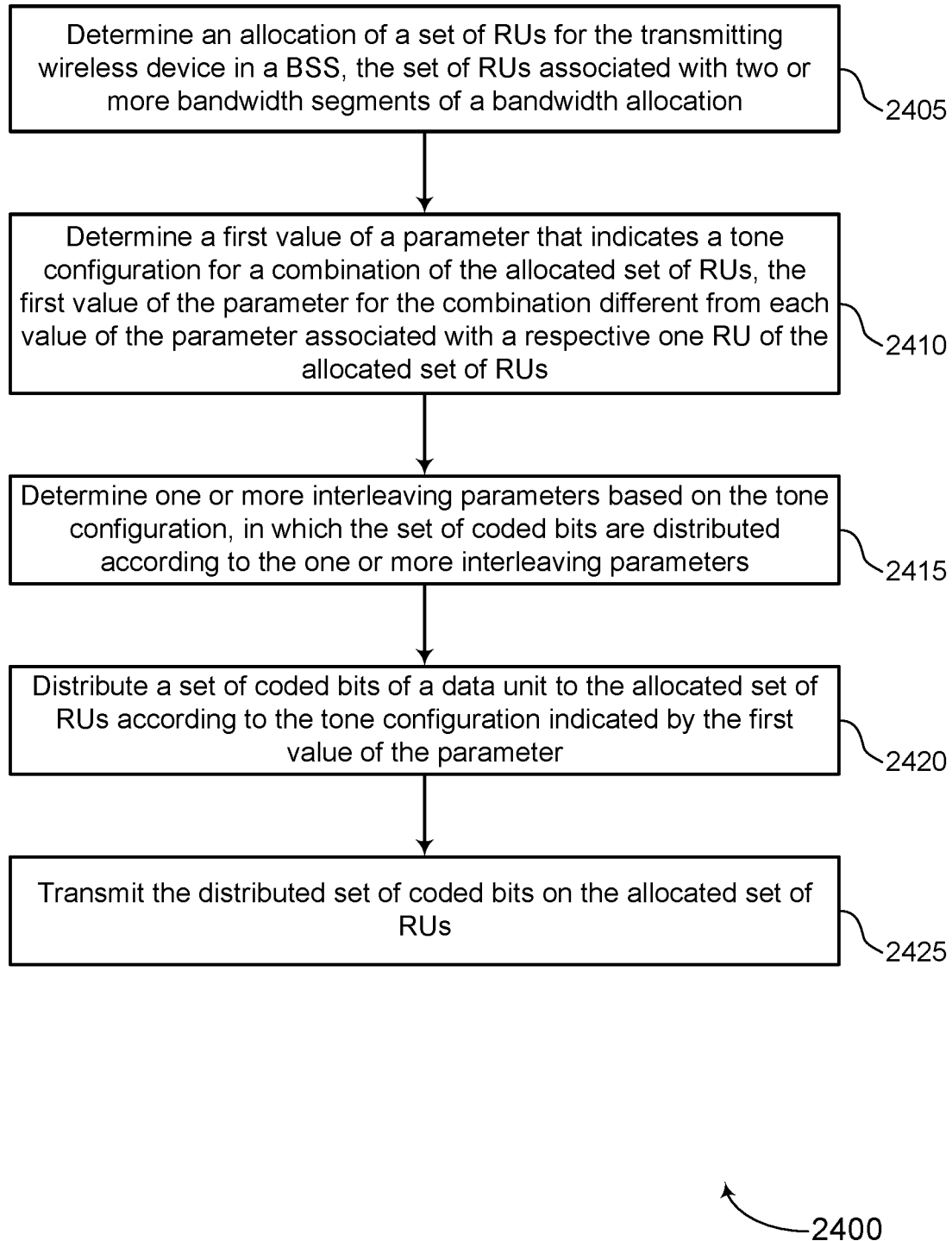

FIG. 24 shows a flowchart illustrating a method 2400 that supports parser and interleaving parameter design for RU aggregation in accordance with aspects of the present disclosure. The operations of method 2400 may be implemented by a transmitting wireless device or its components as described herein. For example, the operations of method 2400 may be performed by a transmitting wireless device communications manager as described with reference to FIGS. 11 through 14. In some examples, a transmitting wireless device may execute a set of instructions to control the functional elements of the transmitting wireless device to perform the functions described below. Additionally or alternatively, a transmitting wireless device may perform aspects of the functions described below using special-purpose hardware.

At 2405, the transmitting wireless device may determine an allocation of a set of RUs for the transmitting wireless device in a BSS, the set of RUs associated with two or more bandwidth segments of a bandwidth allocation. The operations of 2405 may be performed according to the methods described herein. In some examples, aspects of the operations of 2405 may be performed by a RU allocation determination component as described with reference to FIGS. 11 through 14.

At 2410, the transmitting wireless device may determine a first value of a parameter that indicates a tone configuration for a combination of the allocated set of RUs, the first value of the parameter for the combination different from each value of the parameter associated with a respective one RU of the allocated set of RUs. The operations of 2410 may be performed according to the methods described herein. In some examples, aspects of the operations of 2410 may be performed by a tone configuration value component as described with reference to FIGS. 11 through 14.

At 2415, the transmitting wireless device may determine one or more interleaving parameters based on the tone configuration, in which the set of coded bits are distributed according to the one or more interleaving parameters. The operations of 2415 may be performed according to the methods described herein. In some examples, aspects of the operations of 2415 may be performed by an interleaving parameter determination component as described with reference to FIGS. 11 through 14.

At 2420, the transmitting wireless device may distribute a set of coded bits of a data unit to the allocated set of RUs according to the tone configuration indicated by the first value of the parameter. The operations of 2420 may be performed according to the methods described herein. In some examples, aspects of the operations of 2420 may be performed by a coded bit distribution component as described with reference to FIGS. 11 through 14.

At 2425, the transmitting wireless device may transmit the distributed set of coded bits on the allocated set of RUs. The operations of 2425 may be performed according to the methods described herein. In some examples, aspects of the operations of 2425 may be performed by a coded bit transmission component as described with reference to FIGS. 11 through 14.

It should be noted that the methods described herein describe possible implementations, and that the operations and the blocks or steps may be rearranged or otherwise modified and that other implementations are possible. Further, aspects from two or more of the methods may be combined.

The following provides an overview of aspects of the present disclosure:

Aspect 1: A method for wireless communications at a receiving wireless device, comprising: determining an allocation of a set of resource units for the receiving wireless device in a basic service set, the set of resource units associated with two or more bandwidth segments of a bandwidth allocation; determining a first value of a parameter that indicates a tone configuration for a combination of the allocated set of resource units, the first value of the parameter for the combination different from each value of the parameter associated with a respective one resource unit of the allocated set of resource units; and receiving a set of coded bits of a data unit on the allocated set of resource units according to the tone configuration indicated by the first value of the parameter.

Aspect 2: The method of aspect 1, wherein determining the first value of the parameter that indicates the tone configuration for the combination of the allocated set of resource units comprises: determining a total number of pilot tones for the set of resource units based at least in part on a sum of a number of pilot tones in each resource unit of the allocated set of resource units, the method further comprising: receiving a set of pilot tones on the allocated set of resource units according to the tone configuration indicated by the first value of the parameter that indicates the tone configuration, wherein the total number of pilot tones comprises the first value of the parameter.

Aspect 3: The method of aspect 1, wherein determining the first value of the parameter that indicates the tone configuration for the combination of the allocated set of resource units comprises: selecting a subset of a set of pilot tones as data tones for the tone configuration; and determining a number of available pilot tones based at least in part on a sum of a number of pilot tones in each resource unit of the allocated set of resource units less the subset of the pilot tones, wherein the number of available pilot tones comprises the first value of the parameter that indicates the tone configuration.

Aspect 4: The method of aspect 1, wherein determining the first value of the parameter that indicates the tone configuration for the combination of the allocated set of resource units comprises: determining one or more data tones are unavailable for the set of coded bits based at least in part on a punctured bandwidth segment of the bandwidth allocation; selecting a subset of a set of pilot tones as data tones for the tone configuration based at least in part on the one or more unavailable data tones; and determining a number of available pilot tones based at least in part on a sum of a number of pilot tones in each resource unit of the allocated set of resource units less the subset of the set of pilot tones, wherein the number of available pilot tones comprises the first value of the parameter that indicates the tone configuration.

Aspect 5: The method of any of aspects 1 through 4, further comprising: determining one or more interleaving parameters based at least in part on the tone configuration, wherein the set of coded bits are received on the allocated set of resource units according to the one or more interleaving parameters.

Aspect 6: The method of aspect 5, wherein the one or more interleaving parameters comprise one or more of a distance tone mapping value or a number of columns for a row-column interleaving configuration.

Aspect 7: The method of any of aspects 1 through 6, further comprising: determining at least one bandwidth segment of the bandwidth allocation is punctured, wherein the tone configuration is based at least in part on the at least one punctured bandwidth segment being unavailable for distributing the set of coded bits.

Aspect 8: The method of aspect 7, wherein determining the allocation of the set of resource units comprises: receiving, from a transmitting wireless device, an indication of a single user allocation of the bandwidth allocation; and determining the allocation of the set of resource units within the single user allocation of the bandwidth allocation based at least in part on the determining that the at least one bandwidth segment of the bandwidth allocation is punctured.

Aspect 9: The method of any of aspects 1 through 8, wherein the set of resource units comprises a plurality of resource units for uplink orthogonal frequency-division multiple access (OFDMA) of the two or more bandwidth segments by a station, the method further comprising: transmitting an indication of the allocation to the station, wherein the receiving wireless device comprises an access point.

Aspect 10: The method of any of aspects 1 through 8, wherein determining the allocation of the set of resource units comprises: receiving, from an access point, an indication of the allocation of the set of resource units, the set of resource units comprising a plurality of resource units for downlink orthogonal frequency-division multiple access (OFDMA) of the two or more bandwidth segments by a station, wherein the receiving wireless device comprises the station; and determining the allocation based at least in part on the received indication of the allocation.

Aspect 11: The method of any of aspects 1 through 10, further comprising selecting a segment parser corresponding to a first frequency based at least in part on the bandwidth allocation.

Aspect 12: The method of aspect 11, wherein the first frequency is eighty megahertz, and the segment parser is an eighty megahertz segment parser.

Aspect 13: The method of any of aspects 1 through 12, further comprising determining a noncontiguous bandwidth allocation comprising the two or more available bandwidth segments, wherein the allocated set of resource units is based at least in part on the two or more available bandwidth segments.

Aspect 14: The method of any of aspects 1 through 13, wherein the parameter that indicates the tone configuration comprises a distance to tone mapping value.

Aspect 15: The method of aspect 14, wherein the distance to tone mapping value is four and the allocated set of resource units comprises a twenty-six tone resource unit and a fifty-two tone resource unit.

Aspect 16: The method of aspect 14, wherein the distance to tone mapping value is six and the allocated set of resource units comprises a twenty-six tone resource unit and a one hundred six tone resource unit.

Aspect 17: The method of aspect 14, wherein the distance to tone mapping value is eighteen and the allocated set of resource units comprises a two hundred forty-two tone resource unit and a four hundred eighty-four tone resource unit.

Aspect 18: The method of any of aspects 1 through 17, wherein the parameter that indicates the tone configuration comprises an identification of pilot tone locations in the allocated set of resource units.

Aspect 19: A method for wireless communications at transmitting wireless device, comprising: determining an allocation of a set of resource units for the transmitting wireless device in a basic service set, the set of resource units associated with two or more bandwidth segments of a bandwidth allocation; determining a first value of a parameter that indicates a tone configuration for a combination of the allocated set of resource units, the first value of the parameter for the combination different from each value of the parameter associated with a respective one resource unit of the allocated set of resource units; distributing a set of coded bits of a data unit to the allocated set of resource units according to the tone configuration indicated by the first value of the parameter; and transmitting the distributed set of coded bits on the allocated set of resource units.

Aspect 20: The method of aspect 19, wherein determining the first value of the parameter that indicates the tone configuration for the combination of the allocated set of resource units comprises: determining a total number of pilot tones for the set of resource units based at least in part on a sum of a number of pilot tones in each resource unit of the allocated set of resource units, the method further comprising: transmitting a set of pilot tones on the allocated set of resource units according to the tone configuration indicated by the first value of the parameter that indicates the tone configuration, wherein the total number of pilot tones comprises the first value of the parameter.

Aspect 21: The method of aspect 19, wherein determining the first value of the parameter that indicates the tone configuration for the combination of the allocated set of resource units comprises: selecting a subset of a set of pilot tones as data tones for the tone configuration; and determining a number of available pilot tones based at least in part on a sum of a number of pilot tones in each resource unit of the allocated set of resource units less the subset of the pilot tones, wherein the number of available pilot tones comprises the first value of the parameter that indicates the tone configuration.

Aspect 22: The method of aspect 19, wherein determining the first value of the parameter that indicates the tone configuration for the combination of the allocated set of resource units comprises: determining one or more data tones are unavailable for the set of coded bits based at least in part on a punctured bandwidth segment of the bandwidth allocation; selecting a subset of a set of pilot tones as data tones for the tone configuration based at least in part on the one or more unavailable data tones; and determining a number of available pilot tones based at least in part on a sum of a number of pilot tones in each resource unit of the allocated set of resource units less the subset of the set of pilot tones, wherein the number of available pilot tones comprises the first value of the parameter that indicates the tone configuration.

Aspect 23: The method of any of aspects 19 through 22, further comprising: determining one or more interleaving parameters based at least in part on the tone configuration, wherein the set of coded bits are distributed according to the one or more interleaving parameters.

Aspect 24: The method of aspect 23, wherein the one or more interleaving parameters comprise one or more of a distance tone mapping value or a number of columns for a row-column interleaving configuration.

Aspect 25: The method of any of aspects 19 through 24, further comprising: determining at least one bandwidth segment of the bandwidth allocation is punctured, wherein the tone configuration is based at least in part on the at least one punctured bandwidth segment being unavailable for distributing the set of coded bits.

Aspect 26: The method of aspect 25, wherein determining the allocation of the set of resource units comprises: determining the allocation of the set of resource units within a single user allocation of the bandwidth allocation based at least in part on the determining that the at least one bandwidth segment of the bandwidth allocation is punctured, the method further comprising: transmitting, to a receiving wireless device, an indication of the allocation of the set of resource units within the single user allocation.

Aspect 27: The method of any of aspects 19 through 26, wherein determining the allocation of the set of resource units comprises: receiving, from an access point, an indication of the allocation of the set of resource units, the set of resource units comprising a plurality of resource units for uplink orthogonal frequency-division multiple access (OFDMA) of the two or more bandwidth segments by a station, wherein the transmitting wireless device comprises the station; and determining the allocation based at least in part on the received indication of the allocation.

Aspect 28: The method of any of aspects 19 through 26, wherein the set of resource units comprises a plurality of resource units for downlink orthogonal frequency-division multiple access (OFDMA) of the two or more bandwidth segments by an access point, the method further comprising: transmitting an indication of the allocation to a station, wherein the transmitting wireless device comprises the access point.

Aspect 29: The method of any of aspects 19 through 28, further comprising: selecting a segment parser corresponding to a first frequency based at least in part on the bandwidth allocation.

Aspect 30: The method of aspect 29, wherein the first frequency is eighty megahertz, and the segment parser is an eighty megahertz segment parser.

Aspect 31: The method of any of aspects 19 through 30, further comprising: determining a noncontiguous bandwidth allocation comprising the two or more available bandwidth segments, wherein the allocated set of resource units is based at least in part on the two or more available bandwidth segments.

Aspect 32: The method of any of aspects 19 through 31, wherein the parameter that indicates the tone configuration comprises a distance to tone mapping value.

Aspect 33: The method of aspect 32, wherein the distance to tone mapping value is four and the allocated set of resource units comprises a twenty-six tone resource unit and a fifty-two tone resource unit, the distance to tone mapping value is six and the allocated set of resource units comprises a twenty-six tone resource unit and a one hundred six tone resource unit, or the distance to tone mapping value is eighteen and the allocated set of resource units comprises a two hundred forty-two tone resource unit and a four hundred eighty-four tone resource unit.

Aspect 34: The method of any of aspects 19 through 33, wherein the parameter that indicates the tone configuration comprises an identification of pilot tone locations in the allocated set of resource units.

Aspect 35: An apparatus for wireless communications at a receiving wireless device, comprising a processor; memory coupled with the processor; and instructions stored in the memory and executable by the processor to cause the apparatus to perform a method of any of aspects 1 through 18.

Aspect 36: An apparatus for wireless communications at a receiving wireless device, comprising at least one means for performing a method of any of aspects 1 through 18.

Aspect 37: A non-transitory computer-readable medium storing code for wireless communications at a receiving wireless device, the code comprising instructions executable by a processor to perform a method of any of aspects 1 through 18.

Aspect 38: An apparatus for wireless communications at transmitting wireless device, comprising a processor; memory coupled with the processor; and instructions stored in the memory and executable by the processor to cause the apparatus to perform a method of any of aspects 19 through 34.

Aspect 39: An apparatus for wireless communications at transmitting wireless device, comprising at least one means for performing a method of any of aspects 19 through 34.

Aspect 40: A non-transitory computer-readable medium storing code for wireless communications at transmitting wireless device, the code comprising instructions executable by a processor to perform a method of any of aspects 19 through 34.

As used herein, "element" as used in relation to a PDU or SDU structure may refer to a field, a subfield, or an information element of a respective PDU or SDU. In some examples, an information element may carry a field or subfield within the respective PDU or SDU.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000 or Universal Terrestrial Radio Access (UTRA). CDMA2000 covers IS-2000, IS-95, and IS-856 standards. IS-2000 Releases may be commonly referred to as CDMA2000 1x, or 1x. IS-856 (TIA-856) is commonly referred to as CDMA2000 1xEV-DO or High Rate Packet Data (HRPD). UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, or Flash-OFDM. UTRA and E-UTRA are part of Universal Mobile Telecommunications System (UMTS). LTE, LTE-A, and LTE-A Pro are releases of UMTS that use E-UTRA. The techniques described herein may be used for the systems and radio technologies mentioned herein as well as other systems and radio technologies.

A macro cell generally covers a relatively large geographic area (for example, several kilometers in radius) and may allow unrestricted access by STAs with service subscriptions with the network provider. A small cell may be associated with a lower-powered AP or base station, as compared with a macro cell, and a small cell may operate in the same or different (for example, licensed or unlicensed) frequency bands as macro cells. Small cells may include pico cells, femto cells, and micro cells according to various examples. A pico cell, for example, may cover a small geographic area and may allow unrestricted access by STAs with service subscriptions with the network provider. A femto cell may also cover a small geographic area (for example, a home) and may provide restricted access by STAs having an association with the femto cell (for example, STAs in a closed subscriber group, STAs for users in the home, and the like).

The wireless communications systems described herein may support synchronous or asynchronous operation. For synchronous operation, the APs may have similar frame timing, and transmissions from different APs may be approximately aligned in time. For asynchronous operation, the APs may have different frame timing, and transmissions from different APs may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a DSP, an ASIC, a FPGA or other PLD, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. Also, as used herein, the phrase "based on" shall not be construed as a reference to a closed set of conditions. For example, a block or step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some examples be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The description herein is provided to enable a person having ordinary skill in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a receiving wireless device, comprising:
   one or more memories storing processor-executable code; and
   one or more processors coupled with the one or more memories and individually or collectively operable to execute the code to cause the receiving wireless device to:
   receive, from an access point, an indication of an allocation of a set of resource units for the receiving wireless device in a basic service set, the set of resource units associated with two or more bandwidth segments of a bandwidth allocation;
determine a first value of a first parameter and a second value of a second parameter that indicate a tone configuration for a combination of the allocated set of resource units, the first value of the first parameter for the combination different from each value of the first parameter associated with a respective one resource unit of the allocated set of resource units, wherein the second value of the second parameter comprises a distance to tone mapping value associated with the tone configuration for the combination of the allocated set of resource units; and
receive a set of coded bits of a data unit on the allocated set of resource units according to the tone configuration indicated by the first value of the first parameter and the second value of the second parameter, wherein the set of coded bits of the data unit on the allocated set of resource units is received based at least in part on a number of available pilot tones comprising the first value of the first parameter that indicates the tone configuration for the combination of the allocated set of resource units.

2. The apparatus of claim 1, wherein:
the number of available pilot tones is based at least in part on a sum of a number of pilot tones in each resource unit of the allocated set of resource units.

3. The apparatus of claim 1, wherein:
the number of available pilot tones is based at least in part on a sum of a number of pilot tones in each resource unit of the allocated set of resource units less a subset of the set of pilot tones.

4. The apparatus of claim 1, wherein to determine the first value of the first parameter that indicates the tone configuration for the combination of the allocated set of resource units, the one or more processors are individually or collectively operable to execute the code to cause the receiving wireless device to:
determine one or more data tones are unavailable for the set of coded bits based at least in part on a punctured bandwidth segment of the bandwidth allocation;
select a subset of a set of pilot tones as data tones for the tone configuration based at least in part on the one or more unavailable data tones; and
determine the number of available pilot tones based at least in part on a sum of a number of pilot tones in each resource unit of the allocated set of resource units less the subset of the set of pilot tones.

5. The apparatus of claim 1, wherein the one or more processors are individually or collectively further operable to execute the code to cause the receiving wireless device to determine one or more interleaving parameters based at least in part on the tone configuration, wherein the set of coded bits are received on the allocated set of resource units according to the one or more interleaving parameters.

6. The apparatus of claim 5, wherein the one or more interleaving parameters comprise one or more of a second distance tone mapping value or a number of columns for a row-column interleaving configuration.

7. The apparatus of claim 1, wherein the one or more processors are individually or collectively further operable to execute the code to cause the receiving wireless device to determine at least one bandwidth segment of the bandwidth allocation is punctured, wherein the tone configuration is based at least in part on the at least one punctured bandwidth segment being unavailable for distributing the set of coded bits.

8. The apparatus of claim 7, wherein, to determine the allocation of the set of resource units, the one or more processors are individually or collectively operable to execute the code to cause the receiving wireless device to:
receive, from a transmitting wireless device, an indication of a single user allocation of the bandwidth allocation; and
determine the allocation of the set of resource units within the single user allocation of the bandwidth allocation based at least in part on the determining that the at least one bandwidth segment of the bandwidth allocation is punctured.

9. The apparatus of claim 1, wherein the set of resource units comprises a plurality of resource units for uplink orthogonal frequency-division multiple access (OFDMA) of the two or more bandwidth segments by a station, and the one or more processors are further individually or collectively operable to execute the code to cause the receiving wireless device to transmit an indication of the allocation to the station, wherein the receiving wireless device comprises an access point.

10. The apparatus of claim 1, wherein, to receive the indication of the allocation of the set of resource units, the one or more processors are individually or collectively operable to execute the code to cause the receiving wireless device to:
determine the allocation based at least in part on the received indication of the allocation of the set of resource units, the set of resource units comprising a plurality of resource units for downlink orthogonal frequency-division multiple access (OFDMA) of the two or more bandwidth segments by a station, wherein the receiving wireless device comprises the station.

11. The apparatus of claim 1, wherein the one or more processors are individually or collectively further operable to execute the code to cause the receiving wireless device to select a segment parser corresponding to a first frequency based at least in part on the bandwidth allocation.

12. The apparatus of claim 11, wherein the first frequency is eighty megahertz, and the segment parser is an eighty megahertz segment parser.

13. The apparatus of claim 1, wherein the one or more processors are individually or collectively further operable to execute the code to cause the receiving wireless device to determine a noncontiguous bandwidth allocation comprising the two or more bandwidth segments, wherein the allocated set of resource units is based at least in part on the two or more bandwidth segments.

14. The apparatus of claim 1, wherein the distance to tone mapping value is four and the allocated set of resource units a twenty-six tone resource unit and a fifty-two tone resource unit.

15. The apparatus of claim 1, wherein the distance to tone mapping value is six and the allocated set of resource units comprises a twenty-six tone resource unit and a one hundred six tone resource unit.

16. The apparatus of claim 1, wherein the distance to tone mapping value is eighteen and the allocated set of resource units a two hundred forty-two tone resource unit and a four hundred eighty-four tone resource unit.

17. The apparatus of claim 1, wherein a third value of a third parameter that indicates the tone configuration comprises an identification of pilot tone locations in the allocated set of resource units.

18. The apparatus of claim 1, wherein the number of available pilot tones is based at least in part on a sum of a number of pilot tones in each resource unit of the allocated set of resource units less a subset of a set of pilot tones being data tones for the tone configuration.

19. The apparatus of claim 1, wherein the second value of the second parameter for the combination is different from each value of the second parameter associated with a respective one resource unit of the allocated set of resource units.

20. An apparatus for wireless communications at transmitting wireless device, comprising:
one or more memories storing processor-executable code; and
one or more processors coupled with the one or more memories and individually or collectively operable to execute the code to cause the transmitting wireless device to:
receive, from an access point, an indication of an allocation of a set of resource units for the transmitting wireless device in a basic service set, the set of resource units associated with two or more bandwidth segments of a bandwidth allocation;
determine a first value of a first parameter and a second value of a second parameter that indicate a tone configuration for a combination of the allocated set of resource units, the first value of the first parameter for the combination different from each value of the first parameter associated with a respective one resource unit of the allocated set of resource units, wherein the second value of the second parameter comprises a distance to tone mapping value associated with the tone configuration for the combination of the allocated set of resource units;
distribute a set of coded bits of a data unit to the allocated set of resource units according to the tone configuration indicated by the first value of the first parameter and the second value of the second parameter, wherein the set of coded bits of the data unit on the allocated set of resource units is based at least in part on a number of available pilot tones comprising the first value of the first parameter that indicates the tone configuration for the combination of the allocated set of resource units; and
transmit the distributed set of coded bits on the allocated set of resource units.

21. The apparatus of claim 20, wherein:
the number of available pilot tones is based at least in part on a sum of a number of pilot tones in each resource unit of the allocated set of resource units.

22. The apparatus of claim 20, wherein:
the number of available pilot tones is based at least in part on a sum of a number of pilot tones in each resource unit of the allocated set of resource units less a subset of the set of pilot tones.

23. The apparatus of claim 20, wherein to determine the first value of the first parameter that indicates the tone configuration for the combination of the allocated set of resource units, the one or more processors are individually or collectively operable to execute the code to cause the transmitting wireless device to:
determine one or more data tones are unavailable for the set of coded bits based at least in part on a punctured bandwidth segment of the bandwidth allocation;
select a subset of a set of pilot tones as data tones for the tone configuration based at least in part on the one or more unavailable data tones; and
determine the number of available pilot tones based at least in part on a sum of a number of pilot tones in each resource unit of the allocated set of resource units less the subset of the set of pilot tones, wherein the number of available pilot tones comprises the first value of the parameter that indicates the tone configuration.

24. The apparatus of claim 20, wherein the one or more processors are individually or collectively further operable to execute the code to cause the transmitting wireless device to determine one or more interleaving parameters based at least in part on the tone configuration, wherein the set of coded bits are distributed according to the one or more interleaving parameters, and the one or more interleaving parameters comprise one or more of a second distance tone mapping value or a number of columns for a row-column interleaving configuration.

25. The apparatus of claim 20, wherein the one or more processors are individually or collectively further operable to execute the code to cause the transmitting wireless device to determine at least one bandwidth segment of the bandwidth allocation is punctured, wherein the tone configuration is based at least in part on the at least one punctured bandwidth segment being unavailable for distributing the set of coded bits.

26. The apparatus of claim 25, wherein, to determine the allocation of the set of resource units, the one or more processors are individually or collectively operable to execute the code to cause the transmitting wireless device to:
determine the allocation of the set of resource units within a single user allocation of the bandwidth allocation based at least in part on the determining that the at least one bandwidth segment of the bandwidth allocation is punctured; and
transmit, to a receiving wireless device, an indication of the allocation of the set of resource units within the single user allocation.

27. The apparatus of claim 20, wherein, to receive the indication of the allocation of the set of resource units, the one or more processors are individually or collectively operable to execute the code to cause the transmitting wireless device to:
determine the allocation based at least in part on the received indication of the allocation of the set of resource units, the set of resource units comprising a plurality of resource units for uplink orthogonal frequency-division multiple access (OFDMA) of the two or more bandwidth segments by a station, wherein the transmitting wireless device comprises the station.

28. The apparatus of claim 20, wherein the set of resource units comprises a plurality of resource units for downlink orthogonal frequency-division multiple access (OFDMA) of the two or more bandwidth segments by an access point, and the one or more processors are individually or collectively further operable to execute the code to cause the transmitting wireless device to transmit an indication of the allocation to a station, wherein the transmitting wireless device comprises the access point.

29. The apparatus of claim 20, wherein the one or more processors are individually or collectively further operable to execute the code to cause the transmitting wireless device to select a segment parser corresponding to a first frequency based at least in part on the bandwidth allocation, wherein the first frequency is eighty megahertz, and the segment parser is an eighty megahertz segment parser.

30. The apparatus of claim 20, wherein the one or more processors are individually or collectively further operable to execute the code to cause the transmitting wireless device to determine a noncontiguous bandwidth allocation comprising the two or more bandwidth segments, wherein the allocated set of resource units is based at least in part on the two or more bandwidth segments.

31. The apparatus of claim 20, wherein a third value of a third parameter that indicates the tone configuration comprises an identification of pilot tone locations in the allocated set of resource units.

32. The apparatus of claim 20, wherein the distance to tone mapping value is four and the allocated set of resource units comprises a twenty-six tone resource unit and a fifty-two tone resource unit, the distance to tone mapping value is six and the allocated set of resource units comprises a twenty-six tone resource unit and a one hundred six tone resource unit, or the distance to tone mapping value is eighteen and the allocated set of resource units comprises a two hundred forty-two tone resource unit and a four hundred eighty-four tone resource unit.

33. The apparatus of claim 20, wherein the second value of the second parameter for the combination is different from each value of the second parameter associated with a respective one resource unit of the allocated set of resource units.

34. A method for wireless communications at a receiving wireless device, comprising:
    receiving, from an access point, an indication of an allocation of a set of resource units for the receiving wireless device in a basic service set, the set of resource units associated with two or more bandwidth segments of a bandwidth allocation;
    determining a first value of a first parameter and a second value of a second parameter that indicate a tone configuration for a combination of the allocated set of resource units, the first value of the first parameter for the combination different from each value of the first parameter associated with a respective one resource unit of the allocated set of resource units, wherein the second value of the second parameter comprises a distance to tone mapping value associated with the tone configuration for the combination of the allocated set of resource units; and
    receiving a set of coded bits of a data unit on the allocated set of resource units according to the tone configuration indicated by the first value of the first parameter and the second value of the second parameter, wherein the set of coded bits of the data unit on the allocated set of resource units is received based at least in part on a number of available pilot tones comprising the first value of the first parameter that indicates the tone configuration for the combination of the allocated set of resource units.

35. The method of claim 34, wherein the number of available pilot tones is based at least in part on a sum of a number of pilot tones in each resource unit of the allocated set of resource units.

36. A method for wireless communications at transmitting wireless device, comprising:
    receiving, from an access point, an indication of an allocation of a set of resource units for the transmitting wireless device in a basic service set, the set of resource units associated with two or more bandwidth segments of a bandwidth allocation;
    determining a first value of first parameter and a second value of a second parameter that indicate a tone configuration for a combination of the allocated set of resource units, the first value of the first parameter for the combination different from each value of the first parameter associated with a respective one resource unit of the allocated set of resource units, wherein the second value of the second parameter comprises a distance to tone mapping value associated with the tone configuration for the combination of the allocated set of resource units;
    distributing a set of coded bits of a data unit to the allocated set of resource units according to the tone configuration indicated by the first value of the first parameter and the second value of the second parameter, wherein the set of coded bits of the data unit on the allocated set of resource units is based at least in part on a number of available pilot tones comprising the first value of the first parameter that indicates the tone configuration for the combination of the allocated set of resource units; and
    transmitting the distributed set of coded bits on the allocated set of resource units.

37. The method of claim 36, wherein the number of available pilot tones is based at least in part on a sum of a number of pilot tones in each resource unit of the allocated set of resource units.

* * * * *